(12) United States Patent
Yamada et al.

(10) Patent No.: US 8,041,473 B2
(45) Date of Patent: Oct. 18, 2011

(54) METHOD AND SYSTEM FOR ASSISTING STEERING AND MOORING ALONGSIDE OF VESSELS

(75) Inventors: Shu Yamada, Hiratsuka (JP); Masashi Wakabayashi, Hiratsuka (JP); Shigeki Sakakibara, Hiratsuka (JP); Michito Kaneko, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 364 days.

(21) Appl. No.: 12/447,856

(22) PCT Filed: Oct. 30, 2007

(86) PCT No.: PCT/JP2007/071117
§ 371 (c)(1),
(2), (4) Date: Apr. 29, 2009

(87) PCT Pub. No.: WO2008/053887
PCT Pub. Date: May 8, 2008

(65) Prior Publication Data
US 2010/0070118 A1    Mar. 18, 2010

(30) Foreign Application Priority Data
Oct. 31, 2006   (JP) ................. 2006-295863

(51) Int. Cl.
*B60L 3/00* (2006.01)
*G06F 7/00* (2006.01)
*G05D 3/00* (2006.01)
(52) U.S. Cl. ................. 701/21; 701/1; 701/26
(58) Field of Classification Search .......... None
See application file for complete search history.

(56) References Cited

U.S. PATENT DOCUMENTS
2006/0081166 A1*   4/2006   Montgomery et al. .... 114/230.1

FOREIGN PATENT DOCUMENTS
| JP | 05-233999 | 9/1993 |
| JP | 09-035200 | 2/1997 |
| JP | 2002-162467 | 6/2002 |
| JP | 2003-276677 | 10/2003 |

(Continued)

*Primary Examiner* — Khoi Tran
*Assistant Examiner* — Ian Jen
(74) *Attorney, Agent, or Firm* — Knobbe Martens Olson & Bear LLP

(57) ABSTRACT

A method and a system for assisting steering and mooring alongside of vessels that enables operators to easily obtain physical relationship between two vessels and the states of mooring lines and fenders when the operators lay the two vessels aboard and moors them alongside for loading cargoes are provided. Physical relationship between a hull of the first vessel and a hull of the second vessel is calculated in the form of numerical data based on information on a reference position of a first vessel that is detected by a first GPS receiver, information on a reference position of a second vessel that is detected by a second GPS receiver, oscillation information on the first vessel, oscillation information on the second vessel, information on a distance between the two vessels that is measured by distance measuring device, coordinate data including hull outer shape and the like against the reference position for each vessel, and air pressure data for each fender. Information on the physical relationship between the hull of said first vessel and the hull of said second vessel based on the numerical data and the state of each fender are displayed on a first display device provided for a steering room of the first vessel and a second display device provided for a steering room of the second vessel by means of animation.

15 Claims, 40 Drawing Sheets

FOREIGN PATENT DOCUMENTS

| | | |
|---|---|---|
| JP | 2005-208011 | 8/2005 |
| JP | 2005-212693 | 8/2005 |
| JP | 2005-534554 | 11/2005 |
| JP | 2006-162292 | 6/2006 |

* cited by examiner

METHOD AND SYSTEM FOR ASSISTING STEERING AND MOORING ALONGSIDE OF VESSELS

This application is the U.S. National Phase under 35. U.S.C. §371 of International Application PCT/JP2007/071117, filed Oct. 30, 2007, which claims priority to Japanese Patent Application No. 2006-295863, filed Oct. 31, 2006. The International Application was published under PCT Article 21(2) in a language other than English.

TECHNICAL FIELD

The present invention relates to a method and a system for assisting steering and mooring alongside of vessels that provides an operator with information on physical relationship between two vessels as well as information on mooring lines and fenders thereof when the two vessels are laying aboard or mooring alongside.

BACKGROUND ART

An operator has been required to be extremely attentive in mooring a vessel at the pier or laying vessels aboard so as not to damage the vessel(s).

When two vessels such as oil tankers are laid aboard for loading cargos on the sea with well-known operations such as STS (Ship-To-Ship) or FPSO (Floating Production Storage and Offloading), the two vessels need to be moored alongside in close proximity to each other. An advanced design of the fenders installed between the vessels and the operators' experienced steering technique are essential to that operation.

As the similar technologies, apparatus for assisting vessel steering disclosed in the Japanese Patent Publication 2005-212693, system for assisting vessel steering disclosed in the Japanese Patent Publication 2006-162292, apparatus for assisting safety management of vessel disclosed in the Japanese Patent Publication 5-233999, monitoring system disclosed in the Japanese Patent Publication 2005-208011, apparatus for assisting vessels in departing/landing bridge disclosed in the Japanese Patent Publication 2003-276677, a monitoring method disclosed in the Japanese Patent Publication 2002-162467, and mobile monitoring system disclosed in the Japanese Patent Publication 9-35200 are known.

Patent Document 1: Japanese Patent Publication 2005-212693
Patent Document 2: Japanese Patent Publication 2006-162292
Patent Document 3: Japanese Patent Publication 5-233999
Patent Document 4: Japanese Patent Publication 2005-208011
Patent Document 5: Japanese Patent Publication 2003-276677
Patent Document 6: Japanese Patent Publication 2002-162467
Patent Document 7: Japanese Patent Publication 9-35200

DISCLOSURE OF THE INVENTION

Problems to be Solved by the Invention

As mentioned above, when two vessels such as oil tankers are laid aboard for loading cargos on the sea with well-known operations such as STS (Ship-To-Ship) or FPSO (Floating Production Storage and Offloading), the operators' advanced steering technique is essential to the operation of mooring the two vessels alongside in close proximity to each other. Under such circumstances as bad weather, however, the vessels may be moored alongside too close proximity to each other even with the operators' advanced steering technique. Such an incident may break fenders installed between the vessels so that the vessels clash and damage each other.

Particularly in the case where vessels are mooring alongside and cargos are loaded at night, the states of the mooring lines and air fenders installed on the sea level are invisible. In addition, the tension of the mooring lines, the load to the fenders, and the states of the mooring lines and the fenders are hardly recognized.

The present invention is adapted in the view of the above-mentioned problems and intends to provide a method and a system for assisting steering and mooring alongside of vessels that enables an operator to easily obtain physical relationship between two vessels and the states of mooring lines and fenders thereof when the operator moors the two vessels alongside.

Means for Solving the Problems

In order to achieve the objects, the method for assisting steering and mooring alongside of vessels according to the present invention provides a first vessel with a first GPS receiver for detecting a predetermined reference position of a hull of the first vessel; and first oscillation detecting means for detecting oscillation of the hull in the x axis, the y axis, and the z axis on a rectangular coordinate with a predetermined position of the first vessel being the origin and outputting the detected result as oscillation information.

The method further provides a second vessel with a second GPS receiver for detecting a predetermined reference position of a hull of the second vessel; and second oscillation detecting means for detecting oscillation of the hull in the x axis, the y axis, and the z axis on a rectangular coordinate with a predetermined position of the second vessel being the origin and outputting the detected result as oscillation information.

The method further provides at least either the first vessel or the second vessel with two or more distance measuring devices that measure distances between the first vessel and the second vessel at their predetermined positions including their bows and sterns and outputting the measurements as distance information when the second vessel is laying aboard the first vessel; a plurality of fenders, each of which has an air pressure detector that detects an inner air pressure and transmits the detected result by radio waves; and air pressure information obtaining means for receiving the radio waves transmitted from the air pressure detector of each fender and outputting the air pressure information on the detected result.

The method further includes storing means that stores outer hull wall position information on the first vessel based on the reference position of the first vessel, outer hull wall position information on the second vessel based on the reference position of the second vessel, installed position information on the distance measuring device, mount position information on each fender, as well as a size, air pressure, a compressed amount, reaction, and absorbed energy features of the fenders.

A computer inputs information on a reference position of the first vessel that is detected by the first GPS receiver, information on a reference position of the second vessel that is detected by the second GPS receiver, oscillation information that is detected by the first oscillation detecting means; oscillation information that is detected by the second oscillation detecting means; distance information that is measured by the distance measuring device; information stored in the storing means; and the air pressure information obtained by the air pressure information obtaining means, and calculates physical relationship between the hull of the first vessel and the hull of the second vessel in the form of numerical data based on the information. In addition, the computer displays information on the physical relationship between the hull of the first vessel and the hull of the second vessel based on the numerical data calculated by itself on a first display device provided for a vessel steering room of the first vessel. The computer further displays information on the physical relationship between the hull of the first vessel and the hull of the second vessel based on the numerical data calculated by itself on a second display device provided for a vessel steering room of the second vessel.

According to the method for assisting steering and mooring alongside of vessels of the present invention, a computer calculates the physical relationship between the hull of the first vessel and the hull of the second vessel in the form of numerical data based on the information on a reference position of the first vessel that is detected by the first GPS receiver, the information on a reference position of the second vessel that is detected by the second GPS receiver, the oscillation information that is detected by the first oscillation detecting means, the oscillation information that is detected by the second oscillation detecting means, the distance information between the two hulls that is measured by the distance measuring device, the information stored in the storing means, and the air pressure information on each fender.

Information on the physical relationship between the hull of the first vessel and the hull of the second vessel based on the numerical data calculated by the computer is displayed on the first display device provided for the vessel steering room of the first vessel, and information on the physical relationship between the hull of the first vessel and the hull of the second vessel based on the numerical data calculated by the computer is displayed on the second display device provided for a vessel steering room of the second vessel.

That enables an operator to plan steering of the vessel and mooring alongside of the vessels with reference to the information on the physical relationship between the hull of the first vessel and the hull of the second vessel that is displayed on the display device.

The present invention is the system for assisting steering and mooring alongside of vessels that implements the method for assisting steering and mooring alongside of vessels having a first vessel with a first GPS receiver for detecting a predetermined reference position of a hull of the first vessel; and first oscillation detecting means for detecting oscillation of the hull in the x axis, the y axis, and the z axis on a rectangular coordinate with a predetermined position of the first vessel being the origin and outputting the detected result as oscillation information. The system also has a second vessel with a second GPS receiver for detecting a predetermined reference position of a hull of the second vessel; and second oscillation detecting means for detecting oscillation of the hull in the x axis, the y axis, and the z axis on a rectangular coordinate with a predetermined position of the second vessel being the origin and outputting the detected result as oscillation information.

The system according to the present invention further provides at least either the first vessel or the second vessel with distance measuring means including two or more distance measuring devices which measure a distance between the first vessel and the second vessel at their predetermined positions including their bows and sterns and outputting the measurements as distance information when the second vessel is laying aboard the first vessel; a plurality of fenders, each of which has an air pressure detector that detects an inner air pressure and transmits the detected result by radio waves; and air pressure information obtaining means for receiving the radio waves transmitted from the air pressure detector of each fender and outputting the air pressure information on the detected result.

The system according to the present invention further provides at least either the first vessel or the second vessel with storing means that stores at least either vessel information of: first vessel information including outer hull wall position information on the first vessel based on the reference position of the first vessel, installed position information on the distance measuring device that is installed on the first vessel, mount position information on each fender, as well as a size, air pressure, a compressed amount, reaction, and absorbed energy features of the fenders; or second vessel information including outer hull wall position information of the second vessel based on the reference position of the second vessel, installed position information on the distance measuring device that is installed on the second vessel, mount position information on each fender, as well as a size, air pressure, a compressed amount, reaction, and absorbed energy features of the fenders.

The system according to the present invention further provides at least either the first vessel or the second vessel with calculation means that inputs information on a reference position of the first vessel that is detected by the first GPS receiver, information on a reference position of the second vessel that is detected by the second GPS receiver, oscillation information that is detected by the first oscillation detecting means, oscillation information that is detected by the second oscillation detecting means, distance information that is measured by the distance measuring device; vessel information stored in the storing means, and air pressure information, and calculates the physical relationship between the hull of the first vessel and the hull of the second vessel in the form of numerical data based on the information.

The system according to the present invention further provides the first vessel with a first display device for obtaining the numerical data calculated by the calculation means and displaying information on the physical relationship between the hull of the first vessel and the hull of the second vessel based on the numerical data. The system according to the present invention further provides the second vessel with a second display device for obtaining the numerical data calculated by the calculation means and displaying information on the physical relationship between the hull of the first vessel and the hull of the second vessel based on the numerical data.

ADVANTAGES OF THE INVENTION

The method and the system for assisting steering and mooring alongside of vessels of the present invention enable operators to easily plan steering of the vessel with reference to the information on the physical relationship between the hull of the first vessel and the hull of the second vessel that is displayed on the display device. Therefore, the method and the system enable the operators to avoid laying the vessels aboard too close proximity to each other so as to prevent the hulls from damaging each other as the fenders placed between the vessels break or the vessels clash when the two vessels such as oil tankers are laid aboard on the sea with such an operation as STS or FPSO. When the laid aboard two vessels are moored alongside and the cargo such as oil is being transferred, the operators can avoid laying the vessels aboard too close proximity to each other with reference to information on the physical relationship between the hull of the first vessel and the hull of the second vessel that is displayed on the display device. That can help the operators in keeping the cargo loading safe.

DESCRIPTION OF SYMBOLS

Figure 1:
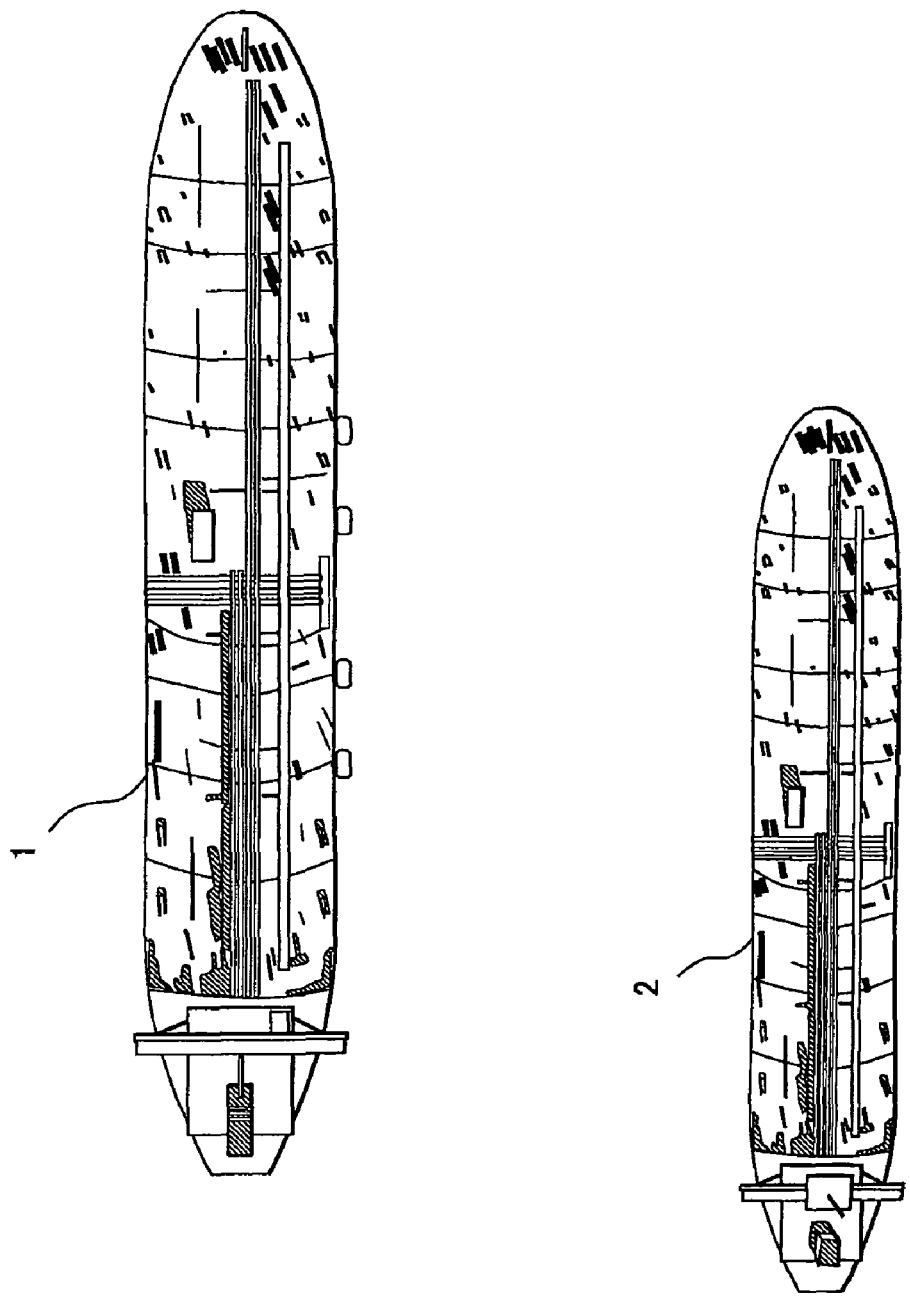
FIG. 1 is a diagram for illustrating relationship between two vessels in a first embodiment of the present invention.

1 . . . first vessel
2 . . . second vessel
11A to 11C . . . distance measuring device
12A to 12D . . . fender
13A to 13D . . . air pressure detector
14A to 14D . . . mooring line
15A to 15D . . . winch
16A to 16D . . . hook mechanism element
21A to 21D . . . distance measuring device
22A to 22D . . . fender
23A to 23D . . . air pressure detector
24A to 24D . . . mooring line
25A to 25D . . . winch
26A to 26D . . . hook mechanism element
100A, 100B, 100C, 100D, 100E . . . main device of the first vessel
101 . . . GPS receiver
102 . . . laying aboard vessel data receiver
103 . . . distance data receiver
104 . . . air pressure data receiver
105 . . . oscillation detecting device
106 . . . weather/oceanographic phenomena information receiver
107 . . . storing device
108A to 108D . . . calculating device
109 . . . operating device
110 . . . display device
111 . . . steering/assisting vessels in mooring alongside data transmitter
112 . . . laying aboard vessel data transmitter
113 . . . mooring line tension detecting device
200A, 200B, 200C, 200D, 200E . . . main device of the second vessel
201 . . . GPS receiver
202 . . . oscillation detecting device
203 . . . steering/assisting vessels in mooring alongside data receiver
204 . . . storing device
205A to 205D . . . calculating device
206 . . . operating device
207 . . . display device
208 . . . laying aboard vessel data transmitter
211 . . . distance data receiver
212 . . . air pressure data receiver
213 . . . laying aboard vessel data receiver
214 . . . weather/oceanographic phenomena information receiver
215 . . . mooring line tension detecting device

BEST MODE FOR CARRYING OUT THE INVENTION

An embodiment of the present invention will be described with reference to the drawings.

Figure 2:
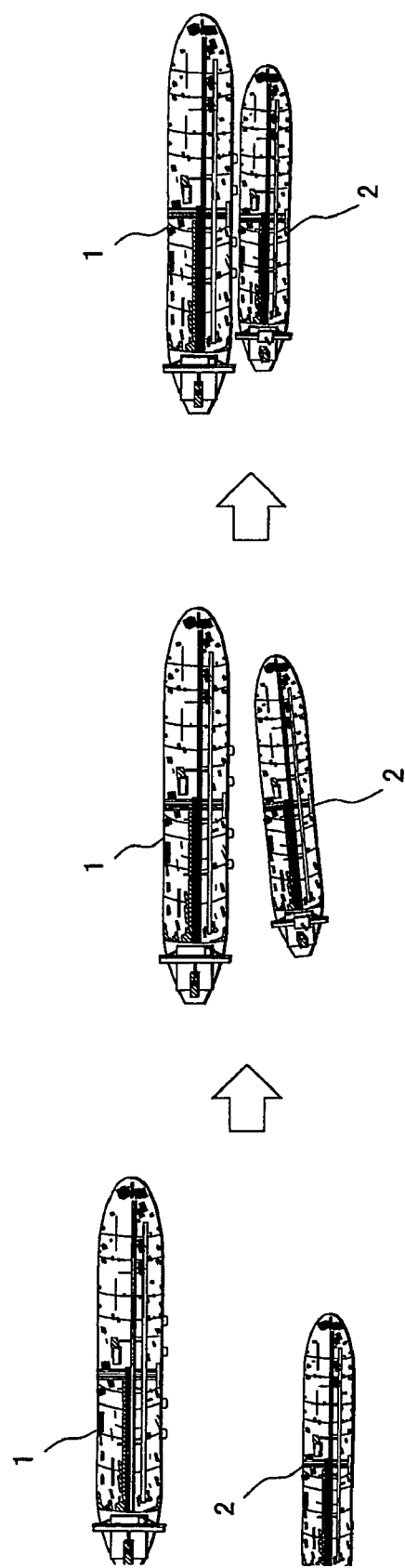
FIG. 2 is a diagram for illustrating relationship between the two vessels in the first embodiment of the present invention.
Figure 3:
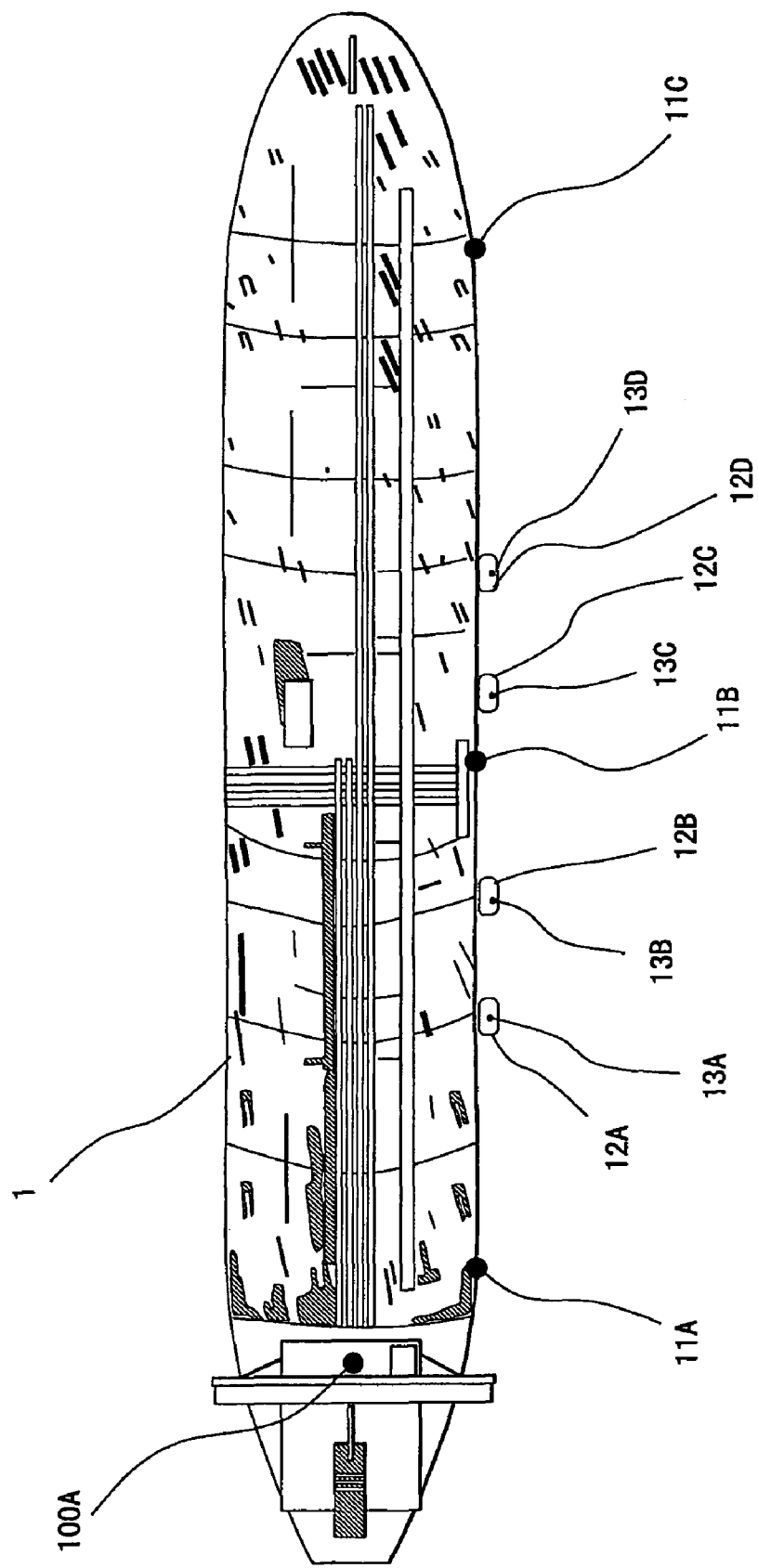
FIG. 3 is a diagram showing arrangement of devices in the first vessel in the first embodiment of the present invention.
Figure 4:
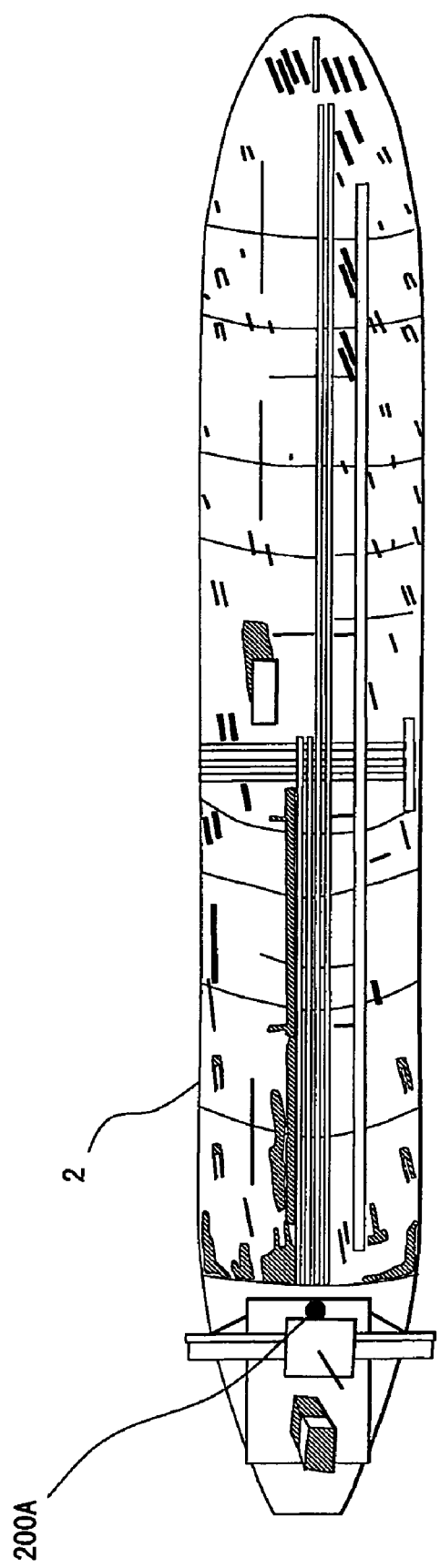
FIG. 4 a diagram showing arrangement of devices in the second vessel in the first embodiment of the present invention.
Figure 5:
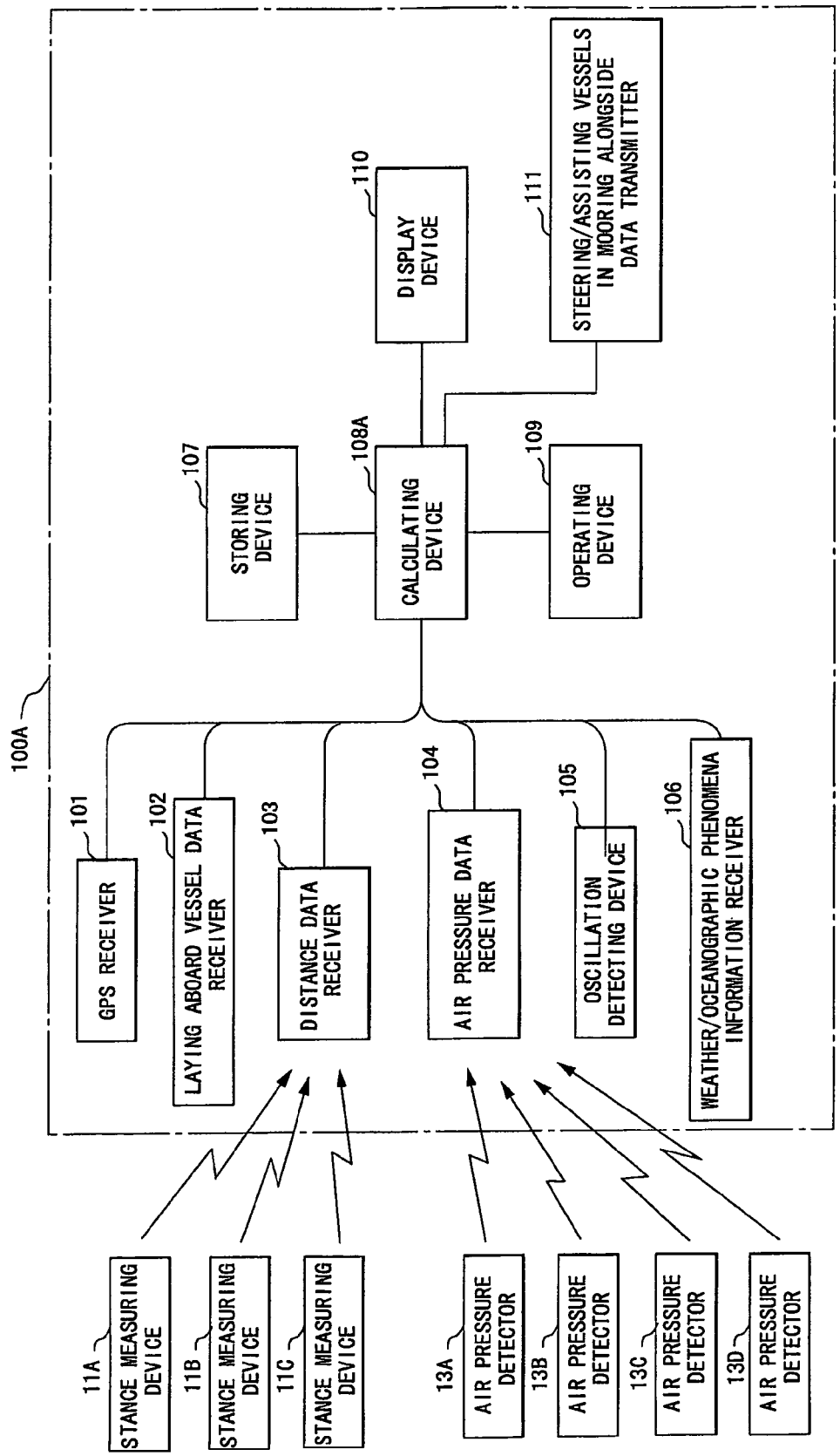
FIG. 5 is a block diagram showing configuration of a main device mounted on the first vessel in the first embodiment of the present invention.
Figure 6:
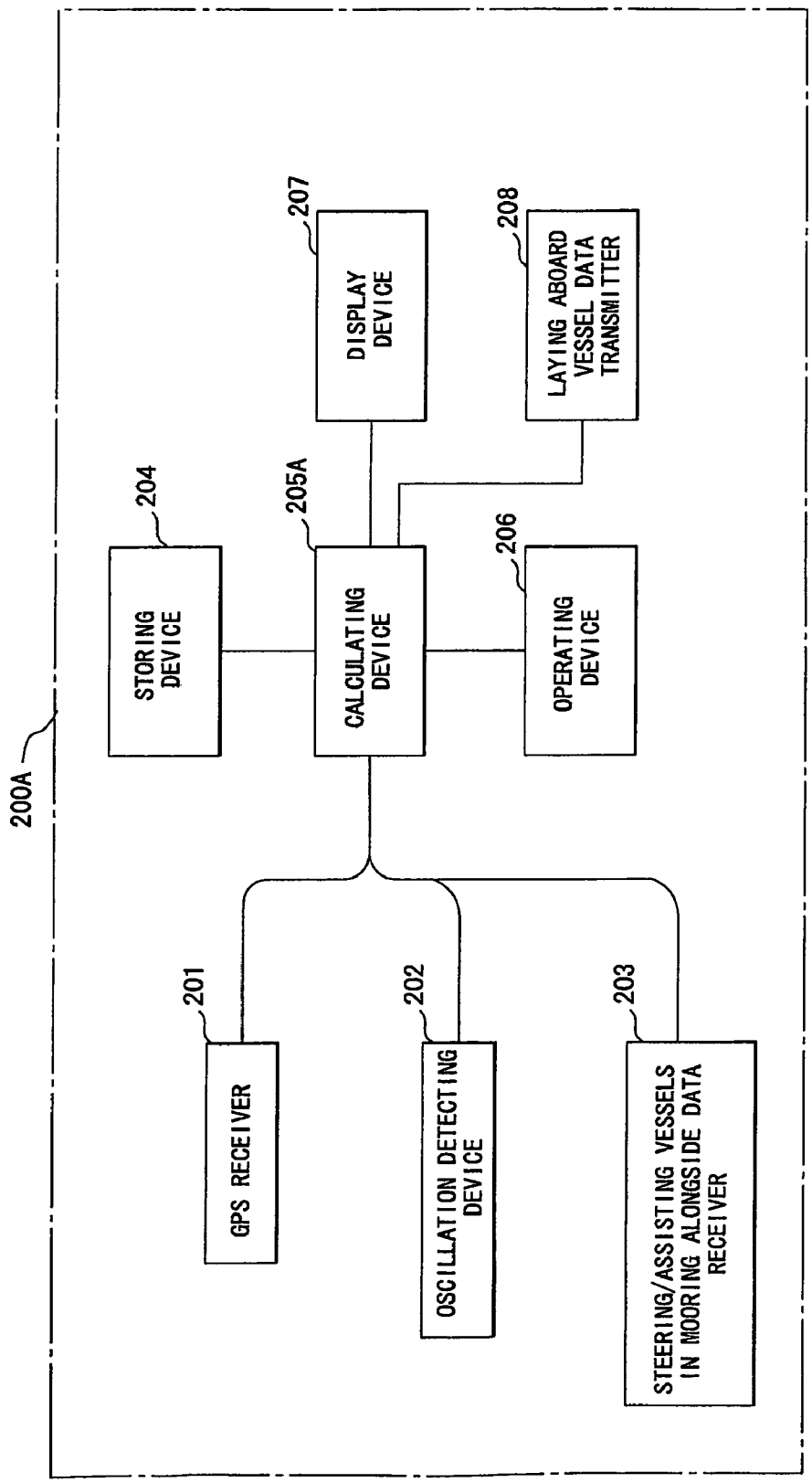
FIG. 6 is a block diagram showing configuration of a main device mounted on the second vessel in the first embodiment of the present invention.

FIG. 1 to FIG. 6 are diagrams showing configuration of a system for assisting steering and mooring alongside of vessels in a first embodiment of the present invention. FIG. 1 and FIG. 2 are diagrams for illustrating relationship between two vessels. FIG. 3 is a diagram showing arrangement of devices in a first vessel. FIG. 4 a diagram showing arrangement of devices in a second vessel. FIG. 5 is a block diagram showing configuration of a main device mounted on the first vessel. FIG. 6 is a block diagram showing configuration of a main device mounted on the second vessel.

As shown in FIG. 1 and FIG. 2, the embodiment describes a method and a system for assisting steering and mooring alongside of vessels in the case where a first vessel 1, which is a giant crude oil tanker with an overall length of 380 m, and a second vessel 2, which is a midsized crude oil tanker with an overall length of 260 m, are sailing side by side, gradually approaching each other, laying aboard and mooring alongside using their own mooring lines so that crude oil is transferred from the first vessel 1 to the second vessel 2.

As shown in FIG. 3, the first vessel 1 has a main device 100A in its vessel steering room. The first vessel 1 has three distance measuring devices 11A to 11C and four fenders 12A to 12D on the starboard, to which the second vessel 2 is to lay aboard.

The first distance measuring device 11A is provided at a predetermined position near the stern, the second distance measuring device 11B is provided at a predetermined position in the center, and the third distance measuring device 11C is provided at a predetermined position at the bow. These units of the distance measuring device 11A to 11C are for measuring a distance from the second vessel 2 to be laid aboard, using a laser displacement gauge or an ultrasonic range finder, for example. Each of the distance measuring devices 11A to 11C transmits the measured distance data to the main device 100A with unit identification information unique to each of the distance measuring device by radio waves of a predetermined frequency or via a communication cable. The distance measuring device 11 is preferably provided at two or more places on the hull including the stern and the bow.

The fenders 12A to 12D are well-known air fenders, respectively including air pressure detectors 13A to 13D inside, which is for detecting an inner air pressure, and transmitting the detected air pressure data to the main device 100A with the unit identification information unique to each fender (air pressure detector) by radio waves of a predetermined frequency or via a communication cable. As it is conventionally known, the fenders 12A to 12D are arranged with a predetermined distance therebetween to prevent the first vessel 1 from clashing against the second vessel 2. The number of the fenders 12 may depend on the situation.

As shown in FIG. 4, the second vessel 2 has a main device 200A in its vessel steering room.

As shown in FIG. 5, the main device 100A in the first vessel 1 includes a GPS receiver 101, a laying aboard vessel data receiver 102, a distance data receiver 103, an air pressure data receiver 104, a oscillation detecting device 105, weather/oceanographic phenomena information receiver 106, a storing device 107, a calculating device 108A, an operating device 109, a display device 110, and a steering/assisting vessels in mooring alongside data transmitter 111. The calculating device 108A is a well-known computer.

The GPS receiver 101 obtains position information on a predetermined reference point of the first vessel 1 and outputs the information to the calculating device 108A.

The laying aboard vessel data receiver 102 receives the laying aboard vessel data transmitted from the second vessel 2 and outputs the data to the calculating device 108A.

The distance data receiver 103 receives the distance data and the unit identification information transmitted from each of the distance measuring devices 11A to 11C and outputs them to the calculating device 108A with the distance data associated with the unit identification information.

The air pressure data receiver 104 receives the air pressure data and the unit identification information transmitted from each of the air pressure detectors 13A to 13D and outputs them to the calculating device 108A with the air pressure data associated with the unit identification information.

The oscillation detecting device 105 detects oscillation of the hull in the directions of six-degree-of-freedom on the X, Y, Z rectangular coordinates with the abovementioned predetermined reference point being the origin, obtains the displacement for each degree of freedom and outputs the data to the calculating device 108A.

The weather/oceanographic phenomena information receiver 106 obtains weather/oceanographic phenomena information in the oceanic region for the self vessel to sail from the weather/oceanographic phenomena information transmitted from Japan Meteorological Agency or the like and outputs the information to the calculating device 108A. The receiver may obtain the similar information by using an anemometer and an ultrasonic wave gauge provided in the vessel.

The storing device 107 is a HDD, rewritable non-volatile memory or the like. The storing device 107 stores the coordinate data on an outside plating shape of the hull based on the above-mentioned predetermined reference point as well as identification information and coordinate data on the installed position of each of the above-mentioned distance measuring devices 11A to 11C and fender data including identification information and coordinate data on the installed position, outside plating shape data, steady state air pressure data, an air pressure, a compressed amount, reaction, and absorbed energy features of each of the fenders 12A to 12D as the self hull information.

The calculating device 108A is a well-known computer. The calculating device 108A inputs the coordinate data on the predetermined reference point of the first vessel 1 detected by the GPS receiver 101, the laying aboard vessel data to be described later (data on the second vessel 2) obtained by the laying aboard vessel data receiver 102, the displacement detected by the oscillation detecting device 105 (oscillation information), distance information measured by the distance measuring devices 11A to 11C, information stored in the storing device 107, the air pressure data obtained by the air pressure data receiver 104, and the weather/oceanographic phenomena data obtained by the weather/oceanographic phenomena information receiver 106. Based on the information, the calculating device 108A calculates physical relationship between the hull of the first vessel 1 and the hull of the second vessel 2 as well as the states of the fenders 12A to 12D in the form of numeric data and animation data, outputs them to the display device 110, and stores the numeric data in the storing device 107 while outputting assisting steering and mooring alongside of vessels data transmitter 111. The calculating device 108A changes the eye point of the animation according to a command input from the operating device 109. The calculating device 108A may convert the obtained air pressure data of the fenders 12A to 12D into compressed amount, reaction, and absorbed energy features of the fenders 12A to 12D, and output them to the display device 110 for monitoring.

The operating device 109 includes a keyboard, a mouse or a trackball for enabling the calculating device 108A to input a command, the eye point of an animation and the like.

The display device 110 displays the information on the physical relationship between the hull of the first vessel 1 and the hull of the second vessel 2 and the information on the states of the fenders 12A to 12D based on the numeric data and the animation data calculated by the calculating device 108A. Although the display device 110 displays both the numeric data and the animation in the embodiment, it may be adapted to display either of them.

The steering/assisting vessels in mooring alongside data transmitter 111 transmits the numeric data representing the physical relationship between the hull of the first vessel 1 and the hull of the second vessel 2 and the numeric data relating to the states of the fenders 12A to 12D which are input from the calculating device 108A to the second vessel 2 as the steering/assisting vessel in mooring alongside data by radio waves of a predetermined frequency.

As shown in FIG. 6, the main device 200A provided for the second vessel 2 includes a GPS receiver 201, an oscillation detecting device 202, a steering/assisting vessels in mooring alongside data receiver 203, a storing device 204, a calculating device 205A, an operating device 206, a display device 207, and a laying aboard vessel data transmitter 208.

The GPS receiver 201 obtains position information on a predetermined reference point of the second vessel 2 and outputs the information to the calculating device 205A.

The oscillation detecting device 202 detects oscillation of the hull in the directions of six-degree-of-freedom on the X, Y, Z rectangular coordinates with the abovementioned predetermined reference point being the origin, obtains the displacement for each degree of freedom and outputs the data to the calculating device 205A.

The steering/assisting vessels in mooring alongside data receiver 203 receives the steering/assisting vessels in mooring alongside data transmitted from the first vessel 1 and outputs the data to the calculating device 205A.

The storing device 204 is a HDD, rewritable non-volatile memory or the like. The storing device 204 stores the coordinate data on an outside plating shape of the hull based on the above-mentioned predetermined reference point as the self hull information.

The calculating device 205A is a well-known computer. The calculating device 205A stores the coordinate data on the predetermined reference point of the second vessel 2 detected by the GPS receiver 201 and the displacement data detected by the oscillation detecting device 202 (oscillation information) in the storing device 204, and also transmits the data as the laying aboard vessel data to the first vessel 1 via the laying aboard vessel data transmitter 208 by radio waves of a predetermined frequency. The calculating device 205A stores the steering/assisting vessel in mooring alongside data obtained by the steering/assisting vessel in mooring alongside data receiver 203 in the storing device 204 and also calculates physical relationship between the hull of the first vessel 1 and the hull of the second vessel 2 and the states of the fenders 12A to 12D as color animation data based on the steering/assisting vessel in mooring alongside data and outputs the numeric data and the animation data to the display device 207. The calculating device 205A changes the eye point of the animation according to a command input from the operating device 206.

The operating device 206 includes a keyboard, a mouse or a trackball for enabling the calculating device 205A to input a command, the eye point of an animation and the like.

The display device 207 displays the information on the physical relationship between the hull of the first vessel 1 and the hull of the second vessel 2 and the information on the states of the fenders 12A to 12D based on the numeric data and the animation data input from the calculating device 205A. Although the display device 207 displays both the numeric data and animation in the embodiment, it may be adapted to display either of them. The embodiment may be adapted to make the first vessel 1 transmit the animation data and make the second vessel 2 receive and display the data. In such a case, both of the vessels share the data obtained by either of the vessels.

The laying aboard vessel data transmitter 208 transmits the data input from the calculating device 205A, i.e., the coordinate data on the predetermined reference point of the second vessel 2 detected by the GPS receiver 201 and the displacement data detected by the oscillation detecting device 202 (oscillation information) to the first vessel 1 as the laying aboard vessel data by radio waves of the predetermined frequency.

Now, calculation performed by the calculating device 108A of the first vessel 1 will be described.

Figure 7:
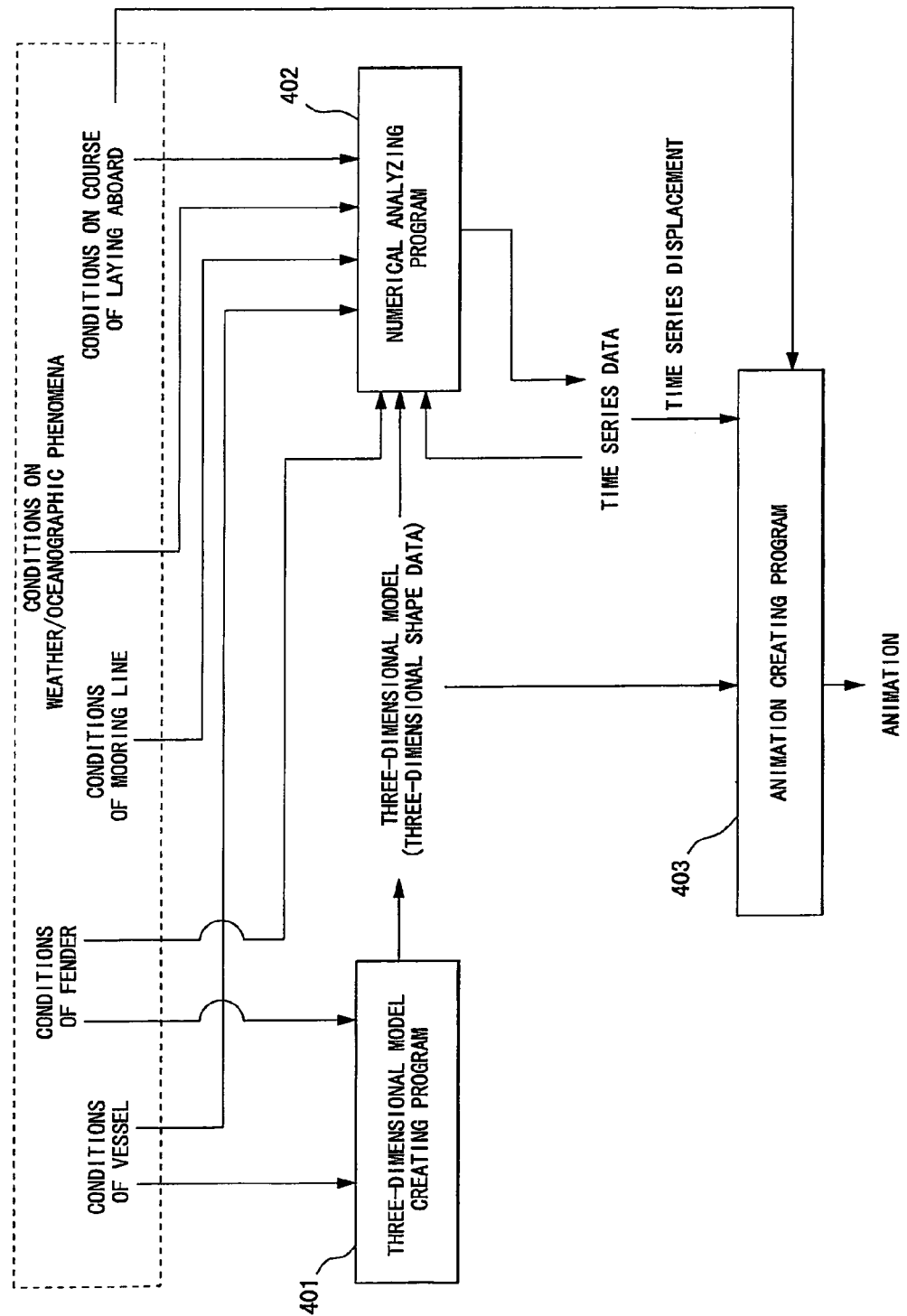
FIG. 7 is a diagram for illustrating operation of a calculating device in the first embodiment of the present invention.

As shown in FIG. 7, the calculating device 108A has a three-dimensional model creating program 401, a numerical analyzing program 402, and an animation creating program 403 independently.

The three-dimensional model creating program 401 creates a three-dimensional model of the first vessel 1 and the second vessel 2 (three dimensional shape data) based on the conditions of the vessels (the coordinate data on the predetermined reference point of the first vessel 1 detected by the GPS receiver 101, and the laying aboard vessel data obtained by the laying aboard vessel data receiver 102 to be described later (data on the second vessel 2), the displacement detected by the oscillation detecting device 105 (oscillation information), the distance information measured by the distance measuring device 11A to 11C, and the coordinate data on the outside plating shape of the hull based on the reference point that is stored in the storing device 107, as well as information including the coordinate data on the installed position of each of the distance measuring devices 11A to 11C), and the conditions of the fenders (the coordinate data on the installed position of each of the fenders 12A to 12D stored in the storing device 107, the outside plating shape data and the steady state air pressure data, and the air pressure data obtained by the air pressure data receiver 104), and sends out the three-dimensional model to the numerical analyzing program 402.

The numerical analyzing program 402 performs numerical analysis on the laying aboard/mooring alongside operation which is implemented in the course of laying aboard under the input conditions on the weather/oceanographic phenomena by using the three-dimensional model of each vessel created by the three-dimensional model creating program 401 (the first vessel model and the second vessel model), the conditions of the fenders, and the conditions of the mooring lines (not required in the embodiment, used in the fifth embodiment to be described later), while sequentially reading out necessary data from the storing device 107. During the numerical analysis on the laying aboard/mooring alongside operation, time series data on the displacement from the course of laying aboard along which each of the vessels is sailing, time series data on the compressed amount for each of the fenders, and time series data on the tension of the mooring line after the vessels are moored are derived. From the time series data on the compressed amount for each of the fenders, compression energies accumulated in the respective fenders, i.e., the kinetic energies of the two vessels absorbed by the fenders are derived. The time series data of the distance between the vessel models (distance between vessel models) are also derived based on the time series data on the displacement from the set course of laying aboard and each of the vessel models.

As the displacement for each of the vessel models from the set course of laying aboard, the displacement of the six-degree-of-freedom is obtained for each of the vessel models (axial displacement generally represented by Surge, Sway, Heave and a rotation angle displacement on shafting represented by Roll, Pitch, Yaw). Specifically, the numerical analyzing program 402 derives the displacement of twelve-degree-of-freedom in total; the six-degree-of-freedom of the first vessel model and the six-degree-of-freedom of the second vessel model.

The numerical analyzing program 402 performs numerical analysis on the time series oscillation for each of the vessel models in the numerical analysis performed on the laying aboard/mooring alongside operation by using the formula (1) below. The formula (1) is a second order differential equation for handling an irregular outer force term F. In the formula (1), $L_{ij}(t)$ and $m_{ij}(\infty)$ are represented by the formulae (2) and (3). The numerical analyzing program 402 performs numerical analysis using a higher order boundary element method for deriving hydrodynamic forces for analyzing a time domain by using a memory influence related matrix, yet taking consideration of the strong interaction of the hydrodynamic forces components between the two vessels.

[Formula 1]

$$\sum_{j=1}^{12}\{M_{ij}+m_{ij}(\infty)\}\cdot \ddot{x}_j(t)+\sum_{j=1}^{12}\int_{-\infty}^{t}\dot{x}_j(\tau)\cdot L_{ij}(t-\tau)d\tau+ \quad (1)$$

$$\sum_{j=1}^{12}D_{ij}\cdot \dot{x}_j(t)+\sum_{j=1}^{12}Cij\cdot x_j(t)+Gi=Fi(t),$$

$$(i=1,2,\ldots,12)$$

$$L_{ij}(t)=\frac{2}{\pi}\int_{0}^{\infty}B_{ij}(\sigma)\cos\sigma t\,d\sigma, \quad (2)$$

$$m_{ij}(\infty)=A_{ij}(\sigma)+\frac{1}{\sigma}\int_{0}^{\infty}L_{ij}(t)\sin\sigma t\,dt, \quad (3)$$

Here, $x_j(t)$ is displacement, $M_{ij}$ is a coefficient representing the mass, $m_{ij}(\infty)$ is a coefficient representing the steady added mass, $L_{ij}(t)$ is a coefficient representing the memory influence related matrix, $D_{ij}$ is a coefficient representing the viscous damping coefficient, $C_{ij}$ is a coefficient representing the static resilience coefficient, $G_i$ is a vector representing the reaction force of the fender and the tension of the mooring line, the mooring tension, $F_i$ is a coefficient representing the weather conditions (wave, wind, tidal current), $B_{ij}$ is the damping coefficient, and $A_{ij}(\sigma)$ is an added mass.

The numerical analyzing program 402 derives the displacement in the six-degree-of-freedom from the course of laying aboard of each of the vessel models, the reaction force by each of the fenders, and the mooring force by the mooring line at a certain time and further derives the displacement in the six-degree-of-freedom from the course of laying aboard of each of the vessel models, the reaction force by each of the fenders, and the mooring force by the mooring line at the next time. The numerical analyzing program 402 repeats the numeric analysis.

The numerical analyzing program 402 reflects the weather conditions read out from the storing device 107 on the outer force term F. The numerical analyzing program 402 reads out the fender conditions and the mooring line conditions from the storing device 107 and reflects the reaction forces of the fenders or the mooring lines or the mooring forces (tension) of the mooring lines on the vector $G_i$. The numerical analyzing program 402 also reflects data on each of the vessel models, mainly the conditions including the displacement and the metacenter position on the coefficient $M_{ij}$ and $m_{ij}$. The numerical analyzing program 402 starts reflecting the reaction forces from the fenders on the vector $G_i$ when the two vessels lay aboard, i.e., when the two vessels start pressing the fenders. The numerical analyzing program 402 starts reflecting the tension of the mooring lines on the vector $G_i$ when the vessels start mooring alongside. The time for the vessels to start mooring alongside may be set to any time. It may be set for the vessels to start mooring alongside after a predetermined time period passed from when the two vessels are adjacent and the bows of the two vessels are placed in parallel.

When the numerical analyzing program 402 derives the time series data on the displacement for each of the vessel models, the time series data on the compressed amount for each of the fenders, and the time series data on the tension of the mooring line, it further derives the time series data on the distance between the vessel models by using the time series displacement data and the three-dimensional shape data of each of the vessel models. As mentioned above, the numerical analyzing program 402 derives the displacement data from the course of laying aboard of each of the vessel models at a certain time. From the data from the course of laying aboard and the displacement data, the position and the posture of each of the vessel models at a certain time is obtained. From the data on the position and the posture of each of the vessel models and the three-dimensional shape data on the two vessels, the time series data on the distance between the vessel models (distance between vessel models) can be obtained.

The time series values of the distance between the two vessels, the time series values of the compressed amount and the compression energy (absorbed energy) of the fenders, and the time series values of the tension of the mooring line which are derived by the numerical analyzing program 402 output to the animation. For the time series data on the distance between the two vessels, the distance between the two vessels measured from a point at least on either of the vessels where the headmost fender is installed (the first fender installed position) or the distance between the two vessels measured at a point which is a predetermined distance ahead from the first fender installed position only need to be displayed. This is because the distance between the two vessels at the bows is quite important in the laying aboard and mooring alongside operation of the two vessels, as mentioned above. The distances between the two vessels measured at the positions where fenders are installed in either of the vessels may be displayed. The time series data on the displacement and the like for the two vessels is preferably displayed as well as the time series data on the distance between the two vessels and the time series compression energy.

In addition to displaying respective kinds of time series data, the animation creating program 403 creates an animation for specifically reproducing the behavior of the two vessels in the laying aboard and mooring alongside operation by using the data on the conditions on the course of laying aboard, the time series data on the displacement for each of the vessels, and each of the vessel models, and outputs the animation to the display device.

The calculating device 108 has a three-dimensional model creating program 401, a numerical analyzing program 402, and an animation creating program 403 independently. If a family personal computer uses a program to simultaneously execute three-dimensional model creation, numerical analysis, and animation creation, it needs much time in the processing. If the processing is desired to be executed rapidly, an advanced computer with bulk memory and a high speed CPU is required, which increases the cost. As the numerical analyzing program 402 which is for the numerical analysis and the animation creating program 403 which is for the animation creation are provided independently in the calculating device 108, the numerical analysis and the animation creation can be rapidly executed even by a family personal computer.

Now, how the displacement in each of X, Y, and Z coordinates is obtained by the calculation when the animation is to be displayed will be described.

The displacement on a hull optional coordinate when the animation is to be displayed includes the displacement caused by each of the Rolling motion, the Yawing motion, the Pitching motion, the Surging motion, the Swaying motion, and the Heaving motion.

(A) Displacement on a Hull Optional Coordinate Caused by the Rolling Motion

Figure 8:
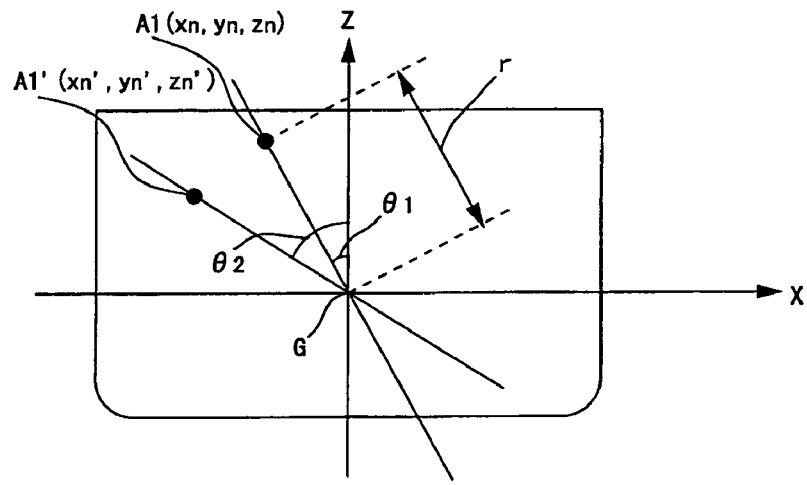
FIG. 8 is a diagram for illustrating how to calculate displacement on an optional coordinate caused by Rolling motion in the first embodiment of the present invention.

As shown in FIG. 8, the displacement on a hull optional coordinate caused by the Rolling motion is the displacement caused by oscillation on the XZ plane where the X axis is set in the cross direction of the hull on the horizon, the Y axis is set in the travelling direction of the hull on the horizon, and the Z axis is set perpendicular on the vertical plane on the XYZ rectangular coordinates with the center coordinate G (center of gravity) for the hull Rolling motion on the XZ plane being the origin. For example, the displacement ($\Delta X_{Roll}$, $\Delta Y_{Roll}$, $\Delta Z_{Roll}$) caused by the Rolling motion, in which a point A1 ($x_n$, $y_n$, $z_n$) on the XZ plane moves to a point A1' ($x_n'$, $y_n'$, $z_n'$) on the same XZ plane, is represented by the formula (4) below.

$$(\Delta X_{Roll}, \Delta Y_{Roll}, \Delta Z_{Roll}) = (x_n' - x_n, y_n' - y_n, z_n' - z_n) = [r(\sin(\theta_1 + \theta_2) - \sin\theta_1), 0, r(\cos(\theta_1 + \theta_2) - \cos\theta_1)] \quad (4)$$

Here, r is the distance between the center coordinate G and the point A1 and the distance between the center coordinate G and the point A1' on the XZ plane, $\theta_1$ is the angle formed by the line between the center coordinate G and the point A1 and the Z axis, and $\theta_2$ is the angle formed by the line between the center coordinate G and the point A1' and the Z axis.

(B) Displacement on a Hull Optional Coordinate Caused by the Yawing Motion

Figure 9:
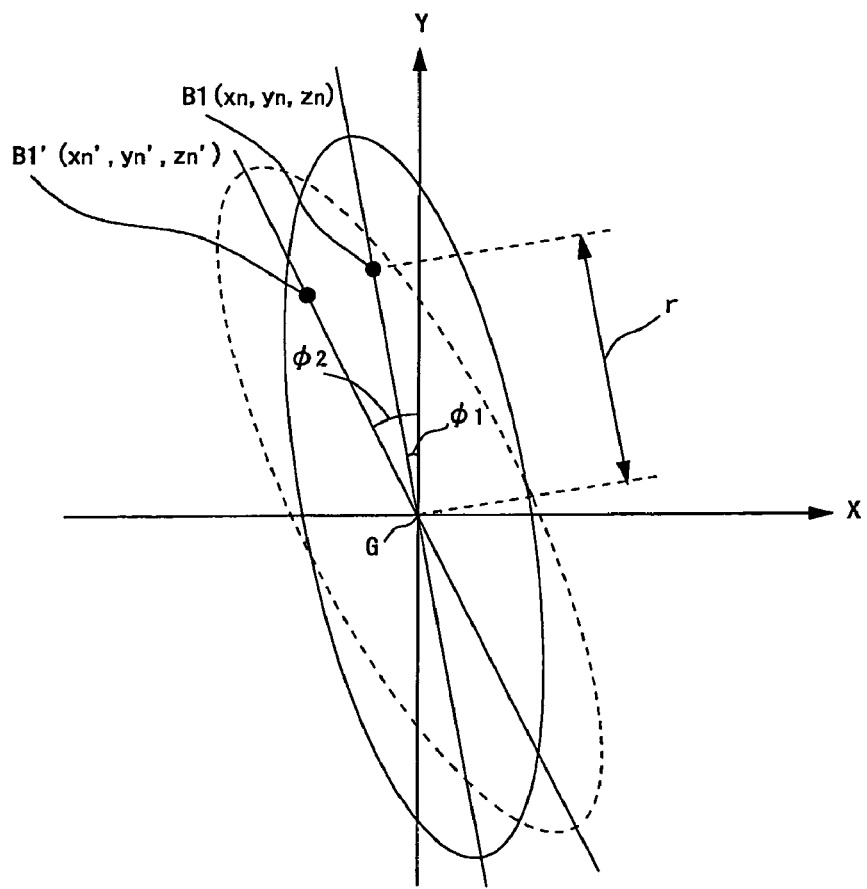
FIG. 9 is a diagram for illustrating how to calculate displacement on an optional coordinate caused by Yawing motion in the first embodiment of the present invention.

As shown in FIG. 9, the displacement on a hull optional coordinate caused by the Yawing motion is the displacement caused by oscillation on the XY plane where the X axis is set in the cross direction of the hull on the horizon, the Y axis is set in the travelling direction of the hull on the horizon, and the Z axis is set perpendicular on the vertical plane on the XYZ rectangular coordinates with the center coordinate G for the hull Yawing motion on the XY plane being the origin. For example, the displacement ($\Delta X_{Yaw}$, $\Delta Y_{Yaw}$, $\Delta Z_{Yaw}$) caused by the Yawing motion, in which a point B1 ($x_n$, $y_n$, $z_n$) on the XY plane moves to a point B1' ($x_n'$, $y_n'$, $z_n'$) on the same XY plane, is represented by the formula (5) below.

$$(\Delta X_{Yaw}, \Delta Y_{Yaw}, \Delta Z_{Yaw}) = (x_n' - x_n, y_n' - y_n, z_n' - z_n) = [r(\sin(\phi_1 + \phi_2) - \sin\phi_1), r(\cos(\phi_1 + \phi_2) - \cos\phi_1), 0] \quad (5)$$

Here, r is the distance between the center coordinate G and the point B1 and the distance between the center coordinate G and the point B1' on the XY plane, $\phi_1$ is the angle formed by the line between the center coordinate G and the point B1 and the Y axis, and $\phi2$ is the angle formed by the line between the center coordinate G and the point B1' and the Y axis.

(C) Displacement on a Hull Optional Coordinate Caused by the Pitching Motion

Figure 10:
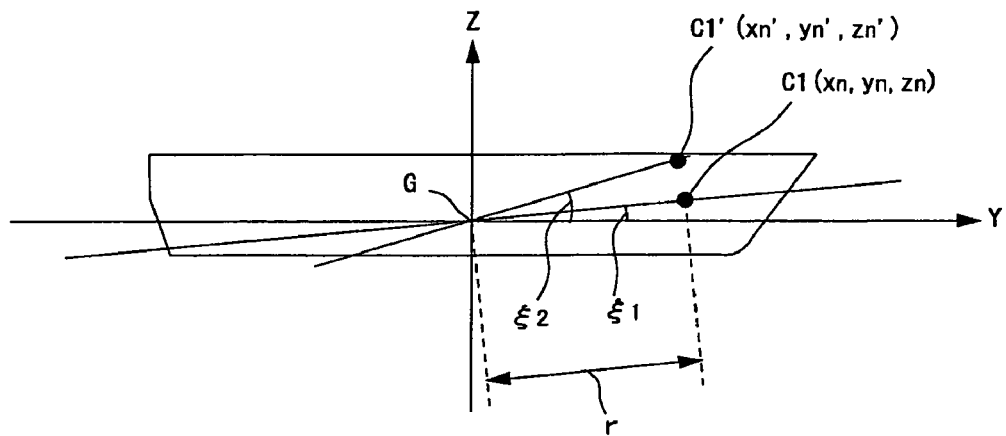
FIG. 10 is a diagram for illustrating how to calculate displacement on an optional coordinate caused by Pitching motion in the first embodiment of the present invention.

As shown in FIG. 10, the displacement on a hull optional coordinate caused by the Pitching motion is the displacement caused by oscillation on the YZ plane where the X axis is set in the cross direction of the hull on the horizon, the Y axis is set in the travelling direction of the hull on the horizon, and the Z axis is set perpendicular on the vertical plane on the XYZ rectangular coordinates with the center coordinate G for the hull Pitching motion on the YZ plane being the origin. For example, the displacement ($\Delta X_{Pitch}$, $\Delta Y_{Pitch}$, $\Delta Z_{Pitch}$) caused by the Pitching motion, in which a point C1 ($x_n$, $y_n$, $z_n$) on the YZ plane moves to a point C1' $(x_n', y_n', z_n')$ on the same YZ plane, is represented by the formula (6) below.

$$(\Delta X_{Pitch}, \Delta Y_{Pitch}, \Delta Z_{Pitch}) = (x_n' - x_n, y_n' - y_n, z_n' - z_n) = [0, r(\sin(\xi_1 + \xi_2) - \sin\xi_1), r(\cos(\xi_1 + \xi_2) - \cos\xi_1)] \quad (6)$$

Here, r is the distance between the center coordinate G and the point C1 and the distance between the center coordinate G and the point C1' on the YZ plane, $\xi_1$ is the angle formed by the line between the center coordinate G and the point C1 and the Y axis, and $\xi_2$ is the angle formed by the line between the center coordinate G and the point C1' and the Y axis.

(D) Displacement on a Hull Optional Coordinate Caused by the Surging Motion

Figure 11:
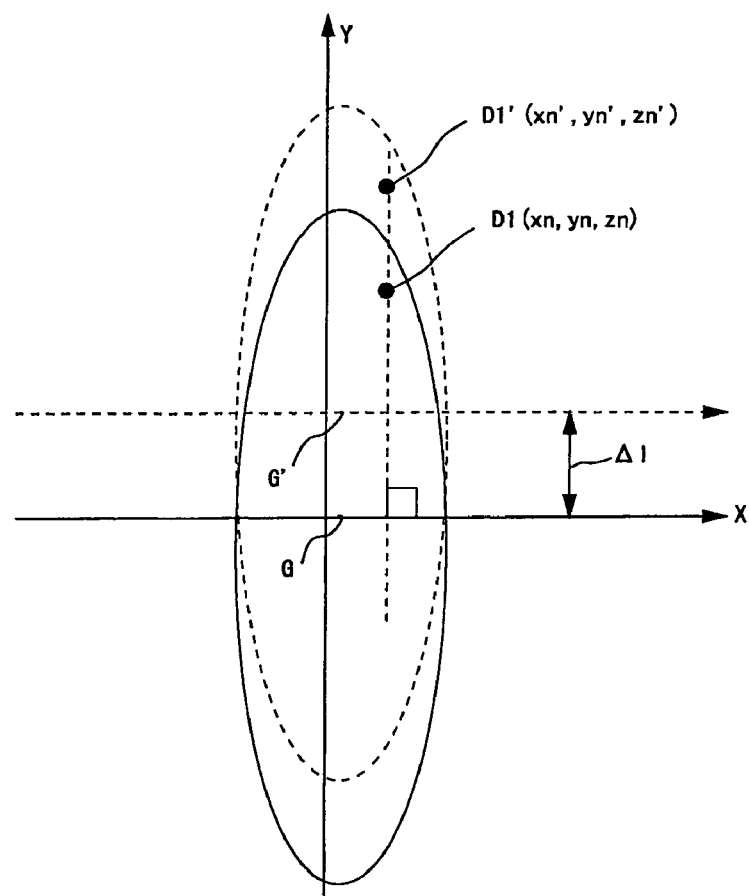
FIG. 11 is a diagram for illustrating how to calculate displacement on an optional coordinate caused by Surging motion in the first embodiment of the present invention.

As shown in FIG. 11, the displacement on a hull optional coordinate caused by the Surging motion is the displacement caused by oscillation on the XY plane where the X axis is set in the cross direction of the hull on the horizon, the Y axis is set in the travelling direction of the hull on the horizon, and the Z axis is set perpendicular on the vertical plane on the XYZ rectangular coordinates with the center coordinate G for the hull Surging motion on the XY plane being the origin. For example, the displacement $(\Delta X_{Surge}, \Delta Y_{Surge}, \Delta Z_{Surge})$ caused by the Surging motion, in which a point D1 $(x_n, y_n, z_n)$ on the XY plane moves to a point D1' $(x_n', y_n', z_n')$ on the same XY plane, is represented by the formula (7) below.

$$(\Delta X_{Surge}, \Delta Y_{Surge}, \Delta Z_{Surge}) = (x_n' - x_n, y_n' - y_n, z_n' - z_n) = (0, \Delta l, 0) \quad (7)$$

Here, $\Delta l$ is the displacement in the direction of the Y axis.

(E) Displacement on a Hull Optional Coordinate Caused by the Swaying Motion

Figure 12:
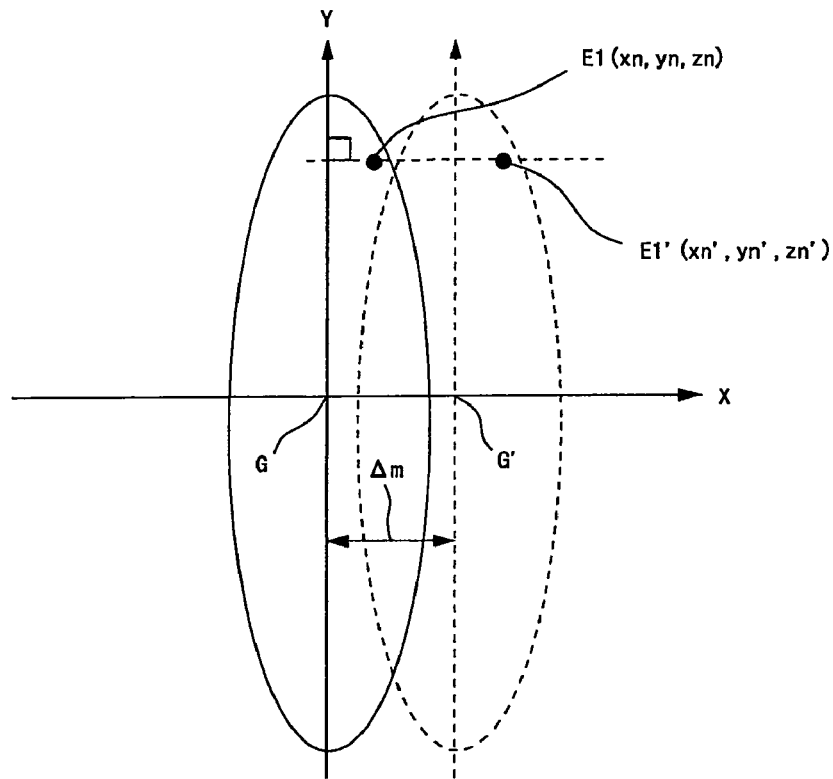
FIG. 12 is a diagram for illustrating how to calculate displacement on an optional coordinate caused by Swaying motion in the first embodiment of the present invention.

As shown in FIG. 12, the displacement on a hull optional coordinate caused by the Swaying motion is the displacement caused by oscillation on the XY plane where the X axis is set in the cross direction of the hull on the horizon, the Y axis is set in the travelling direction of the hull on the horizon, and the Z axis is set perpendicular on the vertical plane on the XYZ rectangular coordinates with the center coordinate G for the hull Swaying motion on the XY plane being the origin. For example, the displacement $(\Delta Z_{Sway}, \Delta Z_{Sway})$ caused by the Swaying motion, in which a point E1 $(x_n, y_n, z_n)$ on the XY plane moves to a point E1' $(x_n', y_n', z_n')$ on the same XY plane, is represented by the formula (8) below.

$$(\Delta X_{Sway}, \Delta Y_{Sway}, \Delta Z_{Sway}) = (x_n' - x_n, y_n' - y_n, z_n' - z_n) = (\Delta m, 0, 0) \quad (8)$$

Here, $\Delta m$ is the displacement in the direction of the X axis.

(F) Displacement on a Hull Optional Coordinate Caused by the Heaving Motion

Figure 13:
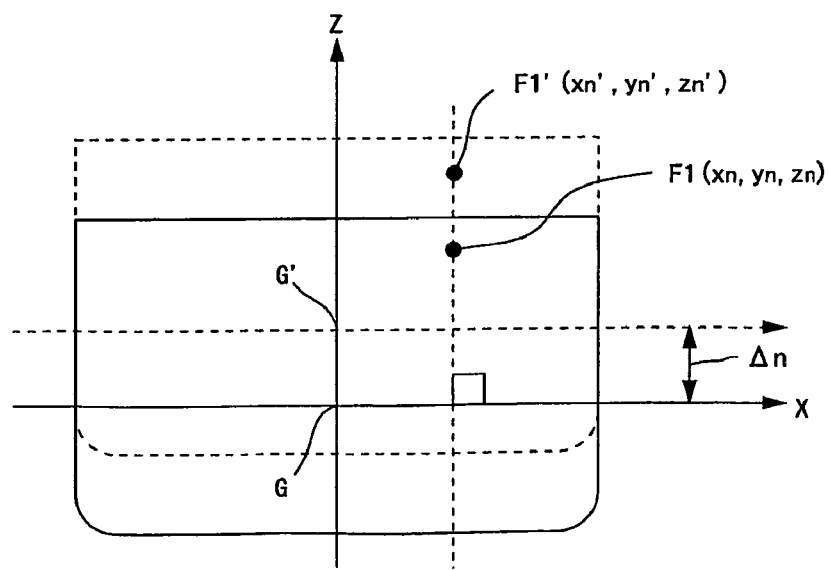
FIG. 13 is a diagram for illustrating how to calculate displacement on an optional coordinate caused by Heaving motion in the first embodiment of the present invention.

As shown in FIG. 13, the displacement on a hull optional coordinate caused by the Heaving motion is the displacement caused by oscillation on the XZ plane where the X axis is set in the cross direction of the hull on the horizon, the Y axis is set in the travelling direction of the hull on the horizon, and the Z axis is set perpendicular on the vertical plane on the XYZ rectangular coordinates with the center coordinate G for the hull Heaving motion on the XZ plane being the origin. For example, the displacement $(\Delta X_{Heave}, \Delta Y_{Heave}, \Delta Z_{Heave})$ caused by the Heaving motion, in which a point F1 $(x_n, y_n, z_n)$ on the XZ plane moves to a point F1' $(x_n', y_n', z_n')$ on the same XZ plane, is represented by the formula (9) below.

$$(\Delta X_{Heave}, \Delta Y_{Heave}, \Delta Z_{Heave}) = (x_n', y_n', z_n') = (0, 0, \Delta n) \quad (9)$$

Here, $\Delta n$ is the displacement in the direction of the Z axis.

(G) The Three-Dimensional Posture Resulted from the Hull Motion on The Optional Coordinate on the Hull $(x_n, y_n, z_n)$ is Represented by the Formula (10) Based on the Formulae (4) to (9).

$$(X_n + \Delta X, Y_n + \Delta Y, Z_n + \Delta Z) = (\Delta X_{Roll} + \Delta X_{Yaw} + \Delta X_{Pitch} + \Delta X_{Surge} + \Delta X_{Sway} + \Delta X_{Heave}, \Delta Y_{Roll} + \Delta Y_{Yaw} + \Delta Y_{Pitch} + \Delta Y_{Surge} + \Delta Y_{Sway} + \Delta Y_{Heave}, \Delta Z_{Roll} + \Delta Z_{Yaw} + \Delta Z_{Pitch} + \Delta Z_{Surge} + \Delta Z_{Sway} + \Delta Z_{Heave}) = [r(\sin(\theta_1 + \theta_2) - \sin\theta_1) + r(\sin(\phi_1 + \phi_2) - \sin\phi_1) + \Delta m, r(\cos(\phi_1 + \phi_2) - \cos\phi_1) + r(\sin(\xi_1 + \xi_2) - \sin\xi_1) + \Delta l, r(\cos(\theta_1 + \theta_2) - \cos\theta_1) + r(\cos(\xi_1 + \xi_2) - \cos\xi_1) + \Delta n] \quad (10)$$

Figure 14:
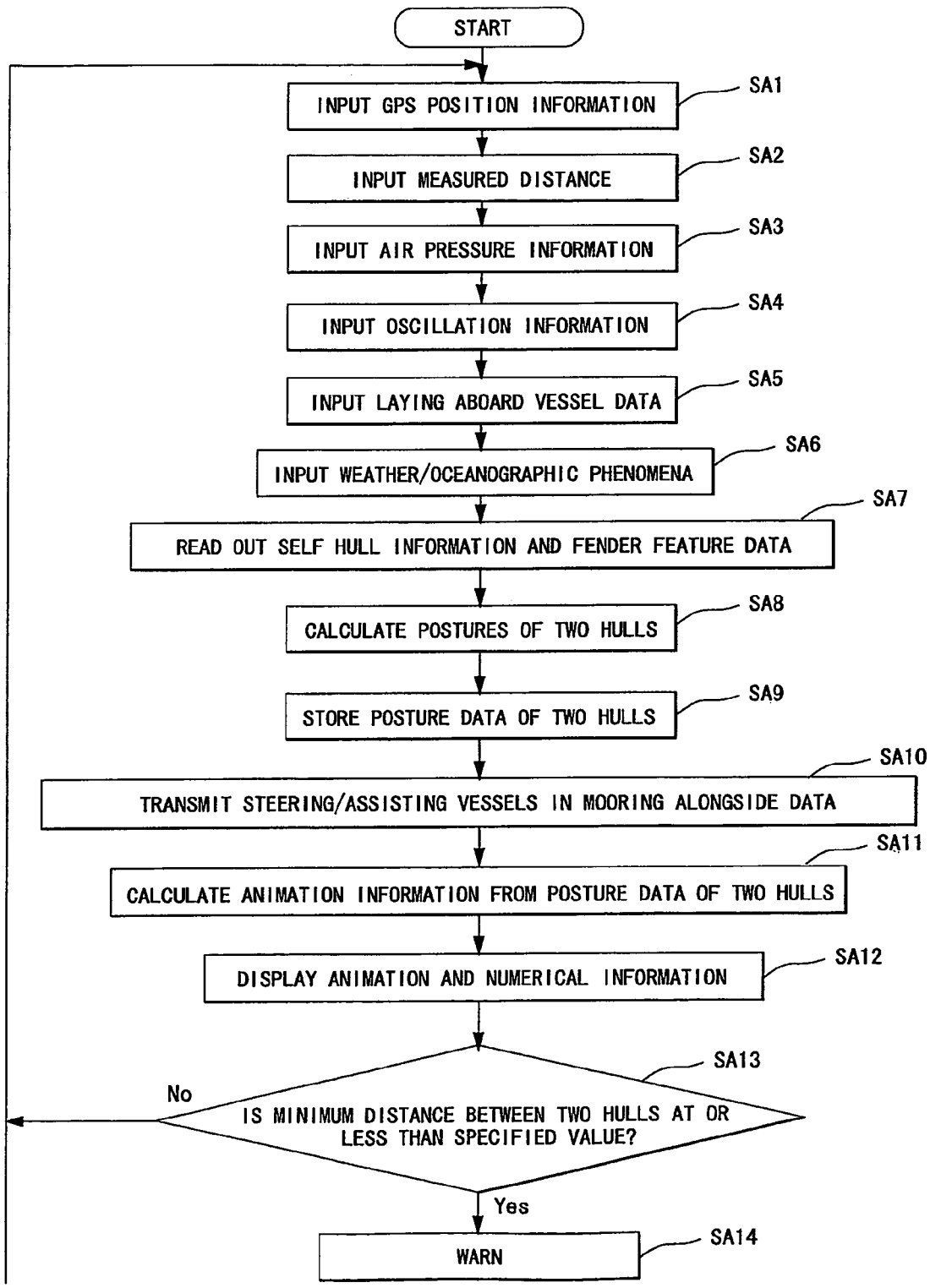
FIG. 14 is a flowchart for illustrating processing performed by a calculating device provided for the first vessel in the first embodiment of the present invention.
Figure 15:
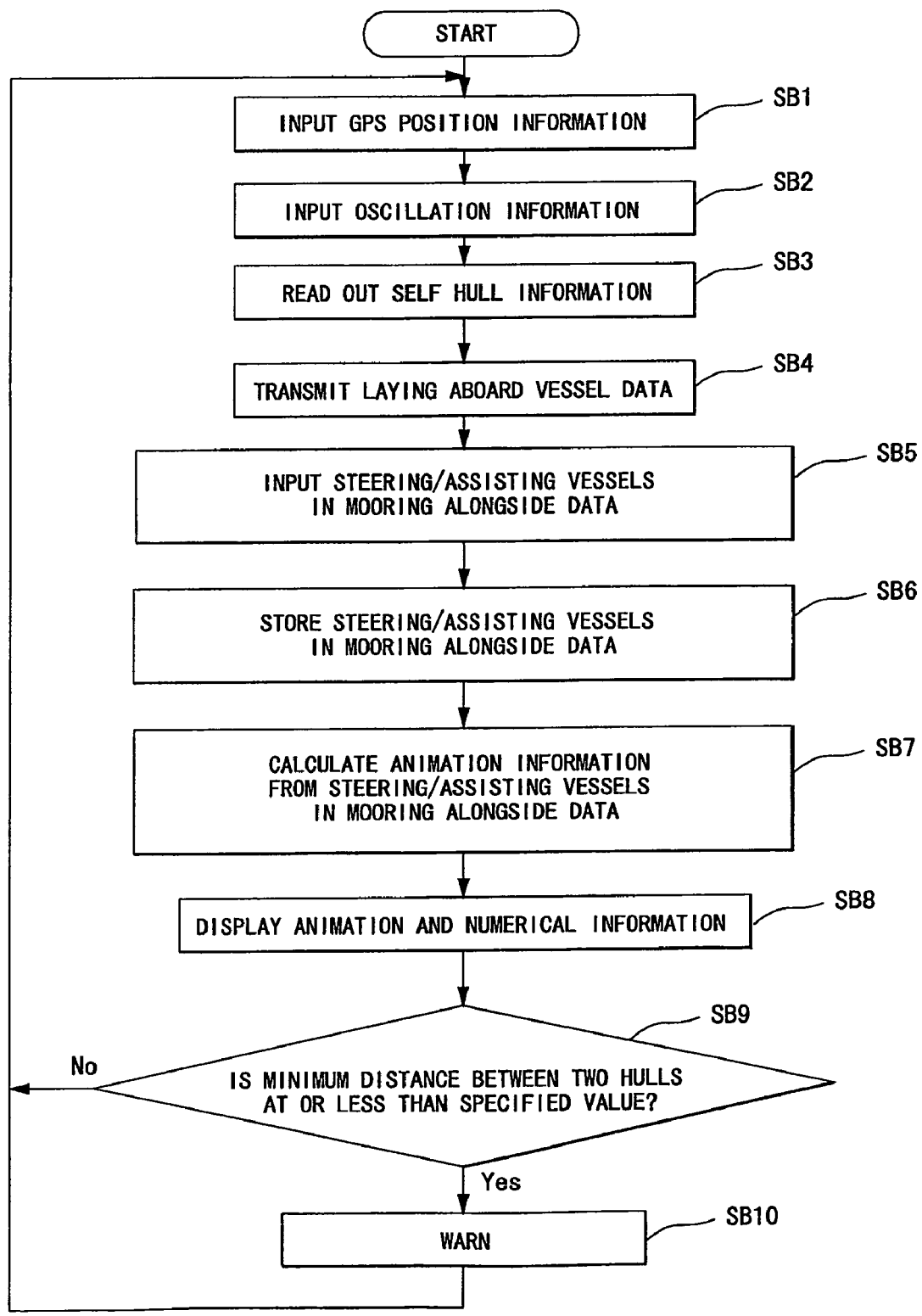
FIG. 15 is a flowchart for illustrating processing performed by a calculating device provided for the second vessel in the first embodiment of the present invention.
Figure 16:
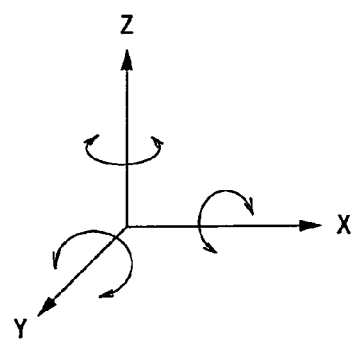
FIG. 16 is a rectangular coordinate for illustrating oscillation of the vessel in the first embodiment of the present invention.

Now, an operation performed by the system according to the embodiment with the abovementioned configuration will be described with reference to the flowcharts shown in FIG. 14 and FIG. 15. FIG. 14 is a flowchart for illustrating processing performed by the calculating device 108 provided for the first vessel 1, and FIG. 15 is a flowchart for illustrating processing performed by the calculating device 205 provided for the second vessel 2.

When the calculating device 108 provided for the first vessel 1 starts the operation, it inputs the coordinate data on the predetermined reference point of the first vessel 1 detected by the GPS receiver 101, information on the distances information measured by the distance measuring devices 11A to 11C, the air pressure data obtained by the air pressure data receiver 104, the displacement data detected by the oscillation detecting device 105, the laying aboard vessel data obtained by the laying aboard vessel data receiver 102, and the weather/oceanographic phenomena data obtained by the weather/oceanographic phenomena information receiver 106 (SA1 to SA6), and also inputs information on the self hull stored in the storing device 107, i.e., coordinate data on the outside plating shape of the self hull, the coordinate data on the installed positions of the distance measuring devices 11A to 11C, the fender feature data which is data related to a size, the steady state air pressure data, a compressed amount, reaction, and absorbed energy, and the coordinate data of the installed position and the outer shape data of each of the fenders 12A to 12D (SA7).

Next, the calculating device 108 calculates physical relationship between the hull of the first vessel 1 and the hull of the second vessel 2, i.e., the three-dimensional postures of the two hulls as well as the states of the fenders 12A to 12D in the form of numerical data based on the input information MO and stores the postures data of the two hulls and the state data (numerical data) of the fenders 12A to 12D in the storing device 107 (SA9), and transmits the data to the second vessel 2 via the steering/assisting vessels in mooring alongside data transmitter 111 as the steering/assisting vessels in mooring alongside data by radio waves of a predetermined frequency (SA10).

When the calculating device 108 is to calculate the three-dimensional postures of the two hulls in the form of numerical data, it can calculate the posture of the first vessel 1 in the form of coordinate data by moving each coordinate of the outside plating shape of the hull of the first vessel 1 based on the first vessel 1 oscillation information with the position of the predetermined reference point obtained by the GPS receiver 101 of the first vessel 1 being the origin. It can calculate the posture of the second vessel 2 in the form of coordinate data by moving each coordinate of the outside plating shape of the hull of the second vessel 2 based on the second vessel 2 oscillation information with the position of the predetermined reference point obtained by the GPS receiver 201 of the second vessel 2 being the origin. In addition, it can correct the coordinates of the outside plating shape of each hull based on the distance data measured by the distance measuring devices 11A to 11C and the air pressure data of the fenders 12A to 12D when the hull of the first vessel 1 and the hull of the second vessel 2 approach. When the two hulls approach, pressing the fenders 12A to 12D, the inner air pressures of the fenders 12A to 12D increase. Thus, the calculating device 108 can perform the correction based on the air pressure data of the fenders 12A to 12D more exactly by using the compressed amount which is converted from the increasing rate of the inner air pressures of the fenders 12A to 12D, as the shape data and the steady state air pressure data of the fenders 12A to 12D are already known.

Figure 17:
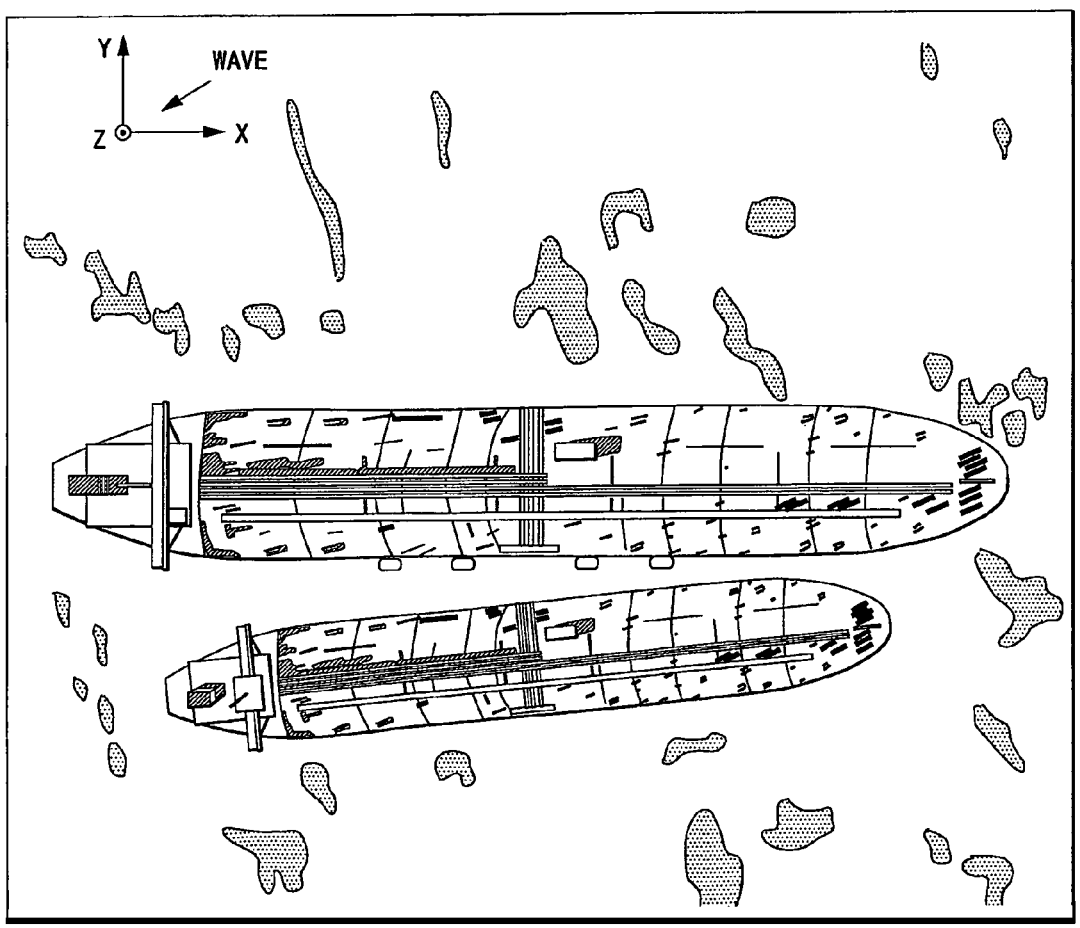
FIG. 17 is a diagram showing an example of an animation in the first embodiment of the present invention.
Figure 18:
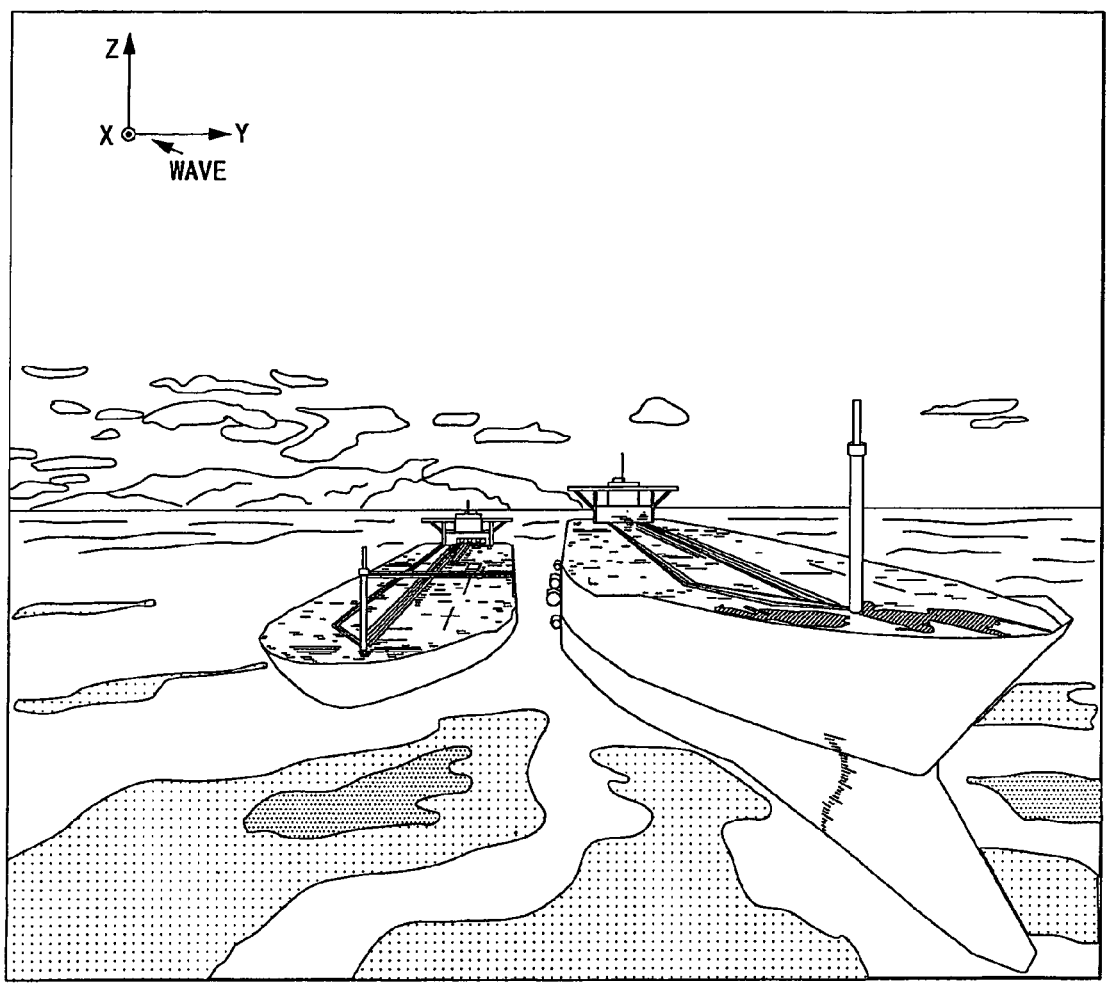
FIG. 18 is a diagram showing an example of an animation in the first embodiment of the present invention.
Figure 19:
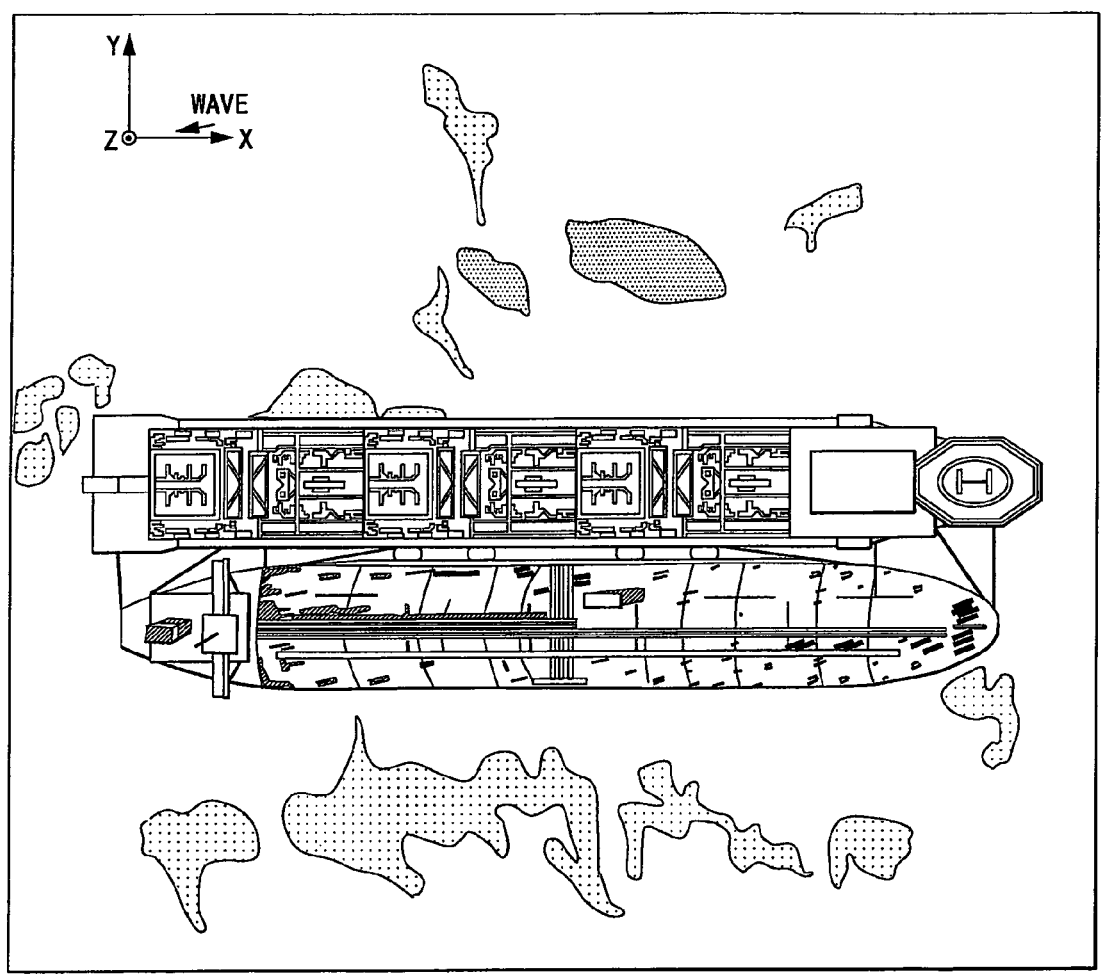
FIG. 19 is a diagram showing an example of an animation in the first embodiment of the present invention.
Figure 20:
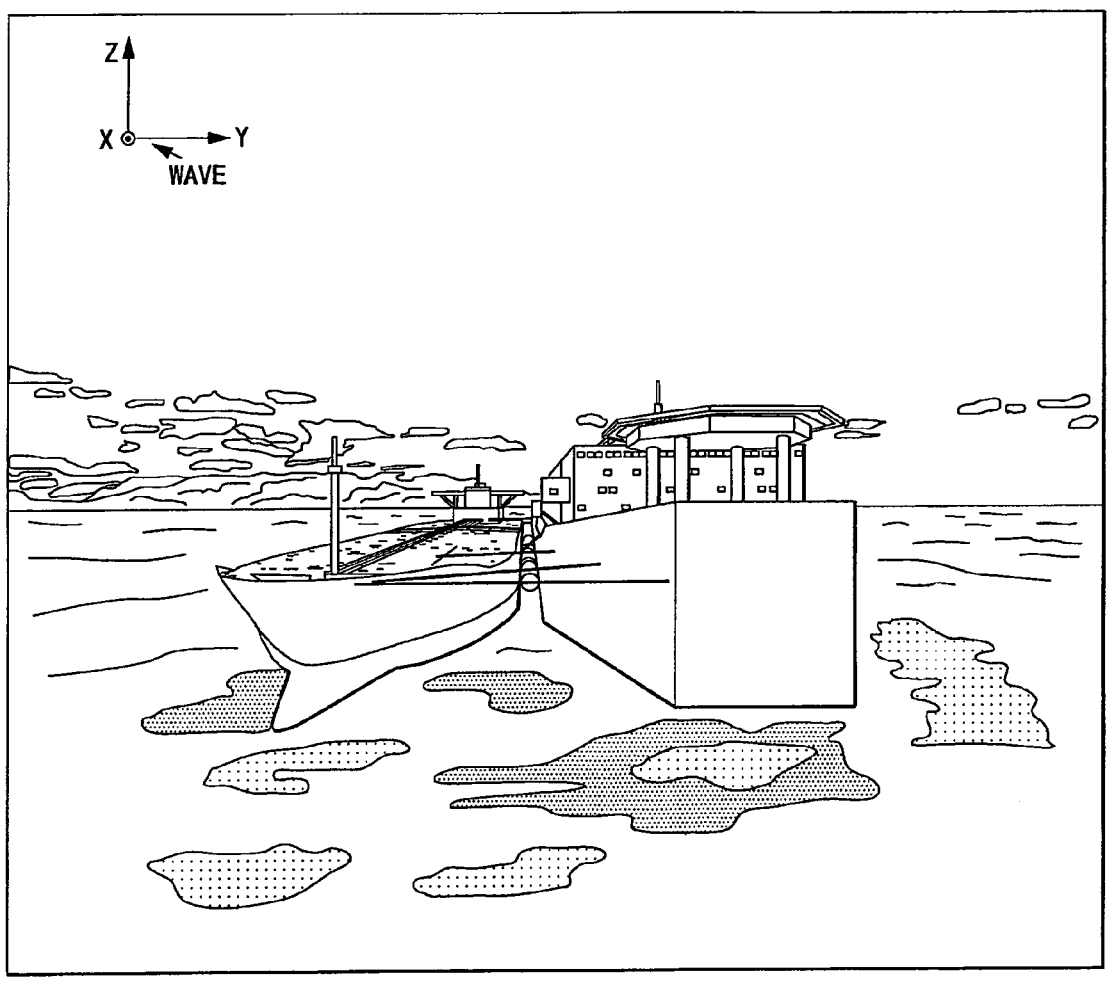
FIG. 20 is a diagram showing an example of an animation in the first embodiment of the present invention.
Figure 21:
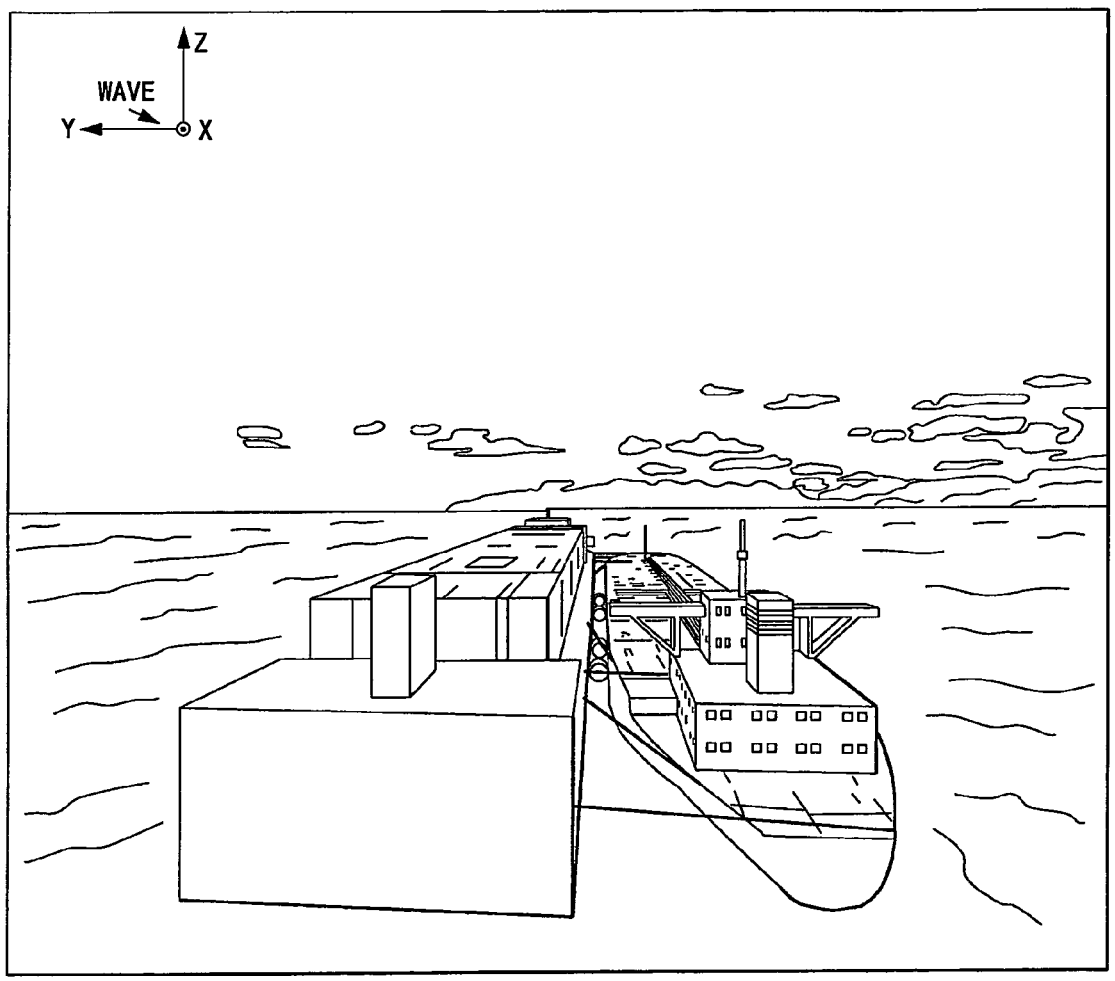
FIG. 21 is a diagram showing an example of an animation in the first embodiment of the present invention.

Then, the calculating device 108 calculates color animation data from the abovementioned calculated posture data of the two hulls and the state data of the fenders 12A to 12D and stores the data in the storing device 107 (SA11), and outputs the numerical data and the animation data to the display device 110. As a result, the display device 110 displays the numerical data and such animations taken when the vessels are laying aboard as shown in FIGS. 17 and 18 (SA12). When the calculating device 108 calculates the animation data, it changes the eye point of the animation according to a command input from the operating device 109. When the first vessel 1 is an ocean base and the two vessels are mooring alongside for loading cargos, such animations as shown from FIG. 19 to FIG. 21 are displayed. The animation may include the XYZ rectangular coordinate and the direction of waves and the like based on the weather/oceanographic phenomena information.

Next, the calculating device 108 determines whether the minimum distance between the hulls of the first vessel 1 and the second vessel 2 is less than a predetermined specified value or not based on the abovementioned calculated numerical data (SA13). If the distance is not less than the specified value, the operation returns to the SA1 process where the abovementioned processing is repeated. If the distance is less than the specified value, it is decided that the two hulls are too close to each other and the warning is displayed on the display device 110 (SA14), and then the operation returns to the SA1 process where the abovementioned processing is repeated.

As mentioned above, the display device 110 displays the postures of the first vessel 1 and the second vessel 2 as well as the states of the fenders 12A to 12D by means of the numerical data and animations. As the eye point of the animation can be changed as required according to a command from the operating device 109, the operator of the first vessel 1 can steer the first vessel 1 with reference to the numerical data and the animations.

When the calculating device 205 provided for the second vessel 2 starts the operation, it inputs the coordinate data on the predetermined reference point of the second vessel 2 that is detected by the GPS receiver 201 and displacement data that is detected by the oscillation detecting device 202 (SB1, SB2), and also inputs the self hull information stored in the storing device 204, i.e., coordinate data on the outside plating shape of the self hull (SB3).

Next, the calculating device 205 transmits the input information, i.e., the coordinate data on a predetermined reference point of the second vessel 2 that is detected by the GPS receiver 201, the displacement data that is detected by the oscillation detecting device 202, and the coordinate data on the outside plating shape of the self hull that is stored in the storing device 204 to the first vessel 1 as the laying aboard vessel data via the laying aboard vessel data transmitter 208 by radio waves of a predetermined frequency (SB4).

Then, the calculating device 205A inputs steering/assisting vessels in mooring alongside data (posture data of the two hulls and the state data of the fenders 12A to 12D (numerical data)) via the steering/assisting vessels in mooring alongside data receiver 203 (SB5), stores the data in the storing device 204 (SB6), calculates color animation data from the steering/assisting vessels in mooring alongside data and stores the data in the storing device 204 (SB7), and outputs the numerical data and the animation data to the display device 207. As a result, the display device 207 displays the numerical data and such animations as shown in FIGS. 17 and 18 (SB8). When the calculating device 205A calculates the animation data, it changes the eye point of the animation according to a command input from the operating device 206. When the first vessel 1 is an ocean base and the two vessels are mooring alongside for loading cargos, such animations as shown from FIG. 19 to FIG. 21 are displayed. The animation may include the XYZ rectangular coordinate and the direction of waves and the like based on the weather/oceanographic phenomena information.

Next, the calculating device 205A determines whether the minimum distance between the hulls of the first vessel 1 and the second vessel 2 is less than a predetermined specified value or not based on the abovementioned calculated numerical data (SB9). If the distance is not less than the specified value, the operation returns to the SB1 process where the abovementioned processing is repeated. If the distance is less than the specified value, it is decided that the two hulls are too close to each other and the warning is displayed on the display device 207 (SB10), and then the operation returns to the SB1 process where the abovementioned processing is repeated.

As mentioned above, the display device 207 displays the postures of the first vessel 1 and the second vessel 2 as well as the states of the fenders 12A to 12D by means of the numerical data and animations. As the eye point of the animation can be changed as required according to a command from the operating device 206, the operator of the second vessel 2 can steer the second vessel 2 with reference to the numerical data and the animations.

In addition, the operator can make the obtained air pressure data of the fenders 12A to 12D converted into compressed amount, reaction, and absorbed energy of the fenders 12A to 12D and output them to the display devices 110 and 207 for monitoring the information.

Accordingly, the operators of the first vessel 1 and the second vessel 2 can easily plan steering of their vessels with reference to the information on the physical relationship between the hull of the first vessel 1 and the hull of the second vessel 2 and the information on the states of the fenders 12A to 12D which are respectively displayed on the display devices 110 and 207. Therefore, the operators can avoid laying the vessels aboard too close proximity to each other so as to prevent the hulls from damaging each other as the fenders 12A to 12D placed between the vessels break or the vessels clash when the two vessels such as oil tankers are laid aboard for loading cargoes on the sea with such an operation as STS or FPSO. The operators can also monitor the states of the fenders 12A to 12D night and day.

The embodiment may be adapted to assist an operator in steering a vessel by only calculating the numerical data and displaying the data without calculating the animation data. Alternatively, the embodiment may be adapted to assist an operator in steering a vessel by only displaying an animation.

Although the information on the fenders 12A to 12D is displayed on the display devices 110 and 207 in the embodiment, the embodiment may be adapted to display only the information on the physical relationship between the first vessel 1 and the second vessel 2 without displaying the information on the states of the fenders 12A to 12D.

Now, a second embodiment of the present invention will be described.

Figure 22:
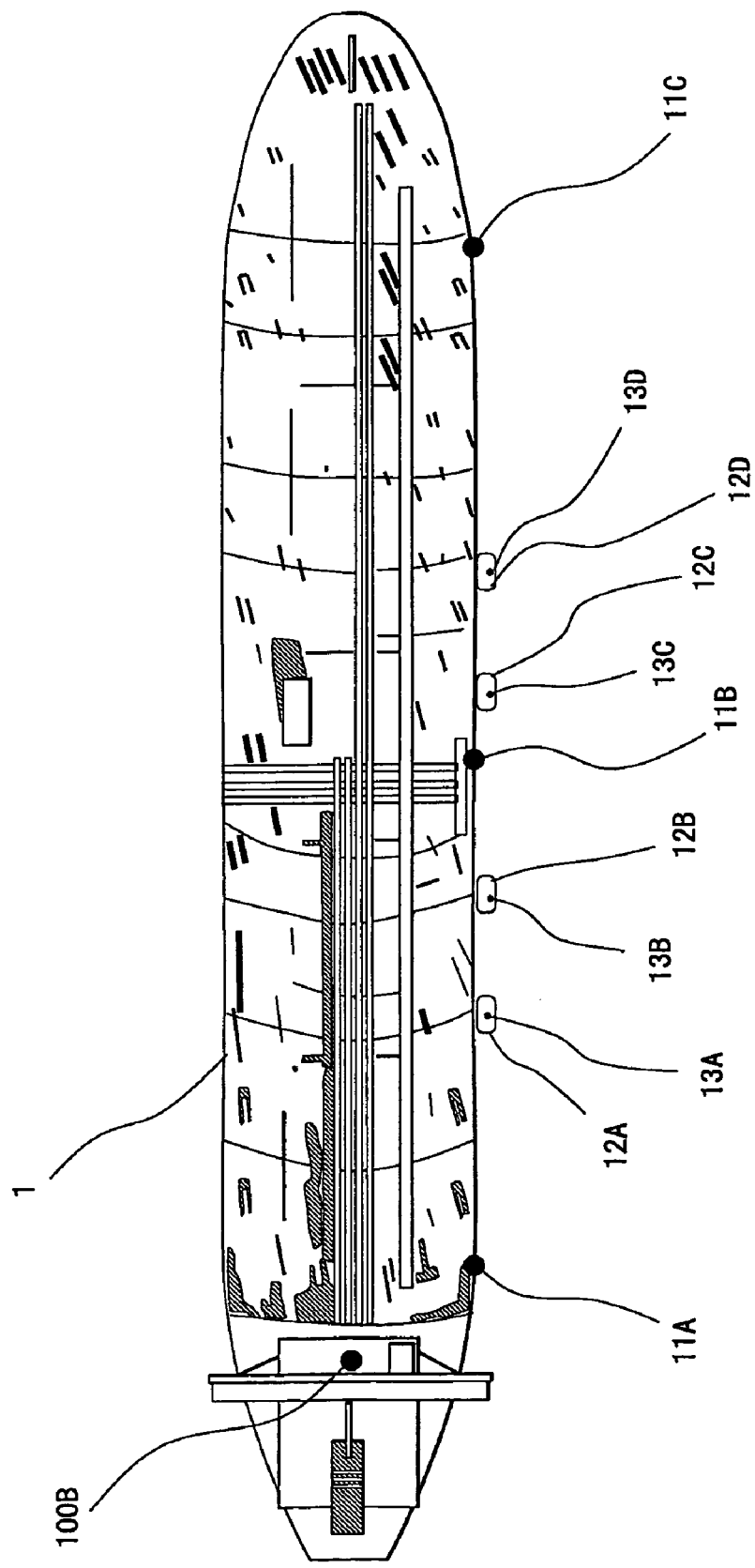
FIG. 22 is a diagram showing arrangement of devices in a first vessel in the second embodiment of the present invention.
Figure 23:
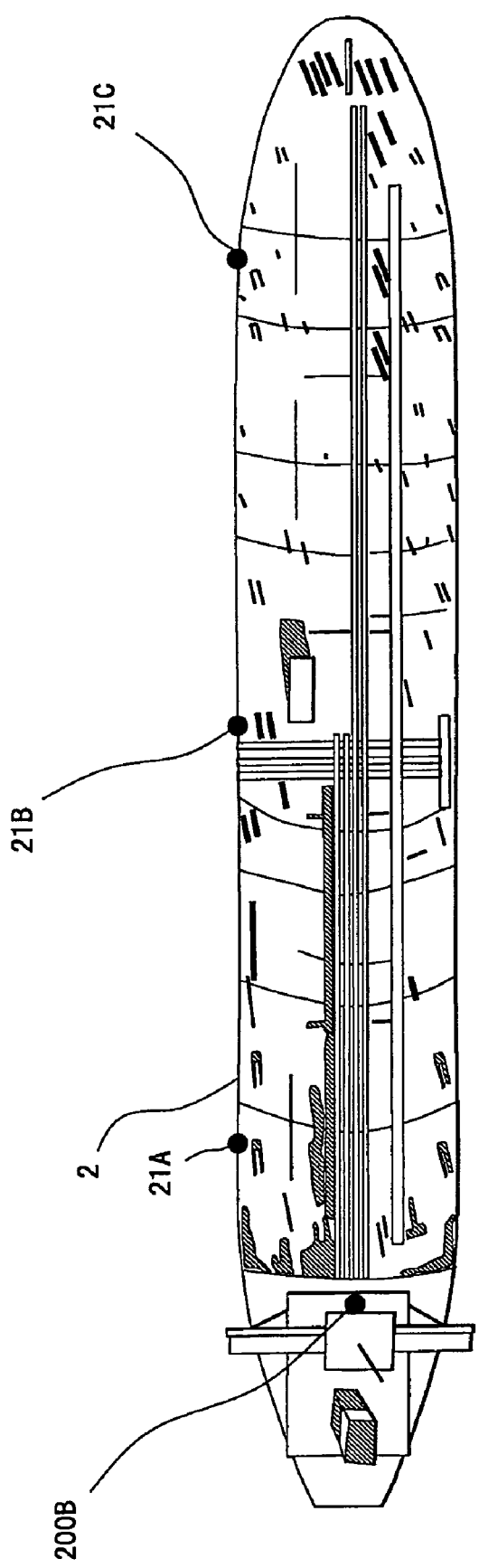
FIG. 23 is a diagram showing arrangement of devices in a second vessel in the second embodiment of the present invention.
Figure 24:
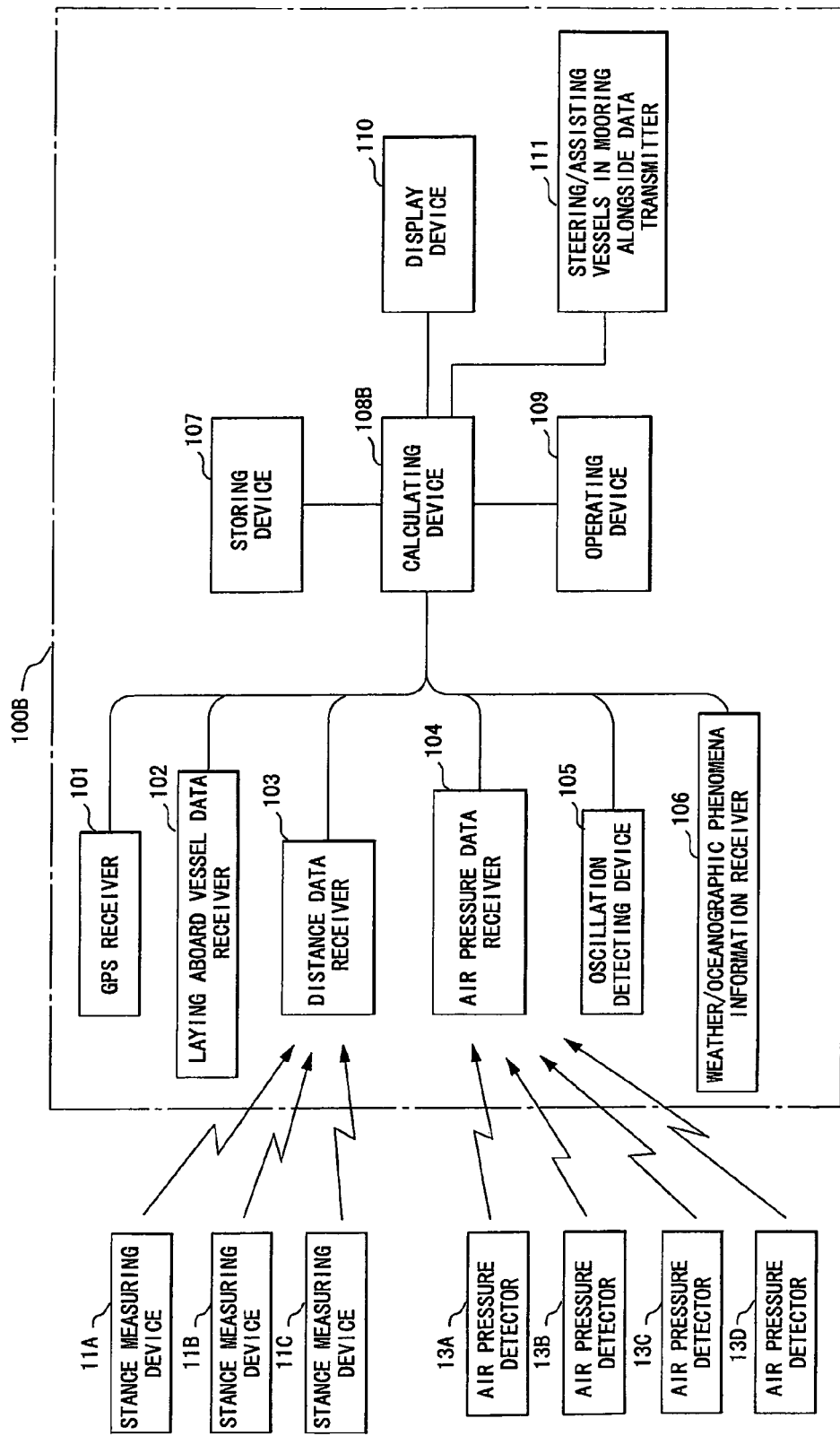
FIG. 24 is a block diagram showing configuration of a main device mounted on the first vessel in the second embodiment of the present invention.
Figure 25:
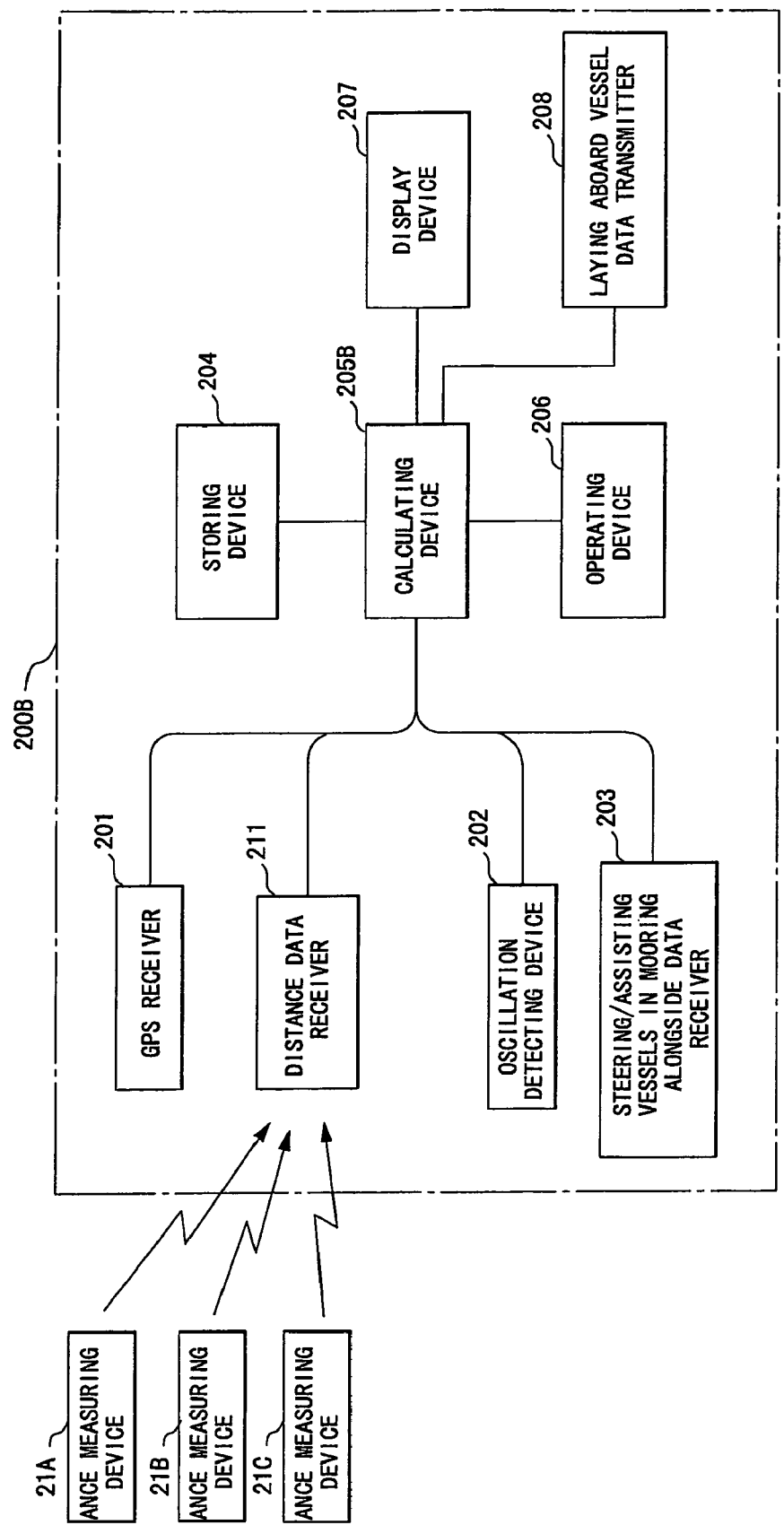
FIG. 25 is a block diagram showing configuration of a main device mounted on the second vessel in the second embodiment of the present invention.

FIG. 22 to FIG. 25 are diagrams showing configuration of a system for assisting steering and mooring alongside of vessels in the second embodiment of the present invention. FIG. 22 is a diagram showing arrangement of devices in a first vessel. FIG. 23 is a diagram showing arrangement of devices in a second vessel. FIG. 24 is a block diagram showing configuration of a main device mounted on the first vessel. FIG. 25 is a block diagram showing configuration of a main device mounted on the second vessel. The same components as those in the first embodiment described above are denoted by the same reference numerals and omitted from the description.

As shown in FIG. 22, the first vessel 1 has a main device 100B in its vessel steering room, and three distance measuring devices 11A to 11C and four fenders 12A to 12D on the starboard, to which the second vessel 2 is to lay aboard.

The first distance measuring device 11A is provided at a predetermined position near the stern, the second distance measuring device 11B is provided at a predetermined position in the center, and the third distance measuring device 11C is provided at a predetermined position at the bow. These units of the distance measuring devices 11A to 11C are for measuring a distance from the second vessel 2 to be laid aboard, using a laser displacement gauge or an ultrasonic range finder, for example. Each of the distance measuring devices 11A to 11C transmits the measured distance data to the main device 100B with the unit identification information unique to each of the distance measuring device by radio waves of a predetermined frequency or via a communication cable. The distance measuring device 11 is preferably provided at two or more places on the hull including the stern and the bow.

The fenders 12A to 12D are well-known air fenders, respectively including air pressure detectors 13A to 13D inside, which is for detecting an inner air pressure, and transmitting the detected air pressure data to the main device 100B with the unit identification information unique to each fender (air pressure detector) by radio waves of a predetermined frequency or via a communication cable. As it is conventionally known, the fenders 12A to 12D are arranged with a predetermined distance therebetween to prevent the first vessel 1 from clashing against the second vessel 2. The number of the fenders 12 may depend on the situation.

As shown in FIG. 23, the second vessel 2 has a main device 200B in its vessel steering room, and three distance measuring devices 21A to 21C on the port, to which the first vessel 1 is to lay aboard. The first distance measuring device 21A is provided at a predetermined position near the stern, the second distance measuring device 21B is provided at a predetermined position in the center, and the third distance measuring device 21C is provided at a predetermined position at the bow. These units of the distance measuring devices 21A to 21C are for measuring a distance from the first vessel 1 to be laid aboard, using a laser displacement gauge or an ultrasonic range finder, for example. Each distance measuring devices 21A to 21C transmits the measured distance data to the main device 200B with the unit identification information unique to each of the distance measuring device by radio waves of a predetermined frequency or via a communication cable. The distance measuring device 21 is preferably provided at two or more places on the hull including the stern and the bow.

As shown in FIG. 24, the main device 100B provided for the first vessel 1 has almost the same configuration as that of the first embodiment except for having a calculating device 108B for performing processing different from that performed by the calculating device 108 in place of the calculating device 108.

As shown in FIG. 25, the main device 200B provided for the second vessel 2 has a GPS receiver 201, an oscillation detecting device 202, a steering/assisting vessels in mooring alongside data receiver 203, a storing device 204, a calculating device 205B, an operating device 206, a display device 207, a laying aboard vessel data transmitter 208, and a distance data receiver 211.

The distance data receiver 211 receives the distance data and the unit identification information transmitted from each of the distance measuring devices 21A to 21C and outputs them to the calculating device 205B with the distance data associated with the unit identification information.

The storing device 204 stores the coordinate data on an outside plating shape of the hull based on the abovementioned predetermined reference point as well as the identification information and coordinate data on the installed position of each of the distance measuring devices 21A to 21C as the self hull information.

The calculating device 205B is a well-known computer with almost the same configuration as that of the calculating device 205A in the first embodiment except for the processing. Specifically, the calculating device 205B stores the coordinate data on the predetermined reference point of the second vessel 2 detected by the GPS receiver 201, the displacement data detected by the oscillation detecting device 202 (oscillation information), distance data measured by the distance measuring devices 21A to 21C in the storing device 204, and also transmits the data stored in the storing device 204 to the first vessel 1 as the laying aboard vessel data via the laying aboard vessel data transmitter 208 by radio waves of a predetermined frequency. In addition, the calculating device 205B stores the steering/assisting vessel in mooring alongside data obtained by the steering/assisting vessel in mooring alongside data receiver 203 in the storing device 204, and also calculates physical relationship between the hull of the first vessel 1 and the hull of the second vessel 2 as well as the states of the fenders 12A to 12D as color animation data and outputs the numeric data and the animation data to the display device 207. The calculating device 205B changes the eye point of the animation according to a command input from the operating device 206.

Figure 26:
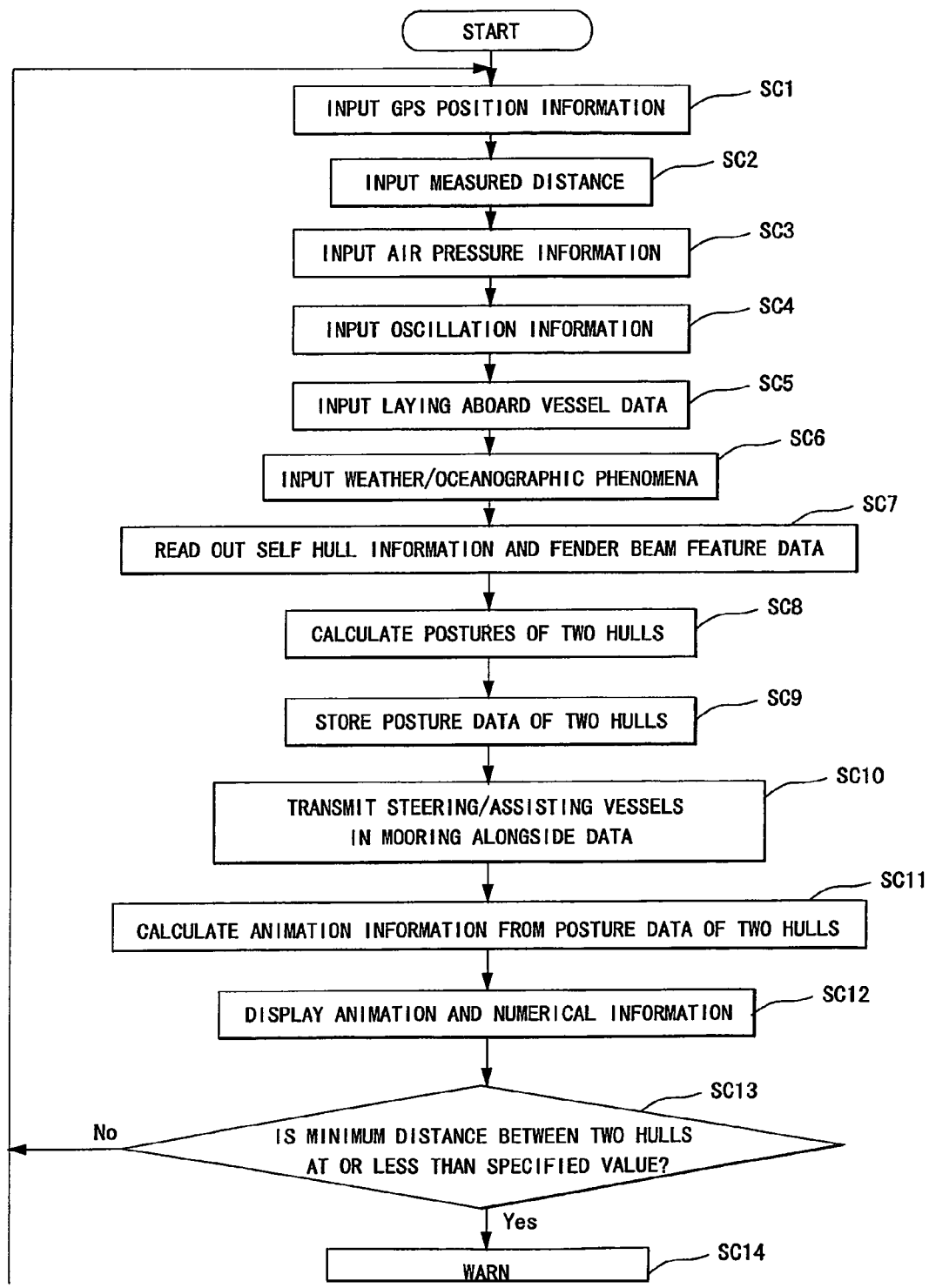
FIG. 26 is a flowchart for illustrating processing performed by a calculating device provided for the first vessel in the second embodiment of the present invention.
Figure 27:
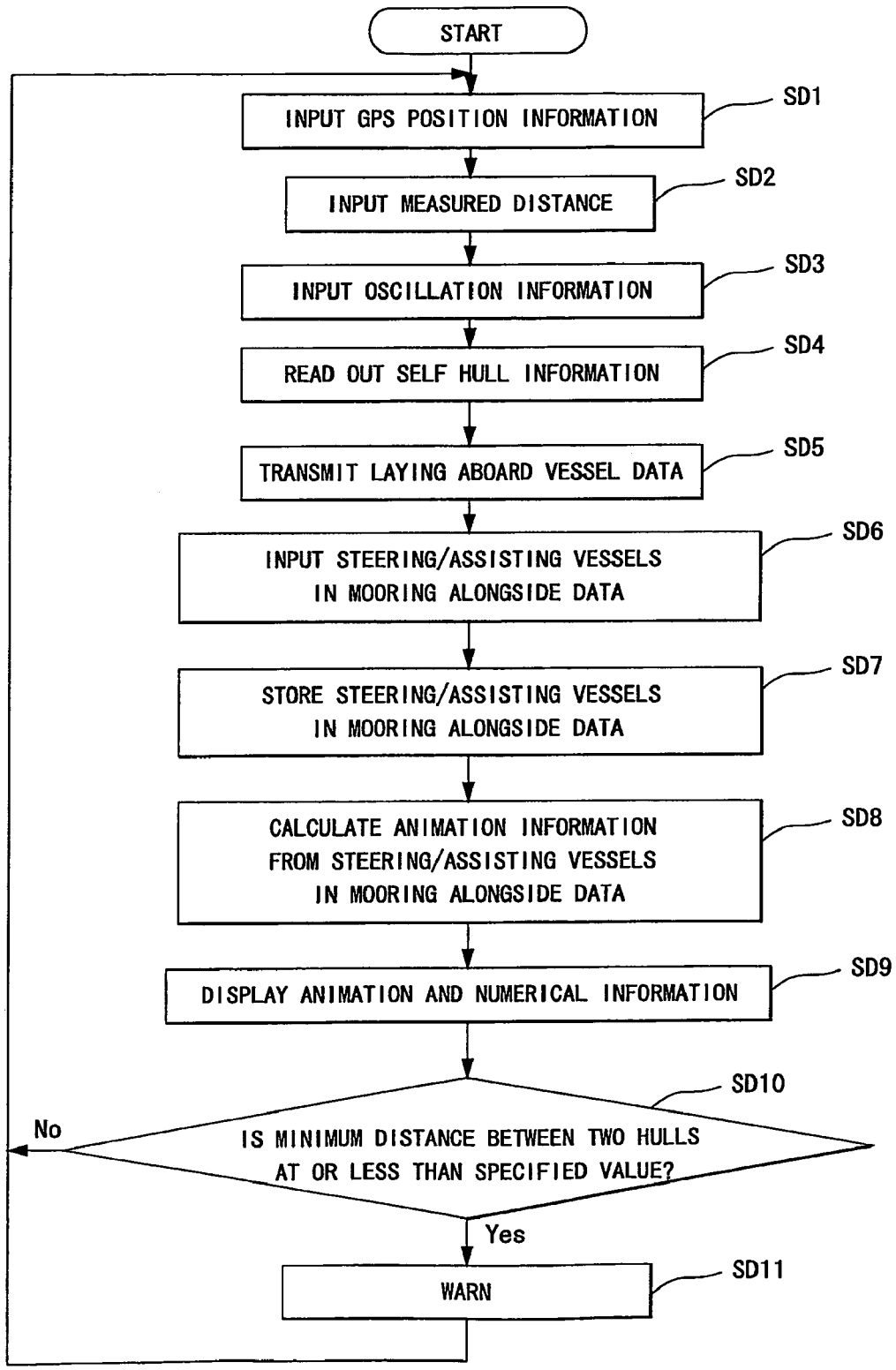
FIG. 27 is a flowchart for illustrating processing performed by a calculating device provided for the second vessel in the second embodiment of the present invention.

Now, an operation performed by the system according to the embodiment with the abovementioned configuration will be described with reference to the flowcharts shown in FIG. 26 and FIG. 27. FIG. 26 is a flowchart for illustrating processing performed by the calculating device 108B provided for the first vessel 1, and FIG. 27 is a flowchart for illustrating processing performed by the calculating device 205B provided for the second vessel 2.

When the calculating device 108B provided for the first vessel 1 starts the operation, it inputs the coordinate data on the predetermined reference point of the first vessel 1 detected by the GPS receiver 101, distance data measured by the distance measuring devices 11A to 11C, air pressure data obtained by the air pressure data receiver 104, displacement data detected by the oscillation detecting device 105, laying aboard vessel data obtained by the laying aboard vessel data receiver 102, and weather/oceanographic phenomena data obtained by the weather/oceanographic phenomena information receiver 106 (SC1 to SC6), and also inputs information on the self hull stored in the storing device 107, i.e., coordinate data on the outside plating shape of the self hull, coordinate data on the installed positions of the distance measuring devices 11A to 11C, the fender feature data which is data related to a size, steady state air pressure data, a compressed amount, reaction, and absorbed energy, and coordinate data of the installed position and outer shape data of each of the fenders 12A to 12D (SC7).

Next, the calculating device 108B calculates physical relationship between the hull of the first vessel 1 and the hull of the second vessel 2, i.e., the three-dimensional postures of the two hulls as well as the states of the fenders 12A to 12D in the form of numerical data based on the input information (SC8) and stores the posture data of the two hulls (numerical data) and the state data of the fenders 12A to 12D in the storing device 107 (SC9), and also transmits the data to the second vessel 2 via the steering/assisting vessels in mooring alongside data transmitter 111 as the steering/assisting vessels in mooring alongside data by radio waves of a predetermined frequency (SC10).

When the calculating device 108B is to calculate the three-dimensional postures of the two hulls in the form of numerical data, it can calculate the posture of the first vessel 1 in the form of coordinate data by moving each coordinate of the outside plating shape of the hull of the first vessel 1 based on the oscillation information of first vessel 1 with the position of a predetermined reference point obtained by the GPS receiver 101 of the first vessel 1 being the origin. It can calculate the posture of the second vessel 2 in the form of coordinate data by moving each coordinate of the outside plating shape of the hull of the second vessel 2 based on the oscillation information of second vessel 2 with the position of a predetermined reference point obtained by the GPS receiver 201 of the second vessel 2 being the origin. In addition, it can correct the coordinates of the outside plating shape of each hull based on the distance data measured by the distance measuring devices 11A to 11C, the air pressure data of the fenders 12A to 12D, and the distance data measured by the distance measuring devices 21A to 21D of the second vessel 2 when the hull of the first vessel 1 and the hull of the second vessel 2 approach. When the two hulls approach, pressing the fenders 12A to 12D, the inner air pressures of the fenders 12A to 12D increase. Thus, the calculating device 108B can perform the correction based on the air pressure data of the fenders 12A to 12D more exactly by using the compressed amount which is converted from the increasing rate of the inner air pressures of the fenders 12A to 12D, as the shape data and the steady state air pressure data of the fenders 12A to 12D are already known.

Then, the calculating device 108B calculates color animation data from the abovementioned calculated posture data of the two hulls and the state data of the fenders 12A to 12D and stores the data in the storing device 107 (SC11), and outputs the numerical data and the animation data to the display device 110. As a result, the display device 110 displays the numerical data and such animations as shown in FIGS. 17 and 18 (SC12). When the calculating device 108B calculates the animation data, it changes the eye point of the animation according to a command input from the operating device 109. When the first vessel 1 is an ocean base and the two vessels are mooring alongside for loading cargos, such animations as shown from FIG. 19 to FIG. 21 are displayed. The animation may include the XYZ rectangular coordinate and the direction of waves and the like based on the weather/oceanographic phenomena information.

Next, the calculating device 108B determines whether the minimum distance between the hulls of the first vessel 1 and the second vessel 2 is less than a predetermined specified value or not based on the abovementioned calculated numerical data (SC13). If the distance is not less than the specified value, the operation returns to the SC1 process where the abovementioned processing is repeated. If the distance is less than the specified value, it is decided that the two hulls are too close to each other and the warning is displayed on the display device 110 (SC14), and then the operation returns to the SC1 process where the abovementioned processing is repeated.

As mentioned above, the display device 110 displays the postures of the first vessel 1 and the second vessel 2 as well as the states of the fenders 12A to 12D by means of the numerical data and animations. As the eye point of the animation can be changed as required according to a command from the operating device 109, the operator of the first vessel 1 can steer the first vessel 1 with reference to the numerical data and the animations.

When the calculating device 205B provided for the second vessel 2 starts the operation, it inputs the coordinate data on the predetermined reference point of the second vessel 2 that is detected by the GPS receiver 201, distance data that is measured by the distance measuring devices 21A to 21C, and displacement data that is detected by the oscillation detecting device 202 (SD1, SD2, SD3), and also inputs the self hull information stored in the storing device 204, i.e., coordinate data on the outside plating shape of the self hull and coordinate data on the installed positions of each distance measuring devices 21A to 21C (SD4).

Next, the calculating device 205B transmits the input information, i.e., the coordinate data on a predetermined reference point of the second vessel 2 that is detected by the GPS receiver 201, the distance data that is measured by the distance measuring devices 21A to 21C, the displacement data that is detected by the oscillation detecting device 202, and the self hull information stored in the storing device 204 to the first vessel 1 as the laying aboard vessel data via the laying aboard vessel data transmitter 208 by radio waves of a predetermined frequency (SD5).

Then, the calculating device 205B inputs steering/assisting vessels in mooring alongside data (posture data of the two hulls and the state data of the fenders 12A to 12D (numerical data)) via the steering/assisting vessels in mooring alongside data receiver 203 (SD6), stores the data in the storing device 204 (SD7), calculates color animation data from the steering/assisting vessels in mooring alongside data and stores the data in the storing device 204 (SD8), and outputs the numerical data and animation data to the display device 207. As a result, the display device 207 displays the numerical data and such animations as shown in FIGS. 17 and 18 (SD9). When the calculating device 205B calculates the animation data, it changes the eye point of the animation according to a command input from the operating device 206. When the first vessel 1 is an ocean base and the two vessels are mooring alongside for loading cargos, such animations as shown from FIG. 19 to FIG. 21 are displayed. The animation may include the XYZ rectangular coordinate and the direction of waves and the like based on the weather/oceanographic phenomena information.

Next, the calculating device 205B determines whether the minimum distance between the hulls of the first vessel 1 and the second vessel 2 is less than a predetermined specified value or not based on the abovementioned calculated numerical data (SD10). If the distance is not less than the specified value, the operation returns to the SD1 process where the abovementioned processing is repeated. If the distance is less than the specified value, it is decided that the two hulls are too close to each other and the warning is displayed on the display device 207 (SD11), and then the operation returns to the SD1 process where the abovementioned processing is repeated.

As mentioned above, the display device 207 displays the postures of the first vessel 1 and the second vessel 2 as well as the states of the fenders 12A to 12D by means of the numerical data and the animations. As the eye point of the animation can be changed as required according to a command from the operating device 206, the operator of the second vessel 2 can steer the second vessel 2 with reference to the numerical data and the animations.

In addition, the operator can make the obtained air pressure data of the fenders 12A to 12D converted into compressed amount, reaction, and absorbed energy of the fenders 12A to 12D and output them to the display devices 110 and 207 for monitoring the information.

Accordingly, the operators of the first vessel 1 and the second vessel 2 can easily plan steering of their vessels with reference to the information on the physical relationship between the hull of the first vessel 1 and the hull of the second vessel 2 and the information on the states of the fenders 12A to 12D which are respectively displayed on the display devices 110 and 207. Therefore, the operators can avoid laying the vessels aboard too close proximity to each other so as to prevent the hulls from damaging each other as the fenders 12A to 12D placed between the vessels break or the vessels clash when the two vessels such as oil tankers are laid aboard for loading cargoes on the sea with such an operation as STS or FPSO. The operators can also monitor the states of the fenders 12A to 12D night and day.

The embodiment may be adapted to assist an operator in steering a vessel by only calculating the numerical data and displaying the data without calculating the animation data. Alternatively, the embodiment may be adapted to assist an operator in steering a vessel by only displaying an animation.

Now, a third embodiment of the present invention will be described.

Figure 28:
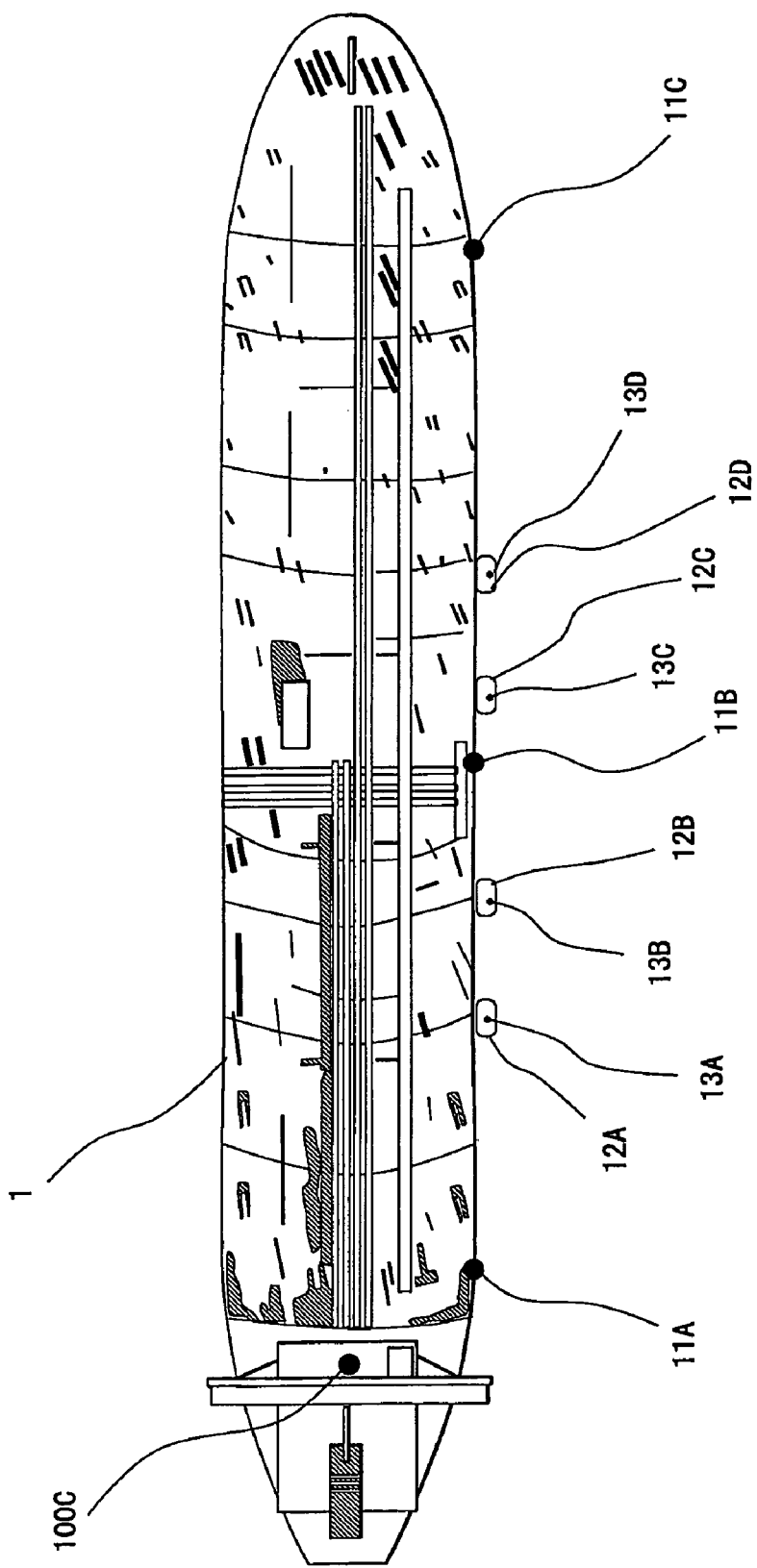
FIG. 28 is a diagram showing arrangement of devices in a first vessel in the third embodiment of the present invention.
Figure 29:
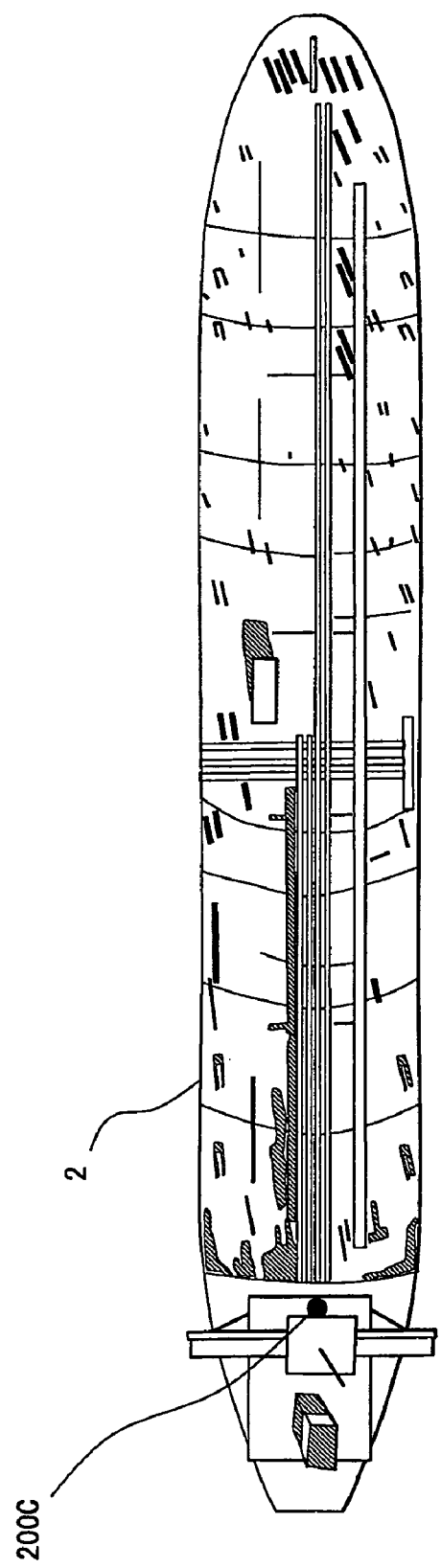
FIG. 29 is a diagram showing arrangement of devices in a second vessel in the third embodiment of the present invention.
Figure 30:
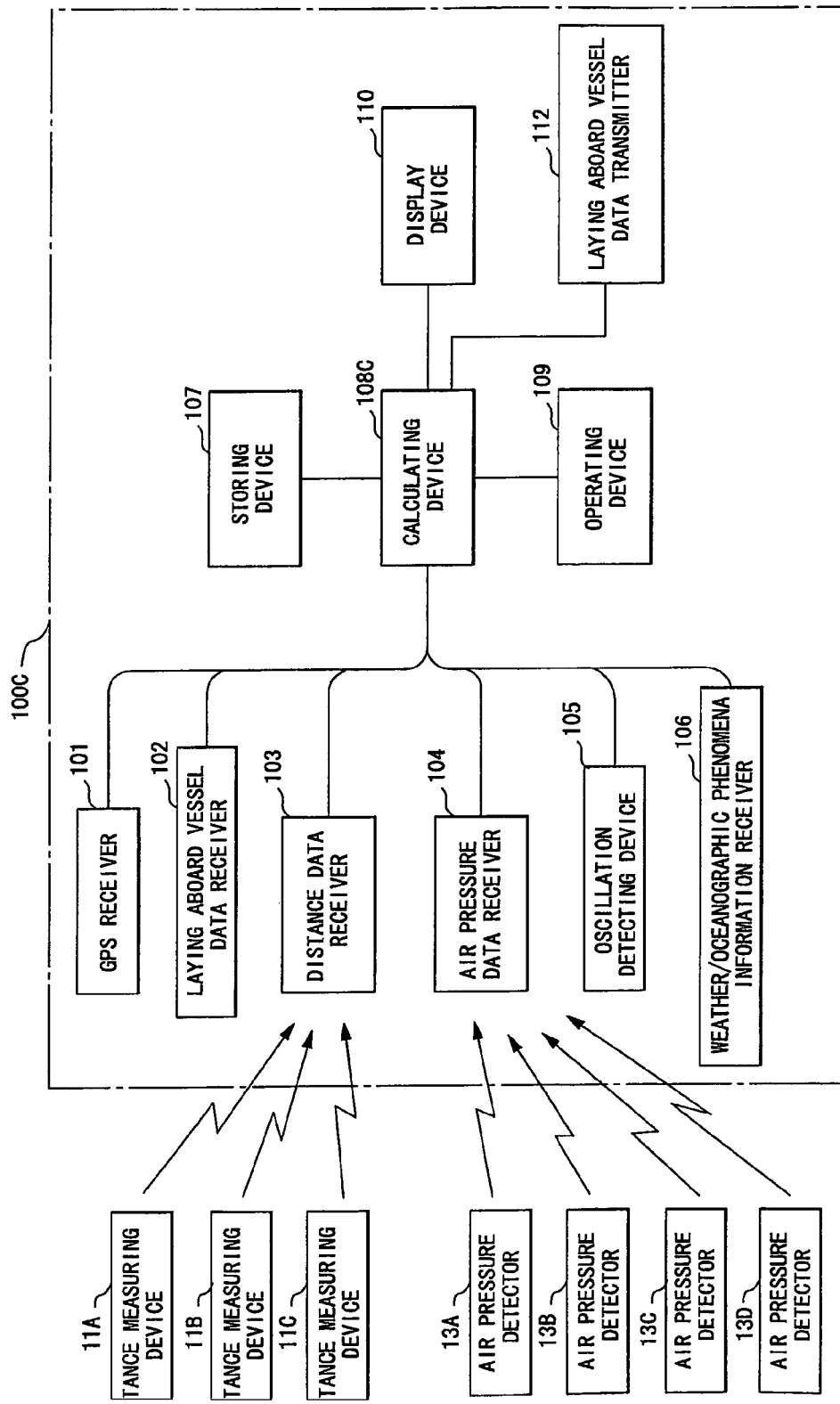
FIG. 30 is a block diagram showing configuration of a main device mounted on the first vessel in the third embodiment of the present invention.
Figure 31:
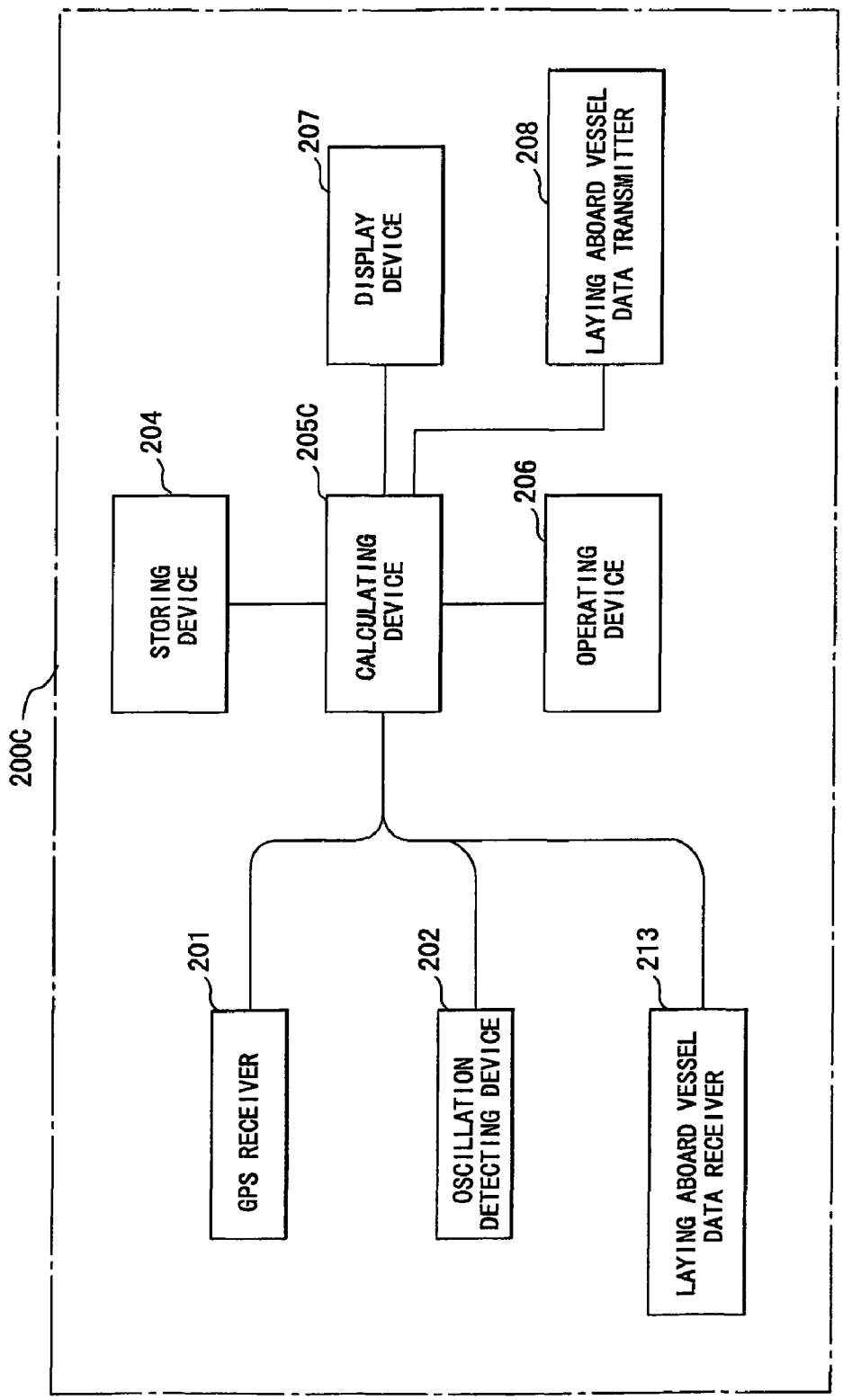
FIG. 31 is a block diagram showing configuration of a main device mounted on the second vessel in the third embodiment of the present invention.

FIG. 28 to FIG. 31 are diagrams showing configuration of a system for assisting steering and mooring alongside of vessels in the third embodiment of the present invention. FIG. 28 is a diagram showing arrangement of devices in a first vessel. FIG. 29 is a diagram showing arrangement of devices in a second vessel. FIG. 30 is a block diagram showing configuration of a main device mounted on the first vessel. FIG. 31 is a block diagram showing configuration of a main device mounted on the second vessel. The same components as those in the first embodiment described above are denoted by the same reference numerals and omitted from the description.

As shown in FIG. 28, the first vessel 1 has a main device 100C in its vessel steering room, and three distance measuring devices 11A to 11C and four fenders 12A to 12D on the starboard, to which the second vessel 2 is to lay aboard.

The first distance measuring device 11A is provided at a predetermined position near the stern, the second distance measuring device 11B is provided at a predetermined position in the center, and the third distance measuring device 11C is provided at a predetermined position at the bow. These units of the distance measuring devices 11A to 11C are for measuring a distance from the second vessel 2 to be laid aboard, using a laser displacement gauge or an ultrasonic range finder, for example. Each of the distance measuring devices 11A to 11C transmits the measured distance data to the main device 100C with the unit identification information unique to each of the distance measuring device by radio waves of a predetermined frequency or via a communication cable. The distance measuring device 11 is preferably provided at two or more places on the hull including the stern and the bow.

The fenders 12A to 12D are well-known air fenders, respectively including air pressure detectors 13A to 13D inside, which is for detecting an inner air pressure, and transmitting the detected air pressure data to the main device 100C with the unit identification information unique to each fender (air pressure detector) by radio waves of a predetermined frequency or via a communication cable. As it is conventionally known, the fenders 12A to 12D are arranged with a predetermined distance therebetween to prevent the first vessel 1 from clashing against the second vessel 2. The number of the fenders 12 may depend on the situation.

As shown in FIG. 29, the second vessel 2 has a main device 200C in its vessel steering room.

As shown in FIG. 30, the main device 100C provided for the first vessel 1 has almost the same configuration as that of the first embodiment except for having a calculating device 108C for performing processing different from that performed by the calculating device 108 in place of the calculating device 108 and having a laying aboard vessel data transmitter 112 in place of the steering/assisting vessels in mooring alongside data transmitter 111.

The calculating device 108C is a well-known computer with almost the same configuration as that of the calculating device 108 in the first embodiment except for the processing (to be described later).

As shown in FIG. 31, the main device 200C provided for the second vessel 2 has a GPS receiver 201, an oscillation detecting device 202, a storing device 204, a calculating device 205C, an operating device 206, a display device 207, a laying aboard vessel data transmitter 208, and laying aboard vessel data receiver 213.

The calculating device 205C is a well-known computer with almost the same configuration as that of the calculating device 205 in the first embodiment except for the processing (to be described later).

Figure 32:
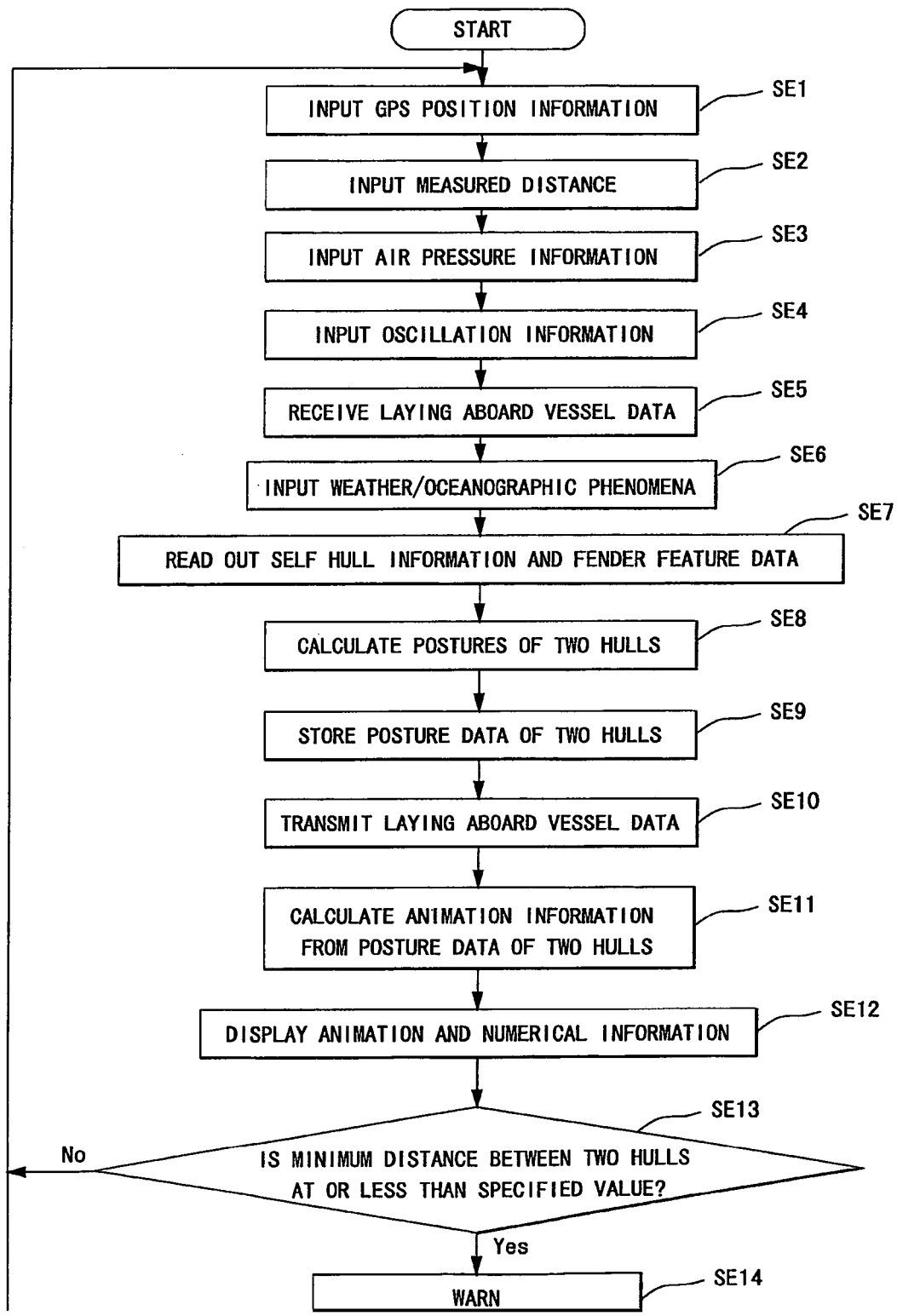
FIG. 32 is a flowchart for illustrating processing performed by a calculating device provided for the first vessel in the third embodiment of the present invention.
Figure 33:
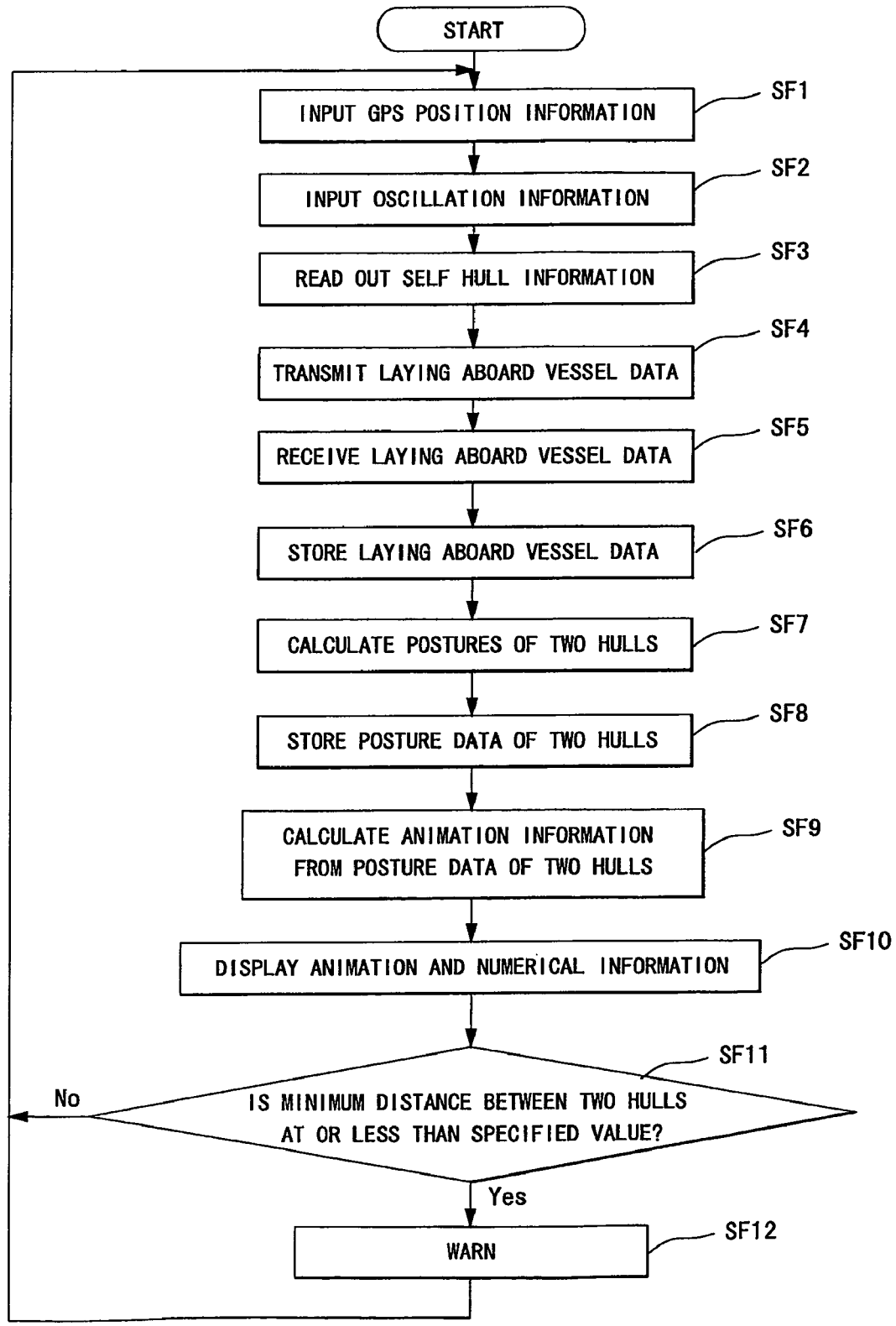
FIG. 33 is a flowchart for illustrating processing performed by a calculating device provided for the second vessel in the third embodiment of the present invention.

Now, an operation performed by the system according to the embodiment with the abovementioned configuration will be described with reference to the flowcharts shown in FIG. 32 and FIG. 33. FIG. 32 is a flowchart for illustrating processing performed by the calculating device 108C provided for the first vessel 1, and FIG. 33 is a flowchart for illustrating processing performed by the calculating device 205C provided for the second vessel 2.

When the calculating device 108C provided for the first vessel 1 starts the operation, it inputs the coordinate data on the predetermined reference point of the first vessel 1 detected by the GPS receiver 101, distance information measured by the distance measuring devices 11A to 11C, the air pressure data obtained by the air pressure data receiver 104, the displacement data detected by the oscillation detecting device 105, the laying aboard vessel data obtained by the laying aboard vessel data receiver 102, and the weather/oceanographic phenomena data obtained by the weather/oceanographic phenomena information receiver 106 (SE1 to SE6), and also inputs information on the self hull stored in the storing device 107, i.e., the coordinate data on the outside plating shape of the self hull, the coordinate data on the installed positions of the distance measuring devices 11A to 11C, the fender feature data which is data related to a size, the steady state air pressure data, a compressed amount, reaction, and absorbed energy, and the coordinate data of the installed position and outer shape data of each of the fenders 12A to 12D (SE7).

Next, the calculating device 108C calculates physical relationship between the hull of the first vessel 1 and the hull of the second vessel 2, i.e., the three-dimensional postures of the two hulls as well as the states of the fenders 12A to 12D in the form of numerical data based on the input information (SE8) and stores the posture data of the two hulls and the state data of the fenders 12A to 12D (numerical data) in the storing device 107 (SE9).

The calculating device 108C transmits the coordinate data on the predetermined reference point of the first vessel 1 detected by the GPS receiver 101, distance information measured by the distance measuring devices 11A to 11C, the air pressure data obtained by the air pressure data receiver 104, the displacement data detected by the oscillation detecting device 105, the weather/oceanographic phenomena data obtained by the weather/oceanographic phenomena information receiver 106, and the self hull information stored in the storing device 107 to the second vessel 2 as the laying aboard vessel data via the laying aboard vessel data transmitter 112 by radio waves of a predetermined frequency (SE10).

When the calculating device 108C is to calculate the three-dimensional postures of the two hulls in the form of numerical data, it can calculate the posture of the first vessel 1 in the form of the coordinate data by moving each coordinate of the outside plating shape of the hull of the first vessel 1 based on the first vessel 1 oscillation information with the position of a predetermined reference point obtained by the GPS receiver 101 of the first vessel 1 being the origin. It can calculate the posture of the second vessel 2 in the form of the coordinate data by moving each coordinate of the outside plating shape of the hull of the second vessel 2 based on the second vessel 2 oscillation information with the position of a predetermined reference point obtained by the GPS receiver 201 of the second vessel 2 being the origin. In addition, it can correct the coordinates of the outside plating shape of each hull based on the distance data measured by the distance measuring devices 11A to 11C and the air pressure data of the fenders 12A to 12D when the hull of the first vessel 1 and the hull of the second vessel 2 approach. When the two hulls approach, pressing the fenders 12A to 12D, the inner air pressures of the fenders 12A to 12D increase. Thus, the calculating device 108C can perform the correction based on the air pressure data of the fenders 12A to 12D more exactly by using the compressed amount which is converted from the increasing rate of the inner air pressures of the fenders 12A to 12D, as the shape data and the steady state air pressure data of the fenders 12A to 12D are already known.

Then, the calculating device 108C calculates color animation data from the abovementioned calculated posture data of the two hulls and the state data of the fenders 12A to 12D and stores the data in the storing device 107 (SE11), and outputs the numerical data and the animation data to the display device 110. As a result, the display device 110 displays the numerical data and such animations taken when the vessels are laying aboard as shown in FIGS. 17 and 18 (SE12). When the calculating device 108C calculates the animation data, it changes the eye point of the animation according to a command input from the operating device 109. When the first vessel 1 is an ocean base and the two vessels are mooring alongside for loading cargos, such animations as shown from FIG. 19 to FIG. 21 are displayed. The animation may include the XYZ rectangular coordinate and the direction of waves and the like based on the weather/oceanographic phenomena information.

Next, the calculating device 108C determines whether the minimum distance between the hulls of the first vessel 1 and the second vessel 2 is less than a predetermined specified value or not based on the abovementioned calculated numerical data (SE13). If the distance is not less than the specified value, the operation returns to the SE1 process where the abovementioned processing is repeated. If the distance is less than the specified value, it is decided that the two hulls are too close to each other and the warning is displayed on the display device 110 (SE14), and then the operation returns to the SE1 process where the abovementioned processing is repeated.

As mentioned above, the display device 110 displays the postures of the first vessel 1 and the second vessel 2 by means of the numerical data and animations. As the eye point of the animation can be changed as required according to a command from the operating device 109, the operator of the first vessel 1 can steer the first vessel 1 with reference to the numerical data and the animations.

When the calculating device 205C provided for the second vessel 2 starts the operation, it inputs the coordinate data on the predetermined reference point of the second vessel 2 that is detected by the GPS receiver 201 and the displacement data that is detected by the oscillation detecting device 202 (SF1, SF2), and also inputs the self hull information stored in the storing device 204, i.e., the coordinate data on the outside plating shape of the self hull (SF3).

Next, the calculating device 205C transmits the input information, i.e., the coordinate data on a predetermined reference point of the second vessel 2 that is detected by the GPS receiver 201, the displacement data that is detected by the oscillation detecting device 202, and the coordinate data on the outside plating shape of the self hull that is stored in the storing device 204 to the first vessel 1 as the laying aboard vessel data via the laying aboard vessel data transmitter 208 by radio waves of a predetermined frequency (SF4).

Then, the calculating device 205C inputs laying aboard vessel data (hull information of the first vessel 1) via the laying aboard vessel data receiver 213 (SF5), stores the data in the storing device 204 (SF6), calculates physical relationship between the hull of the first vessel 1 and the hull of the second vessel 2, i.e., the three-dimensional posture of the two hulls as well as the states of the fenders 12A to 12D in the form of numerical data based on the laying aboard vessel data and the self vessel hull information that is stored in the storing device 204 (SF7), and stores the posture data of the two hulls and the state data on the fenders 12A to 12D (numerical data) in the storing device 204 (SF8).

Then, the calculating device 205C calculates color animation data from the abovementioned calculated posture data of the two hulls and the state data of the fenders 12A to 12D and stores the data in the storing device 204 (SF9), and outputs the numerical data and the animation data to the display device 207. As a result, the display device 207 displays the numerical data and such animations as shown in FIGS. 17 and 18 (SF10). When the calculating device 205C calculates the animation data, it changes the eye point of the animation according to a command input from the operating device 206. When the first vessel 1 is an ocean base and the two vessels are mooring alongside for loading cargos, such animations as shown from FIG. 19 to FIG. 21 are displayed. The animation may include the XYZ rectangular coordinate and the direction of waves and the like based on the weather/oceanographic phenomena information.

Next, the calculating device 205C determines whether the minimum distance between the hulls of the first vessel 1 and the second vessel 2 is less than a predetermined specified value or not based on the abovementioned calculated numerical data (SF11). If the distance is not less than the specified value, the operation returns to the SF1 process where the abovementioned processing is repeated. If the distance is less than the specified value, it is decided that the two hulls are too close to each other and the warning is displayed on the display device 207 (SF12), and then the operation returns to the SF1 process where the abovementioned processing is repeated.

As mentioned above, the display device 207 displays the postures of the first vessel 1 and the second vessel 2 as well as the states of the fenders 12A to 12D by means of the numerical data and the animations. As the eye point of the animation can be changed as required according to a command from the operating device 206, the operator of the second vessel 2 can steer the second vessel 2 with reference to the numerical data and the animations.

The calculating device 205C may convert the obtained air pressure data of the fenders 12A to 12D into compressed amount, reaction, and absorbed energy features of the fenders 12A to 12D, and output them to the display devices 110 and 207 for monitoring the information.

Accordingly, the operators of the first vessel 1 and the second vessel 2 can easily plan steering of their vessels with reference to the information on the physical relationship between the hull of the first vessel 1 and the hull of the second vessel 2 and the information on the states of the fenders 12A to 12D which are respectively displayed on the display devices 110 and 207. Therefore, the operators can avoid laying the vessels aboard too close proximity to each other so as to prevent the hulls from damaging each other as the fenders 12A to 12D placed between the vessels break or the vessels clash when the two vessels such as oil tankers are laid aboard for loading cargoes on the sea with such an operation as STS or FPSO. The operators can also monitor the states of the fenders 12A to 12D night and day.

The embodiment may be adapted to assist an operator in steering a vessel by only calculating the numerical data and displaying the data without calculating the animation data. Alternatively, the embodiment may be adapted to assist an operator in steering a vessel by only displaying the animation.

Now, a fourth embodiment of the present invention will be described.

Figure 34:
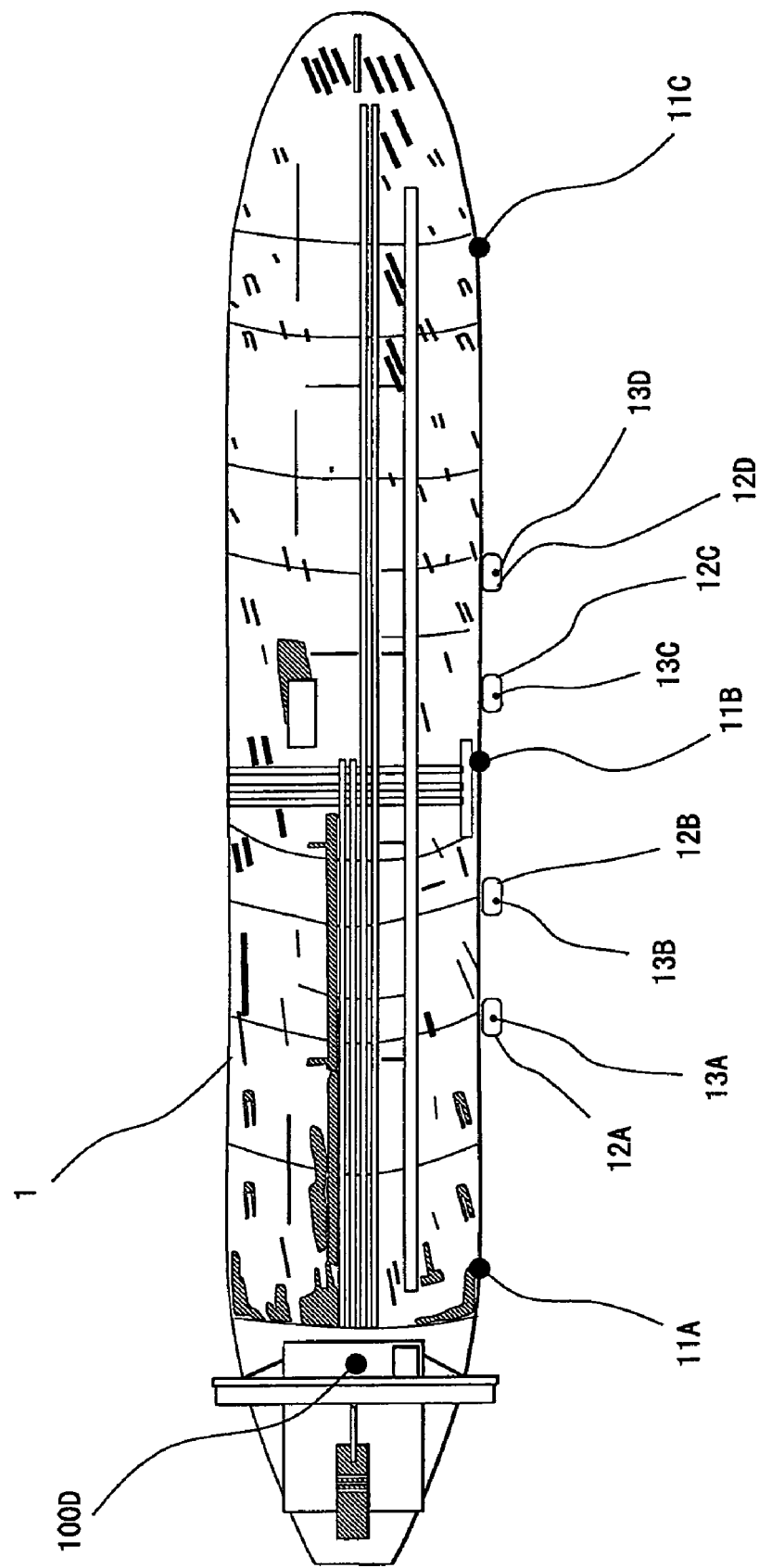
FIG. 34 is a diagram showing arrangement of devices in a first vessel in the fourth embodiment of the present invention.
Figure 35:
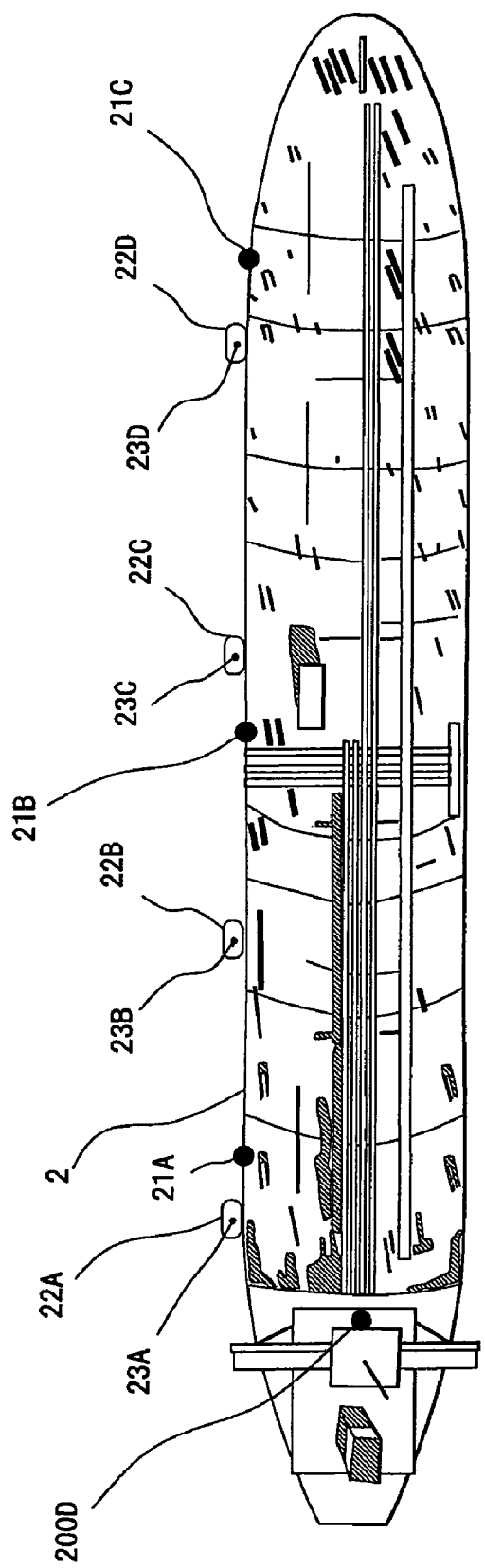
FIG. 35 is a diagram showing arrangement of devices in a second vessel in the fourth embodiment of the present invention.
Figure 36:
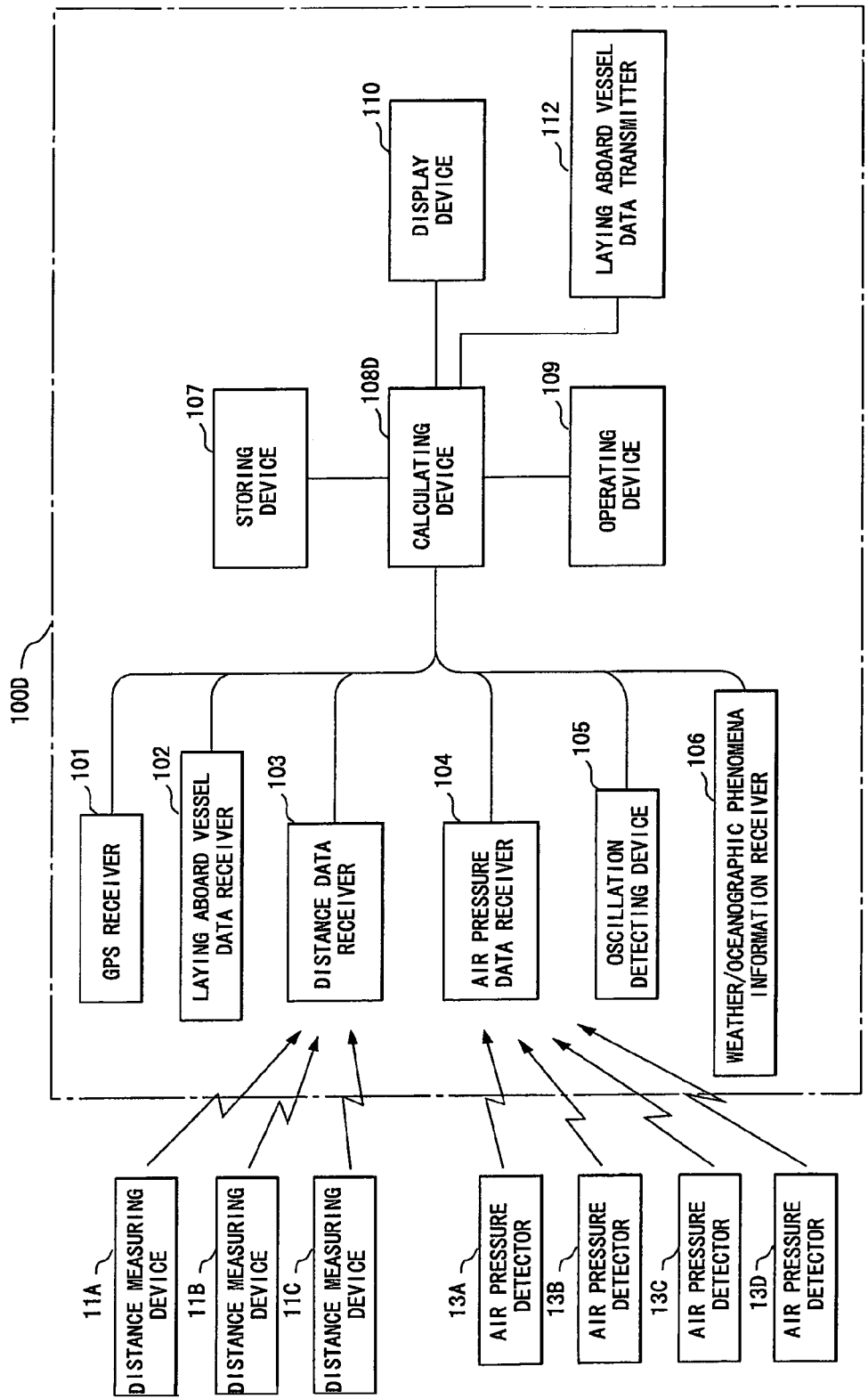
FIG. 36 is a block diagram showing configuration of a main device mounted on the first vessel in the fourth embodiment of the present invention.
Figure 37:
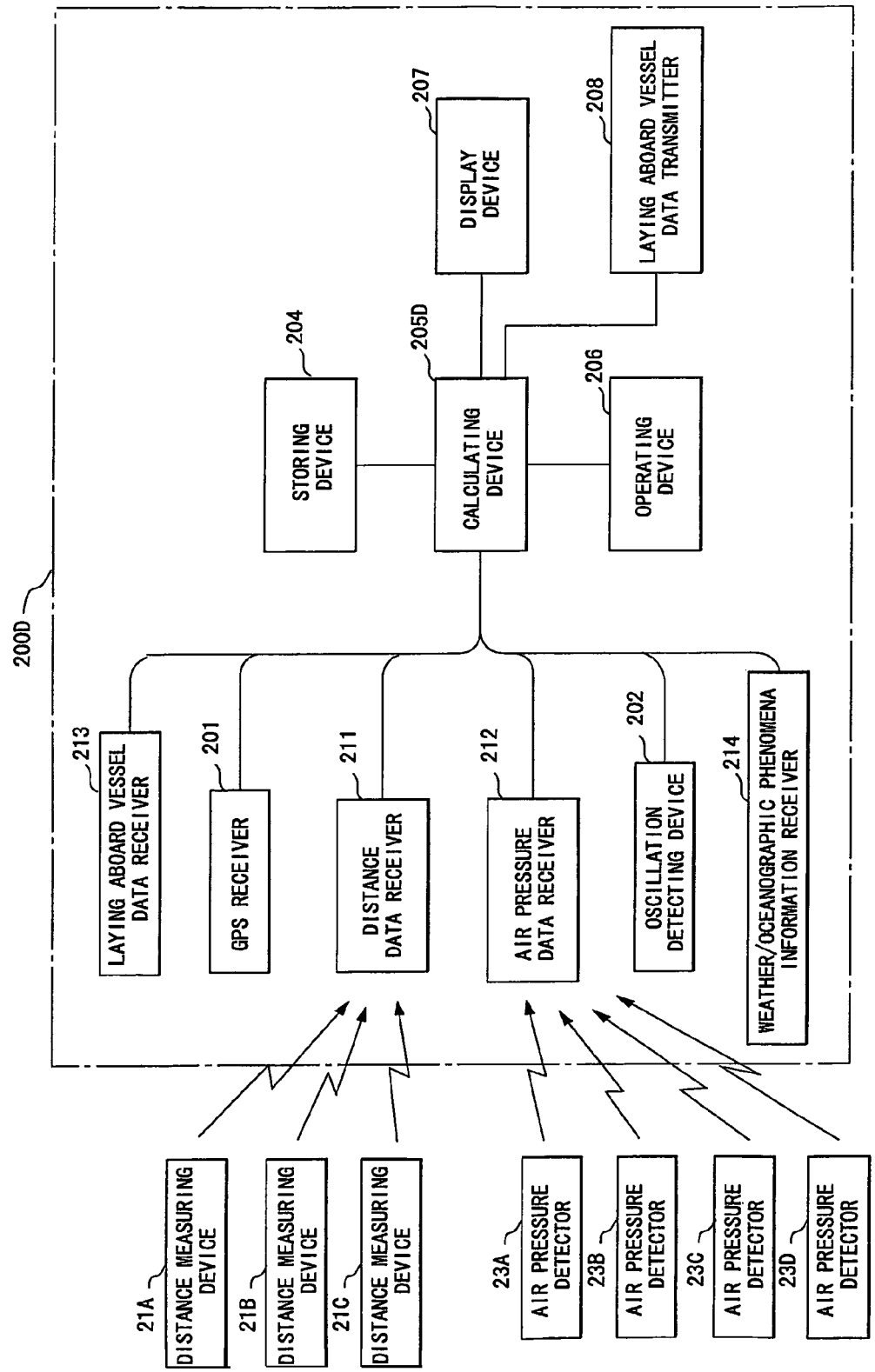
FIG. 37 is a block diagram showing configuration of a main device mounted on the second vessel in the fourth embodiment of the present invention.

FIG. 34 to FIG. 37 are diagrams showing configuration of a system for assisting steering and mooring alongside of vessels in the fourth embodiment of the present invention. FIG. 34 is a diagram showing arrangement of devices in a first vessel. FIG. 35 is a diagram showing arrangement of devices in a second vessel. FIG. 36 is a block diagram showing configuration of a main device mounted on the first vessel. FIG. 37 is a block diagram showing configuration of a main device mounted on the second vessel. The same components as those in the first embodiment described above are denoted by the same reference numerals and omitted from the description.

As shown in FIG. 34, the first vessel 1 has a main device 100D in its vessel steering room, and three distance measuring devices 11A to 11C and four fenders 12A to 12D on the starboard, to which the second vessel 2 is to lay aboard.

The first distance measuring device 11A is provided at a predetermined position near the stern, the second distance measuring device 11B is provided at a predetermined position in the center, and the third distance measuring device 11C is provided at a predetermined position at the bow. These units of the distance measuring devices 11A to 11C are for measuring a distance from the second vessel 2 to be laid aboard, using a laser displacement gauge or an ultrasonic range finder, for example. Each of the distance measuring devices 11A to 11C transmits the measured distance data to the main device 100D with unit identification information unique to each of the distance measuring device by radio waves of a predetermined frequency or via a communication cable. The distance measuring device 11 is preferably provided at two or more places on the hull including the stern and the bow.

The fenders 12A to 12D are well-known air fenders, respectively including air pressure detectors 13A to 13D inside, which is for detecting an inner air pressure, and transmitting the detected air pressure data to the main device 100D with the unit identification information unique to each fender (air pressure detector) by radio waves of a predetermined frequency or via a communication cable. As it is conventionally known, the fenders 12A to 12D are arranged with a predetermined distance therebetween to prevent the first vessel 1 from clashing against the vessel 2. The number of the fenders 12 may depend on the situation.

As shown in FIG. 35, the second vessel 2 has a main device 200D in its vessel steering room as well as three distance measuring devices 21A to 21C and four fenders 22A to 22D on the port, to which the first vessel 1 is to lay aboard.

The first distance measuring device 21A is provided at a predetermined position near the stern, the second distance measuring device 21B is provided at a predetermined position in the center, and the third distance measuring device 21C is provided at a predetermined position at the bow. These units of the distance measuring devices 21A to 21C are for measuring a distance from the first vessel 1 to be laid aboard using a laser displacement gauge or an ultrasonic range finder, for example. Each of the distance measuring devices 21A to 21C transmits the measured distance data to the main device 200D with unit identification information unique to each of the distance measuring device by radio waves of a predetermined frequency or via a communication cable. The distance measuring device 21 is preferably provided at two or more places on the hull including the stern and the bow.

The fenders 22A to 22D are well-known air fenders, respectively including air pressure detectors 23A to 23D inside, which is for detecting an inner air pressure, and transmitting the detected air pressure data to the main device 200D with the unit identification information unique to each fender (air pressure detector) by radio waves of a predetermined frequency. As it is conventionally known, the fenders 22A to 22D are arranged with a predetermined distance therebetween to prevent the first vessel 1 from clashing against the second vessel 2. The number of the fenders 22 may depend on the situation.

As shown in FIG. 36, the main device 100D provided for the first vessel 1 has almost the same configuration as that of the first embodiment except for having a calculating device 108D for performing processing different from that performed by the calculating device 108A in place of the calculating device 108A and having a laying aboard vessel data transmitter 112 in place of the steering/assisting vessels in mooring alongside data transmitter 111.

The calculating device 108D is a well-known computer with almost the same configuration as that of the calculating device 108A in the first embodiment except for the processing (to be described later).

The laying aboard vessel data transmitter 112 transmits the laying aboard vessel data which is input from the calculating device 108D to the second vessel 2 by radio waves of a predetermined frequency.

As shown in FIG. 37, the main device 200D provided for the second vessel 2 has a GPS receiver 201, an oscillation detecting device 202, a storing device 204, a calculating device 205D, an operating device 206, a display device 207, a laying aboard vessel data transmitter 208, a distance data receiver 211, an air pressure data receiver 212, a laying aboard vessel data receiver 213, and a weather/oceanographic phenomena information receiver 214.

The storing device 204 stores coordinate data on an outside plating shape of the hull based on the abovementioned predetermined reference point as well as the identification information and coordinate data on the installed position of each of the distance measuring devices 21A to 21C, and fender data including the identification information, coordinate data on the installed position, outside plating shape data, steady state air pressure data, an air pressure, a compressed amount, reaction, and absorbed energy feature of each of the fenders 22A to 22D as the self hull information.

The calculating device 205D is a well-known computer with almost the same configuration as that of the calculating device 205A in the first embodiment except for the processing (to be described later).

The distance data receiver 211 receives the distance data and the unit identification information transmitted from each of the distance measuring devices 21A to 21C and outputs them to the calculating device 205D with the distance data associated with the unit identification information.

The air pressure data receiver 212 receives the air pressure data and the unit identification information transmitted from each of the air pressure detectors 23A to 23D and outputs them to the calculating device 205D with the air pressure data associated with the unit identification information.

The laying aboard vessel data receiver 213 receives the laying aboard vessel data transmitted from the first vessel 1 and outputs the data to the calculating device 205D.

The weather/oceanographic phenomena information receiver 214 obtains weather/oceanographic phenomena information in the oceanic region for the self vessel to sail from the weather/oceanographic phenomena information transmitted from Japan Meteorological Agency or the like and outputs the information to the calculating device 205D.

Figure 38:
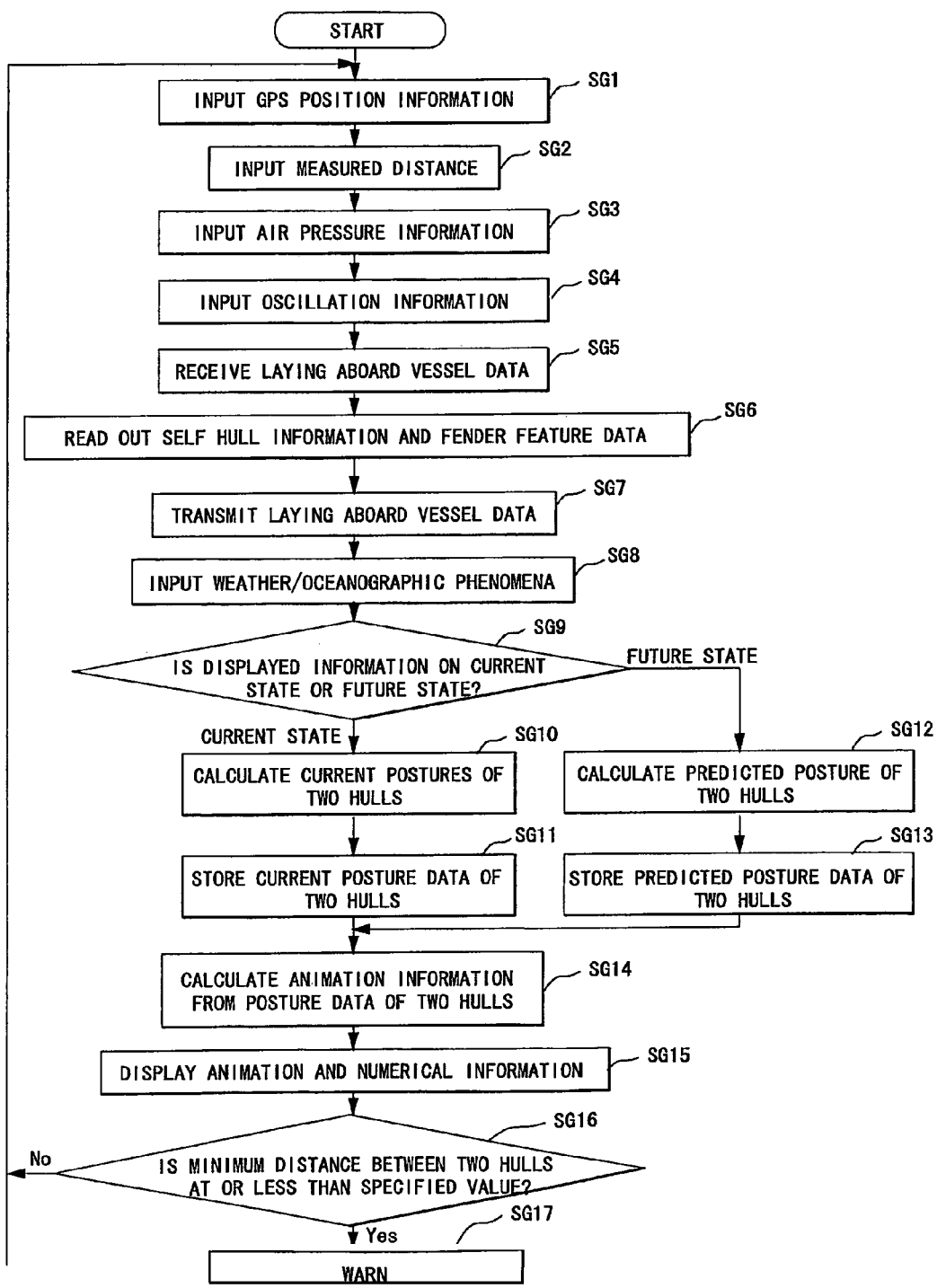
FIG. 38 is a flowchart for illustrating processing performed by a calculating device provided for the first vessel in the fourth embodiment of the present invention.
Figure 39:
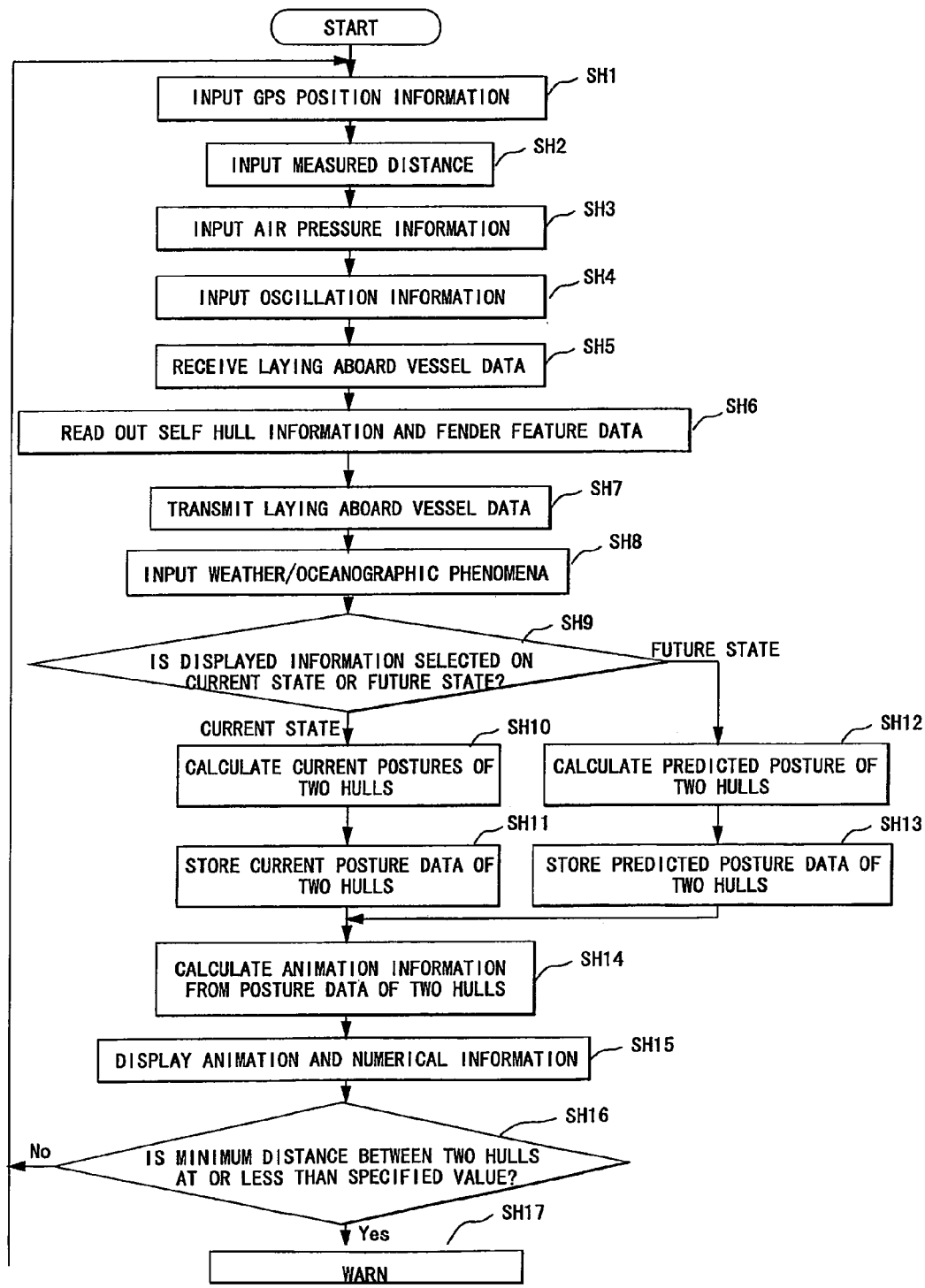
FIG. 39 is a flowchart for illustrating processing performed by a calculating device provided for the second vessel in the fourth embodiment of the present invention.

Now, an operation performed by the system according to the embodiment with the abovementioned configuration will be described with reference to the flowcharts shown in FIG. 38 and FIG. 39. FIG. 38 is a flowchart for illustrating processing performed by the calculating device 108D provided for the first vessel 1, and FIG. 39 is a flowchart for illustrating processing performed by the calculating device 205D provided for the second vessel 2.

When the calculating device 108D provided for the first vessel 1 starts the operation, it inputs the coordinate data on the predetermined reference point of the first vessel 1 detected by the GPS receiver 101, distance information measured by the distance measuring devices 11A to 11C, the air pressure data obtained by the air pressure data receiver 104, the displacement data detected by the oscillation detecting device 105, and the laying aboard vessel data obtained by the laying aboard vessel data receiver 102 (SG1 to SG5), and also inputs information on the self hull stored in the storing device 107, i.e., the coordinate data on the outside plating shape of the self hull, the coordinate data on the installed positions of the distance measuring devices 11A to 11C, and the fender feature data which is data related to a size, the steady state air pressure data, a compressed amount, reaction, and absorbed energy, and the coordinate data of the installed position and the outer shape data of each of the fenders 12A to 12D (SG6).

Next, the calculating device 108D transmits coordinate data on the input predetermined reference point of the first vessel 1 detected by the GPS receiver 101, distance information measured by the distance measuring devices 11A to 11C, the air pressure data obtained by the air pressure data receiver 104, the displacement data detected by the oscillation detecting device 105, the coordinate data on the outside plating shape of the self hull, the coordinate data on the installed positions of the distance measuring devices 11A to 11C, and the coordinate data on the installed positions, the outer shape data and the steady state air pressure data of the fenders 12A to 12D to the second vessel 2 as the laying aboard vessel data of the first vessel 1 via the laying aboard vessel data transmitter 112 by radio waves of a predetermined frequency (SG7).

Then, the calculating device 108D inputs the weather/oceanographic phenomena data obtained by the weather/oceanographic phenomena information receiver 106 and stores the data in the storing device 107 (SG8), and also determines whether the display information specified by a display command input from the operating device 109 represents the current state or the future state (SG9).

If it is determined that the specified display information represents the current state, the calculating device 108D calculates the current physical relationship between the hull of the first vessel 1 and the hull of the second vessel 2, i.e., the current postures of the two hulls as well as the states of the fenders 12A to 12D and 22A to 22D in the form of numerical data based on the input data (SG10) and stores the current posture data of the two hulls and the state data (numerical data) of the fenders 12A to 12D and 22A to 22D in the storing device 107 (SG11).

When the calculating device 108D is to calculate the three-dimensional postures of the two hulls in the form of numerical data, it can calculate the posture of the first vessel 1 in the form of the coordinate data by moving each coordinate of the outside plating shape of the hull of the first vessel 1 based on the first vessel 1 oscillation information with the position of a predetermined reference point obtained by the GPS receiver 101 of the first vessel 1 being the origin. It can calculate the posture of the second vessel 2 in the form of the coordinate data by moving each coordinate of the outside plating shape of the hull of the second vessel 2 based on the second vessel 2 oscillation information with the position of a predetermined reference point obtained by the GPS receiver 201 of the second vessel 2 being the origin. In addition, it can correct the coordinates of the outside plating shape of each hull based on the distance data measured by the distance measuring devices 11A to 11C and 21A to 21C and the air pressure data of the fenders 12A to 12D and 22A to 22D when the hull of the first vessel 1 and the hull of the second vessel 2 approach. When the two hulls approach, pressing the fenders 12A to 12D and 22A to 22D, the inner air pressures of the fenders 12A to 12D and 22A to 22D increase. Thus, the calculating device 108D can perform the correction based on the air pressure data of the fenders 12A to 12D and 22A to 22D more exactly by using the compressed amount which is converted from the increasing rate of the inner air pressures of the fenders 12A to 12D and 22A to 22D, as the shape data and the steady state air pressure data of the fenders 12A to 12D and 22A to 22D are already known.

If it is determined that the specified display information is predicted for a predetermined time in future at SG9, the calculating device 108D predicts physical relationship between the hull of the first vessel 1 and the hull of the second vessel 2 at the predetermined time in future, i.e., the three-dimensional postures of the two hulls and the states of the fenders 12A to 12D and 22A and 22D by using a numerical analyzing program or the like based on the input data and the weather/oceanographic phenomena information and calculates the physical relationship in the form of numerical data (SG12), and stores the posture data of the two hulls and the state data (numerical data) of the fenders 12A to 12D and 22A and 22D in the storing device 107 (SG13).

Then, the calculating device 108D calculates color animation data from the abovementioned calculated posture data of the two hulls and the state data of the fenders 12A to 12D and 22A to 22D and stores the data in the storing device 107 (SG14), and outputs the numerical data and the animation data to the display device 110. As a result, the display device 110 displays the numerical data and such animations as shown in FIGS. 17 and 18 (SG15). When the calculating device 108D calculates the animation data, it changes the eye point of the animation according to a command input from the operating device 109. When the first vessel 1 is an ocean base, such animations as shown from FIG. 19 to FIG. 21 are displayed. The animation may include the XYZ rectangular coordinate and the direction of waves and the like based on the weather/oceanographic phenomena information.

Next, the calculating device 108D determines whether the minimum distance between the hulls of the first vessel 1 and the second vessel 2 is less than a predetermined specified value or not based on the abovementioned calculated numerical data (SG16). If the distance is not less than the specified value, the operation returns to the SG1 process where the abovementioned processing is repeated. If the distance is less than the specified value, it is decided that the two hulls are too close to each other and the warning is displayed on the display device 110 (SG17), and then the operation returns to the SG1 process where the abovementioned processing is repeated.

As mentioned above, the display device 110 displays the postures of the first vessel 1 and the second vessel 2 by means of the numerical data and animations. As the eye point of the animation can be changed as required according to a command from the operating device 109, the operator of the first vessel 1 can steer the first vessel 1 with reference to the numerical data and the animations.

When the calculating device 205D provided for the second vessel 2 starts the operation, it inputs the coordinate data on the predetermined reference point of the second vessel 2 detected by the GPS receiver 201, distance information measured by the distance measuring devices 21A to 21C, the air pressure data obtained by the air pressure data receiver 212, the displacement data detected by the oscillation detecting device 202, and the laying aboard vessel data of the first vessel 1 obtained by the laying aboard vessel data receiver 213 (SH1 to SH5), and also inputs information on the self hull stored in the storing device 204, i.e., the coordinate data on the outside plating shape of the self hull, the coordinate data on the installed positions of the distance measuring devices 21A to 21C, and the coordinate data on the installed positions, the outside plating shape data, and the steady state air pressure data of the fenders 22A to 22D (SH6).

Next, the calculating device 205D transmits the input information, i.e., the coordinate data on the predetermined reference point of the second vessel 2 detected by the GPS receiver 201, the information on distances measured by the distance measuring devices 21A to 21C, the air pressure data obtained by the air pressure data receiver 212, the displacement data detected by the oscillation detecting device 202, the coordinate data on the outside plating shape of the self hull, the coordinate data on the installed positions of the distance measuring devices 21A to 21C, and the coordinate data on the installed positions, the outer shape data and the steady state air pressure data of the fenders 22A to 22D to the first vessel 1 as the laying aboard vessel data of the first vessel 2 via the laying aboard vessel data transmitter 208 by radio waves of a predetermined frequency (SH7).

Then, the calculating device 205D inputs the weather/oceanographic phenomena data obtained by the weather/oceanographic phenomena information receiver 214 and stores the data in the storing device 204 (SH8), and also determines whether the display information specified by a display command input from the operating device 206 represents the current state or the future state (SH9).

If it is determined that the specified display information represents the current state, the calculating device 205D calculates the current physical relationship between the hull of the first vessel 1 and the hull of the second vessel 2, i.e., the current postures of the two hulls as well as the states of the fenders 12A to 12D and 22A to 22D in the form of numerical data based on the input data (SH10) and stores the current posture data of the two hulls and the state data (numerical data) of the fenders 12A to 12D and 22A to 22D in the storing device 204 (SH11).

When the calculating device 205D is to calculate the three-dimensional postures of the two hulls in the form of numerical data, it can calculate the posture of the first vessel 1 in the form of the coordinate data by moving each coordinate of the outside plating shape of the hull of the first vessel 1 based on the first vessel 1 oscillation information with the position of a predetermined reference point obtained by the GPS receiver 101 of the first vessel 1 being the origin. It can calculate the posture of the second vessel 2 in the form of the coordinate data by moving each coordinate of the outside plating shape of the hull of the second vessel 2 based on the second vessel 2 oscillation information with the position of a predetermined reference point obtained by the GPS receiver 201 of the second vessel 2 being the origin.

The calculating device 205D can also correct the coordinates of the outside plating shape of each hull based on the distance data measured by the distance measuring devices 11A to 11C and 21A to 21C and the air pressure data of the fenders 12A to 12D and 22A to 22D when the hull of the first vessel 1 and the hull of the second vessel 2 approach. When the two hulls approach, pressing the fenders 12A to 12D and 22A to 22D, the inner air pressures of the fenders 12A to 12D and 22A to 22D increase. Thus, the calculating device 205D can perform the correction based on the air pressure data of the fenders 12A to 12D and 22A to 22D more exactly by using the compressed amount which is converted from the increasing rate of the inner air pressures of the fenders 12A to 12D and 22A to 22D, as the shape data and the steady state air pressure data of the fenders 12A to 12D and 22A to 22D are already known.

If it is determined that the specified display information is predicted for a predetermined time in future at SH9, the calculating device 205D predicts physical relationship between the hull of the first vessel 1 and the hull of the second vessel 2 at the predetermined time in future, i.e., the three-dimensional postures of the two hulls and the states of the fenders 12A to 12D and 22A and 22D by using a numerical analyzing program or the like based on the input data and the weather/oceanographic phenomena information and calculates the physical relationship in the form of numerical data (SH12), and stores the posture data of the two hulls and the state data (numerical data) of the fenders 12A to 12D and 22A and 22D in the storing device 204 (SH13).

Then, the calculating device 205D calculates color animation data from the abovementioned calculated posture data of the two hulls and the state data of the fenders 12A to 12D and 22A to 22D and stores the data in the storing device 204 (SH14), and outputs the numerical data and the animation data to the display device 207. As a result, the display device 207 displays the numerical data and such animations as shown in FIGS. 17 and 18 (SH15). When the calculating device 205D calculates the animation data, it changes the eye point of the animation according to a command input from the operating device 206. When the first vessel 1 is an ocean base, such animations as shown from FIG. 19 to FIG. 21 are displayed. The animation may include the XYZ rectangular coordinate and the direction of waves and the like based on the weather/oceanographic phenomena information.

Next, the calculating device 205D determines whether the minimum distance between the hulls of the first vessel 1 and the second vessel 2 is less than a predetermined specified value or not based on the abovementioned calculated numerical data (SH16). If the distance is not less than the specified value, the operation returns to the SH1 process where the abovementioned processing is repeated. If the distance is less than the specified value, it is decided that the two hulls are too close to each other and the warning is displayed on the display device 207 (SH17), and then the operation returns to the SH1 process where the abovementioned processing is repeated.

As mentioned above, the display device 207 displays the postures of the first vessel 1 and the second vessel 2 by means of the numerical data and animations. As the eye point of the animation can be changed as required according to a command from the operating device 206, the operator of the second vessel 2 can steer the second vessel 2 with reference to the numerical data and the animations.

Accordingly, the operators of the first vessel 1 and the second vessel 2 can easily plan steering of their vessels with reference to the information on the physical relationship between the hulls of the first vessel 1 and the second vessel 2 and the information on the states of the fenders 12A to 12D and 22A to 22D which are respectively displayed on the display devices 110 and 207. Therefore, the operators can avoid laying the vessels aboard too close proximity to each other so as to prevent the hulls from damaging each other as the fenders 12A to 12D and 22A to 22D placed between the vessels break or the vessels clash when the two vessels such as oil tankers are laid aboard for loading cargoes on the sea with such an operation as STS or FPSO. The operators can also monitor the states of the fenders 12A to 12D and 22A to 22D night and day.

Although the fourth embodiment is adapted to have each of the vessels monitor the current oscillation of a hull and the oscillation of the hull in future, the embodiment may be adapted to have two monitors of the display devices for displaying the current oscillation of a hull on a monitor and the oscillation of the hull in future on the other monitor. Alternatively, the embodiment may be adapted to divide a screen of a monitor into two parts for displaying the current oscillation of a hull and the oscillation of the hull in future at the same time. Alternatively, the embodiment may be adapted as a system that enables an operator to switch a screen of a monitor in order to monitor the oscillation of the hull in future, while monitoring the current oscillation of the hull.

Now, a fifth embodiment of the present invention will be described.

Figure 40:
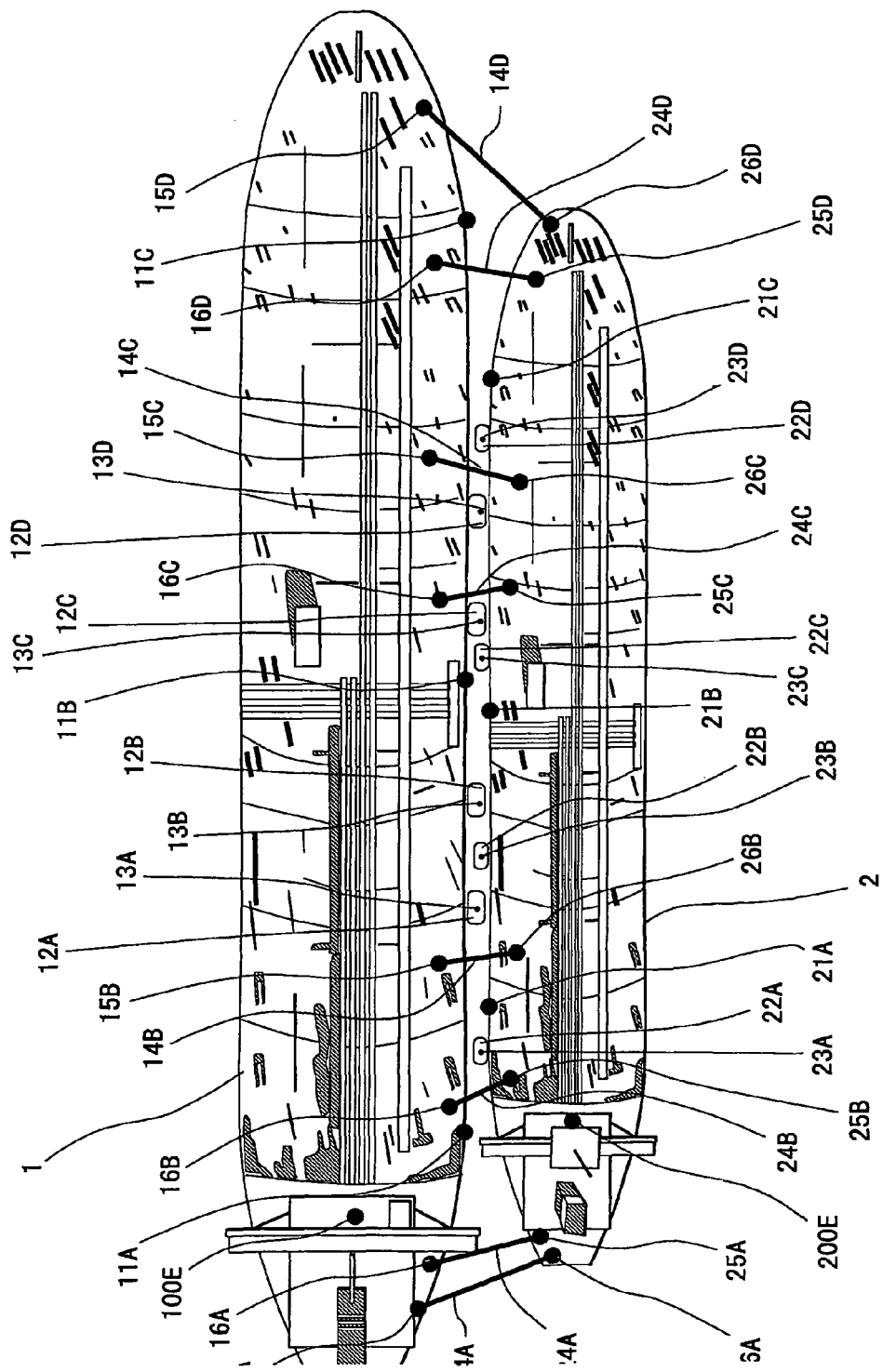
FIG. 40 is a diagram showing arrangement of devices in a first vessel and a second vessel in the fifth embodiment of the present invention.
Figure 41:
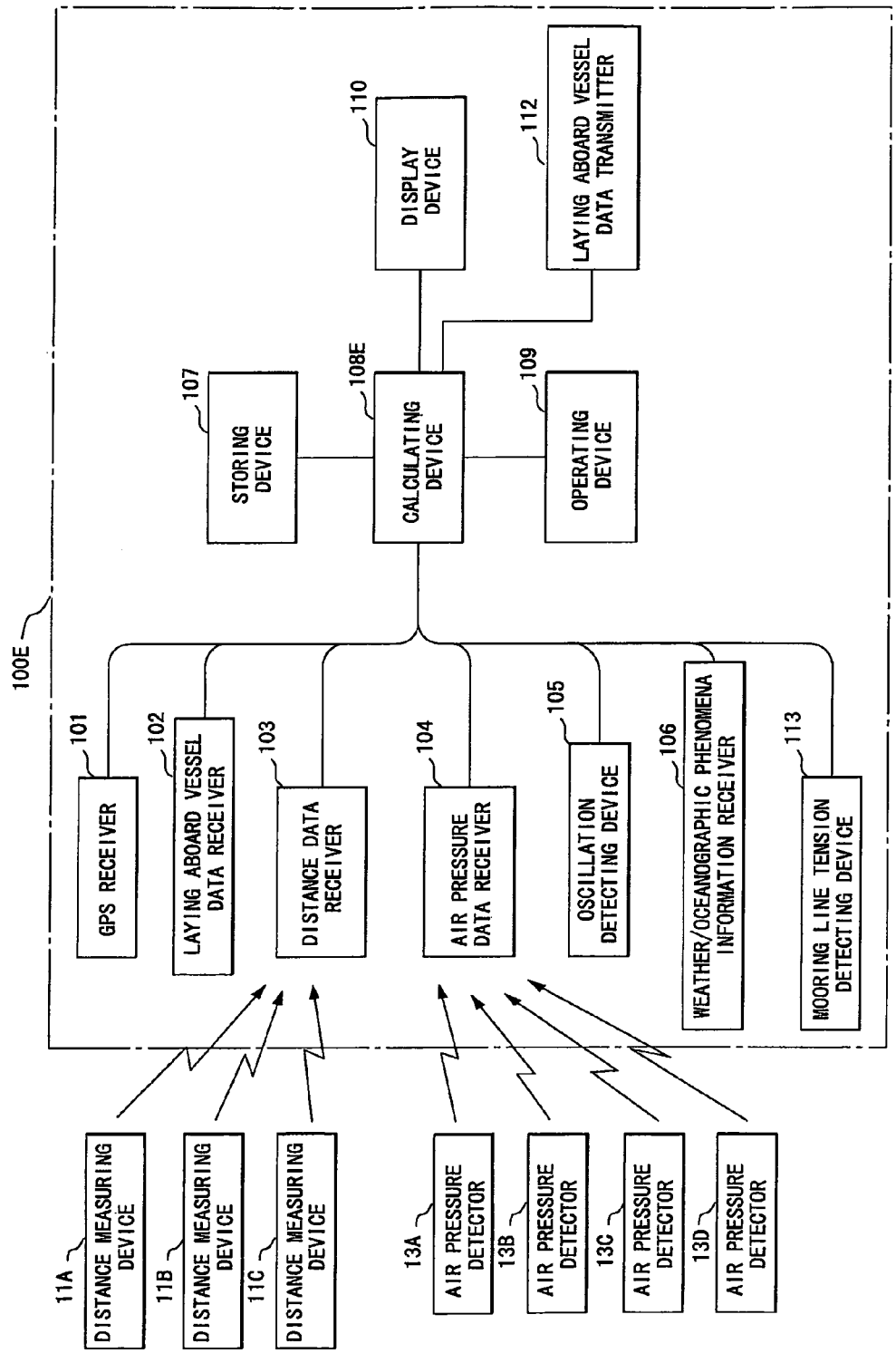
FIG. 41 is a block diagram showing configuration of a main device mounted on the first vessel in the fifth embodiment of the present invention.
Figure 42:
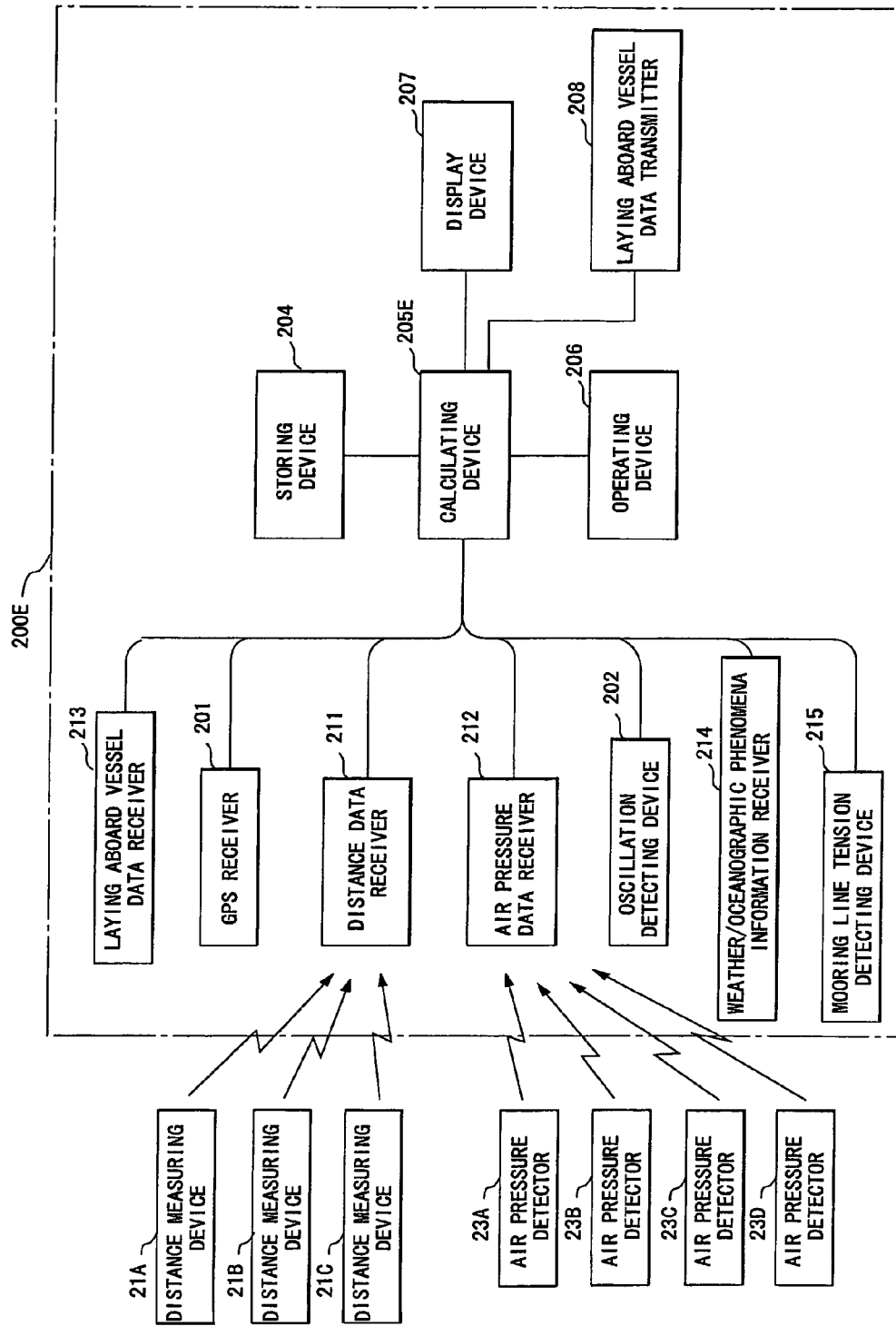
FIG. 42 is a block diagram showing configuration of a main device mounted on the second vessel in the fifth embodiment of the present invention.

FIG. 40 to FIG. 42 are diagrams showing configuration of a system for assisting steering and mooring alongside of vessels in the fifth embodiment of the present invention. FIG. 40 is a diagram showing arrangement of devices in a first vessel and a second vessel. FIG. 41 is a block diagram showing configuration of a main device mounted on the first vessel. FIG. 42 is a block diagram showing configuration of a main device mounted on the second vessel. In the figures, the same components as those in the fourth embodiment described above are denoted by the same reference numerals and omitted from the description. The fifth embodiment is different from the fourth embodiment in that, when the first vessel 1 and the second vessel 2 are to lay aboard, tension of the mooring lines is detected so that the abovementioned information and the information on the mooring line tension are used in displaying information on the physical relationship between the first vessel and the second vessel 2 and the states of the fenders 12A to 12D and 22A and 22D as well as information on the states of the mooring lines in the form of animation in the fifth embodiment.

The first vessel 1 has a main device 100E in its vessel steering room. The first vessel 1 also has three distance measuring devices 11A to 11C, four fenders 12A to 12D, winches 15A to 15D for winding up the mooring lines 14A to 14D, and hook mechanism elements 16A to 16D for fastening the mooring lines 24A to 24D of the second vessel 2 on the starboard, to which the second vessel 2 is to lay aboard. Each of the hook mechanism elements 16A to 16D has the mooring line tension detecting device 113 for detecting the tension of the mooring lines 24A to 24D. Each of the mooring line tension detecting devices 113 transmits detected mooring line tension data to the main device 100E with the unit identification information unique to each mooring line tension detecting device by radio waves of a predetermined frequency or via a communication cable. The storing device 107 of the first vessel 1 stores information on sizes (diameters) of the mooring lines, the number of the mooring lines, connected positions of the mooring lines, expansion/reaction feature of each mooring line, and installed positions of the hook mechanism elements 16A to 16D as information on the mooring lines 14A to 14D.

The second vessel 2 has a main device 200E in its vessel steering room. The second vessel 2 also has three distance measuring devices 21A to 21C, four fenders 22A to 22D, winches 25A to 25D for winding up the mooring lines 24A to 24D, and hook mechanism elements 26A to 26D for fastening the mooring lines 14A to 14D of the first vessel 1 on the port, to which the first vessel 1 is to lay aboard. Each of the hook mechanism elements 26A to 26D has the mooring line tension detecting device 215 for detecting the tension of the mooring lines 14A to 14D. Each of the mooring line tension detecting devices 215 transmits detected mooring line tension data to the main device 200E with the unit identification information unique to each mooring line tension detecting device by radio waves of a predetermined frequency or via a communication cable. The storing device 204 of the second vessel 2 stores information on sizes (diameters) of the mooring lines, the number of the mooring lines, connected positions of the mooring lines, expansion/reaction feature of each mooring line, and installed positions of the hook mechanism elements 26A to 26D as information on the mooring lines 24A to 24D.

As shown in FIG. 41, the main device 100E provided for the first vessel 1 has almost the same as that of the fourth embodiment except for having a calculating device 108E for performing processing different from that performed by the calculating device 108D in place of the calculating device 108D, and having the mooring line tension detecting device 113. The calculating device 108E is a well-known computer, which is almost the same as the calculating device 108D of the fourth embodiment except for processing (to be described later).

As shown in FIG. 42, the main device 200E provided for the second vessel 2 has almost the same as that of the fourth embodiment except for having a calculating device 205E for performing processing different from that performed by the calculating device 205D in place of the calculating device 205D, and having the mooring line tension detecting device 215. The calculating device 205E is a well-known computer, which is almost the same as the calculating device 205D of the fourth embodiment except for processing (to be described later).

Figure 43:
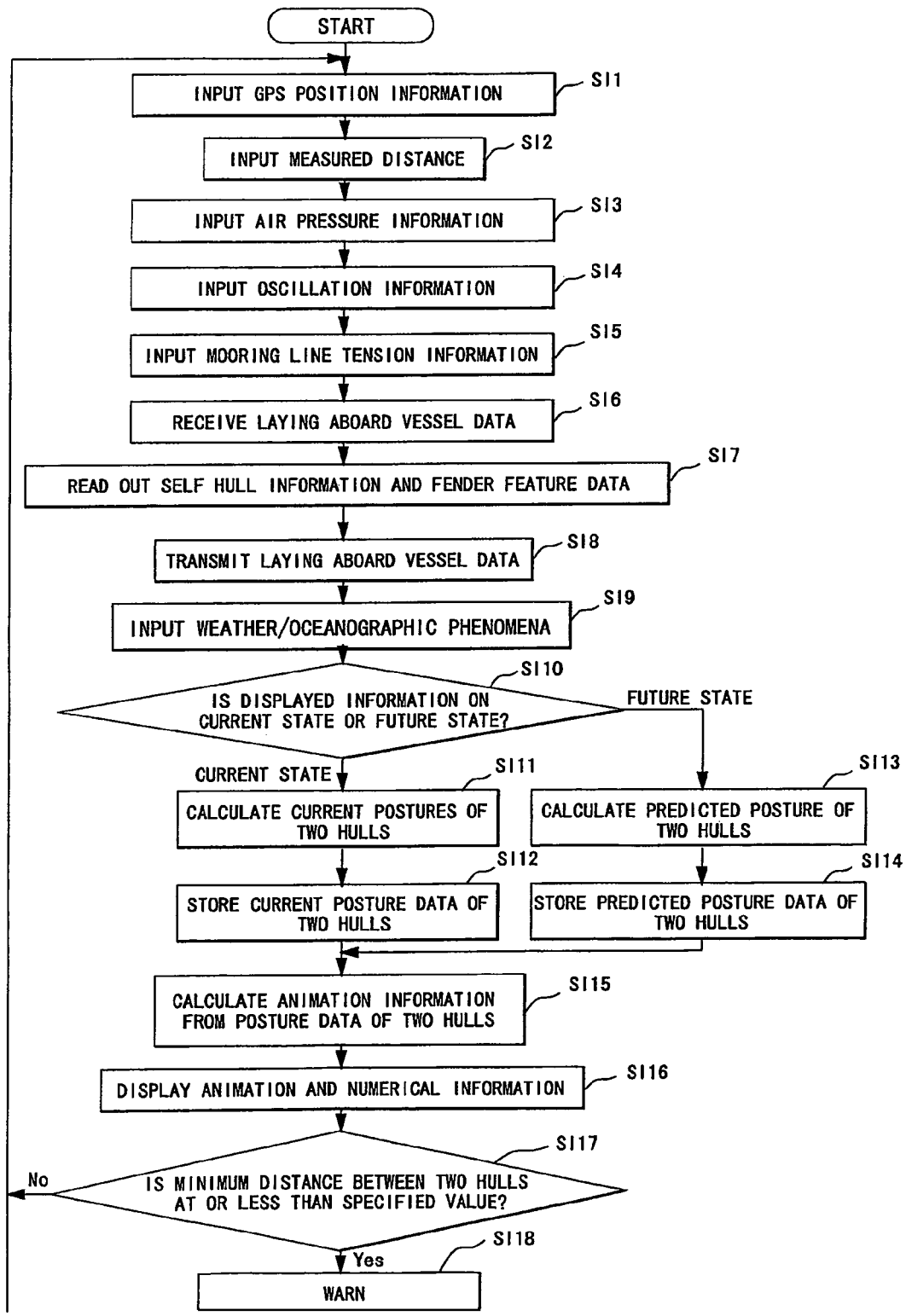
FIG. 43 is a flowchart for illustrating processing performed by a calculating device provided for the first vessel in the fifth embodiment of the present invention.
Figure 44:
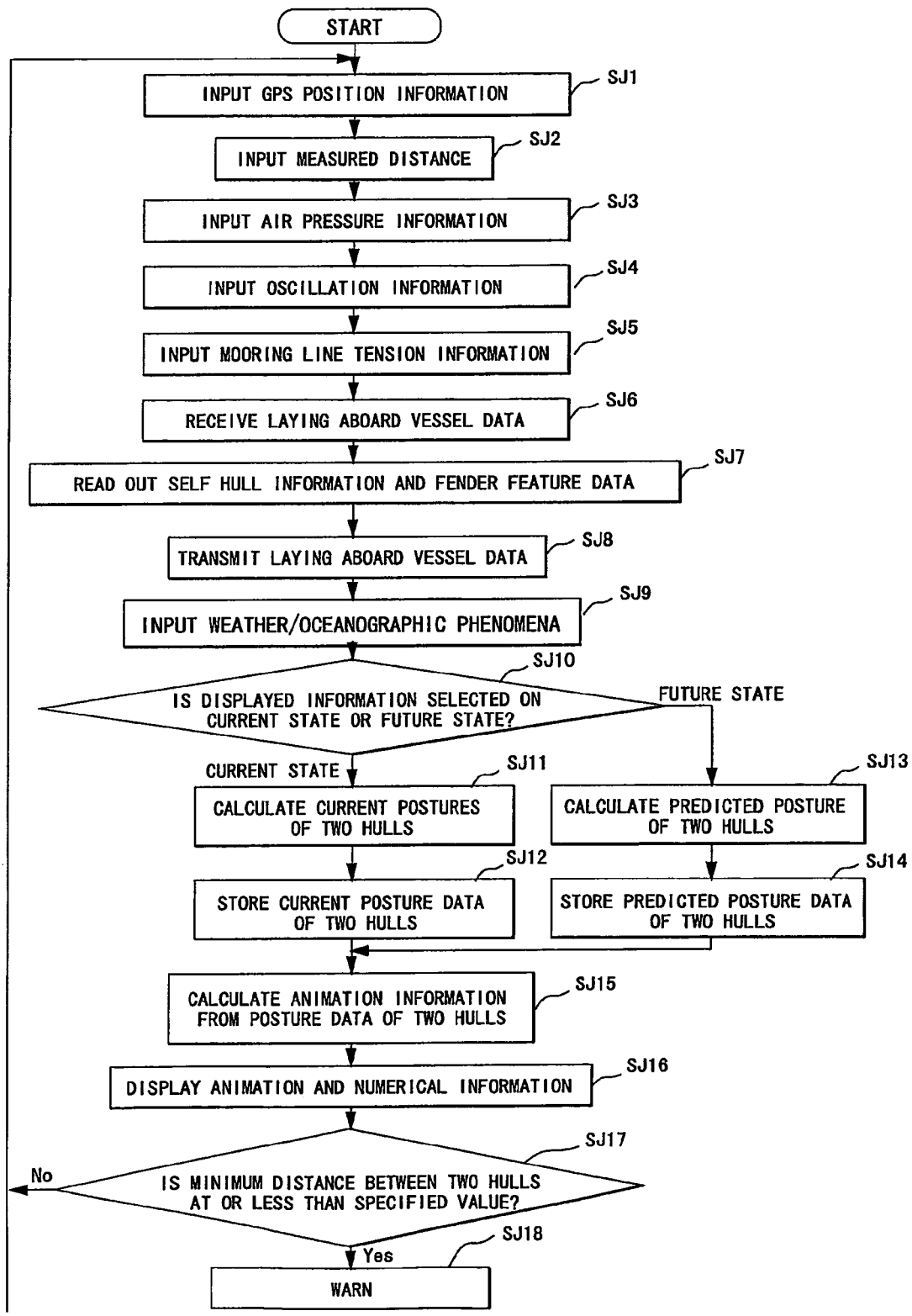
FIG. 44 is a flowchart for illustrating processing performed by a calculating device provided for the second vessel in the fifth embodiment of the present invention.

Now, an operation performed by the system according to the embodiment with the abovementioned configuration will be described with reference to the flowcharts shown in FIG. 43 and FIG. 44. FIG. 43 is a flowchart for illustrating processing performed by the calculating device 108E provided for the first vessel 1. FIG. 44 is a flowchart for illustrating processing performed by a calculating device 205E provided for the second vessel 2.

When the calculating device 108E provided for the first vessel 1 starts the operation, it inputs the coordinate data on the predetermined reference point of the first vessel 1 detected by the GPS receiver 101, distance information measured by the distance measuring devices 11A to 11C, the air pressure data obtained by the air pressure data receiver 104, the displacement data detected by the oscillation detecting device 105, the mooring line tension data detected by the mooring line tension detecting device 113, and the laying aboard vessel data received by the laying aboard vessel data receiver 102 (SI1 to SI6, and also inputs the information on the self hull stored in the storing device 107, i.e., the coordinate data on the outside plating shape of the self hull, the coordinate data on the installed positions of the distance measuring devices 11A to 11C, the fender feature data which is data related to a size, the steady state air pressure data, a compressed amount, reaction, and absorbed energy, and the coordinate data of the installed position and the outer shape data of each of the fenders 12A to 12D (SI7).

Next, the calculating device 108E transmits the coordinate data on the input predetermined reference point of the first vessel 1 detected by the GPS receiver 101, the information on distances measured by the distance measuring devices 11A to 11C, the air pressure data obtained by the air pressure data receiver 104, the displacement data detected by the oscillation detecting device 105, the mooring line tension data detected by the mooring line tension detecting device 113, the coordinate data on the outside plating shape of the self hull, the coordinate data on the installed positions of the distance measuring devices 11A to 11C, and the coordinate data of the installed positions, the outer shape data and steady state air pressure data of each of the fenders 12A to 12D to the second vessel 2 as the laying aboard vessel data of the first vessel 1 via the laying aboard vessel data transmitter 112 by radio waves of a predetermined frequency (SI8).

Then, the calculating device 108E inputs the weather/oceanographic phenomena data obtained by the weather/oceanographic phenomena information receiver 106 and stores the data in the storing device 107 (SI9), and also determines whether the display information specified by a display command input from the operating device 109 represents the current state or the future state (SI10).

If it is determined that the specified display information represents the current state, the calculating device 108E calculates the current physical relationship between the hull of the first vessel 1 and the hull of the second vessel 2, i.e., the current postures of the two hulls as well as the states of the fenders 12A to 12D and 22A to 22D and the states of the mooring lines 14A to 14D and 24A to 24D in the form of numerical data based on the input data (SI11) and stores the current posture data of the two hulls, the state data of the fenders 12A to 12D and 22A to 22D, and the state data (numerical data) of the mooring lines 14A to 14D and 24A to 24D in the storing device 107 (SI12).

When the calculating device 108E is to calculate the three-dimensional postures of the two hulls in the form of numerical data, it can calculate the posture of the first vessel 1 as coordinate data by moving each coordinate of the outside plating shape of the hull of the first vessel 1 based on the first vessel 1 oscillation information with the position of a predetermined reference point obtained by the GPS receiver 101 of the first vessel 1 being the origin. It can calculate the posture of the second vessel 2 as coordinate data by moving each coordinate of the outside plating shape of the hull of the second vessel 2 based on the second vessel 2 oscillation information with the position of a predetermined reference point obtained by the GPS receiver 201 of the second vessel 2 being the origin. In addition, it can correct the coordinates of the outside plating shape of each hull based on the distance data measured by the distance measuring devices 11A to 11C and 21A to 21C and the air pressure data of the fenders 12A to 12D and 22A to 22D when the hull of the first vessel 1 and the hull of the second vessel 2 approach. When the two hulls approach, pressing the fenders 12A to 12D and 22A to 22D, the inner air pressures of the fenders 12A to 12D and 22A to 22D increase. Thus, the calculating device 108E can perform the correction based on the air pressure data of the fenders 12A to 12D and 22A to 22D more exactly by using the compressed amount which is converted from the increasing rate of the inner air pressures of the fenders 12A to 12D and 22A to 22D, as the shape data and the steady state air pressure data of the fenders 12A to 12D and 22A to 22D are already known. Moreover, the calculating device 108E can determine a force for hauling the hull of the first vessel 1 and the hull of the second vessel 2 away from each other from the tension data of the mooring lines 14A to 14D and 24A to 24D, it can predict the physical relationship between the hull of the first vessel 1 and the hull of the second vessel 2 more properly.

If it is determined that the specified display information is predicted for a predetermined time in future at SI10, the calculating device 108E predicts physical relationship between the hull of the first vessel 1 and the hull of the second vessel 2 at the predetermined time in future, i.e., the three-dimensional postures of the two hulls, the states of the fenders 12A to 12D and 22A and 22D, and the states of the mooring lines 14A to 14D and 24A to 24D by using a numerical analyzing program or the like based on the input data and the weather/oceanographic phenomena information and calculates the physical relationship in the form of numerical data (SI13), and stores the posture data of the two hulls, the state data of the fenders 12A to 12D and 22A to 22D, and the state data (numerical data) of the mooring lines 14A to 14D and 24A to 24D in the storing device 107 (SI14).

Then, the calculating device 108E calculates color animation data from the abovementioned calculated posture data of the two hulls, the state data of the fenders 12A to 12D and 22A to 22D, and stores the data in the storing device 107 (SI15), and outputs the numerical data and the animation data to the display device 110. As a result, the display device 110 displays the numerical data and such animations as shown in FIGS. 17 and 18 (SI16). When the calculating device 108E calculates the animation data, it changes the eye point of the animation according to a command input from the operating device 109. When the first vessel 1 is an ocean base, such animations as shown from FIG. 19 to FIG. 21 are displayed. The animation may include the XYZ rectangular coordinate and the direction of waves and the like based on the weather/oceanographic phenomena information.

Next, the calculating device 108E determines whether the minimum distance between the hulls of the first vessel 1 and the second vessel 2 is less than a predetermined specified value or not based on the abovementioned calculated numerical data (SI17). If the distance is not less than the specified value, the operation returns to the SI1 process where the abovementioned processing is repeated. If the distance is less than the specified value, it is decided that the two hulls are too close to each other and the warning is displayed on the display device 110 (SI18), and then the operation returns to the SI1 process where the abovementioned processing is repeated.

As mentioned above, the display device 110 displays the postures of the first vessel 1 and the second vessel 2 by means of the numerical data and animations. As the eye point of the animation can be changed as required according to a command from the operating device 109, the operator of the first vessel 1 can steer the first vessel 1 with reference to the numerical data and the animations.

When the calculating device 205E provided for the second vessel 2 starts the operation, it inputs the coordinate data on the predetermined reference point of the second vessel 2 detected by the GPS receiver 201, distance information measured by the distance measuring devices 21A to 21C, the air pressure data obtained by the air pressure data receiver 212, the mooring line tension data detected by the mooring line tension detecting device 215, the displacement data detected by the oscillation detecting device 202, and the laying aboard vessel data of the first vessel 1 obtained by the laying aboard vessel data receiver 213 (SJ1 to SJ6), and also inputs the self hull information stored in the storing device 204, i.e., the coordinate data on the outside plating shape of the self hull, the coordinate data on the installed positions of the distance measuring devices 21A to 21C, and coordinate data on the installed positions, the outside plating shape data, and the steady state air pressure data of the fenders 22A to 22D (SJ7).

Next, the calculating device 205E transmits the input information, i.e., the coordinate data on the predetermined reference point of the second vessel 2 detected by the GPS receiver 201, the information on distances measured by the distance measuring devices 21A to 21C, the air pressure data obtained by the air pressure data receiver 212, the mooring line tension data detected by the mooring line tension detecting device 215, the displacement data detected by the oscillation detecting device 202, the coordinate data on the outside plating shape of the self hull, the coordinate data on the installed positions of the distance measuring devices 21A to 21C, and the coordinate data on the installed positions, the outer shape data and steady state air pressure data of the fenders 22A to 22D to the first vessel 1 as the laying aboard vessel data of the first vessel 2 via the laying aboard vessel data transmitter 208 by radio waves of a predetermined frequency (SJ8).

Then, the calculating device 205E inputs the weather/oceanographic phenomena data obtained by the weather/oceanographic phenomena information receiver 214 and stores the data in the storing device 204 (SJ9), and also determines whether the display information specified by a display command input from the operating device 206 represents the current state or the future state (SJ10).

If it is determined that the specified display information represents the current state, the calculating device 205E calculates the current physical relationship between the hull of the first vessel 1 and the hull of the second vessel 2, i.e., the current postures of the two hulls as well as the states of the fenders 12A to 12D and 22A to 22D and the states of the mooring lines 14A to 14D and 24A to 24D in the form of numerical data based on the input data (SJ11) and stores the current posture data of the two hulls, the state data of the fenders 12A to 12D and 22A to 22D, and the state (numerical data) of the mooring lines 14A to 14D and 24A to 24D in the storing device 204 (SJ12).

When the calculating device 205E is to calculate the three-dimensional postures of the two hulls in the form of numerical data, it can calculate the posture of the first vessel 1 as coordinate data by moving each coordinate of the outside plating shape of the hull of the first vessel 1 based on the first vessel 1 oscillation information with the position of a predetermined reference point obtained by the GPS receiver 101 of the first vessel 1 being the origin. It can calculate the posture of the second vessel 2 as coordinate data by moving each coordinate of the outside plating shape of the hull of the second vessel 2 based on the second vessel 2 oscillation information with the position of a predetermined reference point obtained by the GPS receiver 201 of the second vessel 2 being the origin.

In addition, the calculating device 205E can correct the coordinates of the outside plating shape of each hull based on the distance data measured by the distance measuring devices 11A to 11C and 21A to 21C and the air pressure data of the fenders 12A to 12D and 22A to 22D when the hull of the first vessel 1 and the hull of the second vessel 2 approach. When the two hulls approach, pressing the fenders 12A to 12D and 22A to 22D, the inner air pressures of the fenders 12A to 12D and 22A to 22D increase. Thus, the calculating device 205E can perform the correction based on the air pressure data of the fenders 12A to 12D and 22A to 22D more exactly by using the compressed amount which is converted from the increasing rate of the inner air pressures of the fenders 12A to 12D and 22A to 22D, as the shape data and the steady state air pressure data of the fenders 12A to 12D and 22A to 22D are already known. Moreover, the calculating device 205E can determine a force for hauling the hull of the first vessel 1 and the hull of the second vessel 2 away from each other from the tension data of the mooring lines 14A to 14D and 24A to 24D, it can predict the physical relationship between the hull of the first vessel 1 and the hull of the second vessel 2 more properly.

If it is determined that the specified display information is predicted for a predetermined time in future at SJ10, the calculating device 205E predicts physical relationship between the hull of the first vessel 1 and the hull of the second vessel 2 at the predetermined time in future, i.e., the three-dimensional postures of the two hulls, the states of the fenders 12A to 12D and 22A and 22D, and the states of the mooring lines 14A to 14D and 24A to 24D by using a numerical analyzing program or the like based on the input data and the weather/oceanographic phenomena information and calculates the physical relationship in the form of numerical data (SJ13), and stores the posture data of the two hulls, the state data of the fenders 12A to 12D and 22A to 22D, and the state data (numerical data) of the mooring lines 14A to 14D and 24A to 24D in the storing device 204 (SJ14).

Then, the calculating device 205E calculates color animation data from the abovementioned calculated two hulls posture data, the state data of the fenders 12A to 12D and 22A to 22D, and the state data of the mooring lines 14A to 14D and 24A to 24D and stores the data in the storing device 204 (SJ15), and outputs the numerical data and the animation data to the display device 207. As a result, the display device 207 displays the numerical data and such animations as shown in FIGS. 17 and 18 (SJ16). When the calculating device 205E calculates the animation data, it changes the eye point of the animation according to a command input from the operating device 206. When the first vessel 1 is an ocean base, such animations as shown from FIG. 19 to FIG. 21 are displayed. The animation may include the XYZ rectangular coordinate and the direction of waves and the like based on the weather/oceanographic phenomena information.

Next, the calculating device 205E determines whether the minimum distance between the hulls of the first vessel 1 and the second vessel 2 is less than a predetermined specified value or not based on the abovementioned calculated numerical data (SJ17). If the distance is not less than the specified value, the operation returns to the SJ1 process where the abovementioned processing is repeated. If the distance is less than the specified value, it is decided that the two hulls are too close to each other and the warning is displayed on the display device 207 (SJ18), and then the operation returns to the SJ1 process where the abovementioned processing is repeated.

As mentioned above, the display device 207 displays the postures of the first vessel 1 and the second vessel 2 by means of the numerical data and animations. As the eye point of the animation can be changed as required according to a command from the operating device 206, the operator of the second vessel 2 can steer the second vessel 2 with reference to the numerical data and the animations.

Accordingly, the operators of the first vessel 1 and the second vessel 2 can easily plan steering of their vessels with reference to the information on the physical relationship between the hull of the first vessel 1 and the hull of the second vessel 2 and the information on the states of the fenders 12A to 12D and 22A to 22D which are respectively displayed on the display devices 110 and 207. Therefore, the operators can avoid laying the vessels aboard too close proximity to each other so as to prevent the hulls from damaging each other as the fenders 12A to 12D and 22A to 22D placed between the vessels break or the vessels clash when the two vessels such as oil tankers are laid aboard for loading cargoes on the sea with such an operation as STS or FPSO. The operators can also monitor the states of the fenders 12A to 12D and 22A to 22D and the mooring lines 14A to 14D and 24A to 24D night and day.

The fifth embodiment also includes detecting of the tension of the mooring line while the two vessels are mooring alongside and predicting of the tension in the predicting process. Although the fifth embodiment is described in the case where both the first vessel 1 and the second vessel 2 have winches for mooring lines, the embodiment may be adapted to have the winches for mooring lines in either the first vessel 1 or the second vessel 2.

The abovementioned embodiments may be adapted to assist steering and mooring alongside of vessels by calculating and displaying numerical data without calculating animation data. Alternatively, the embodiments may be adapted to assist steering and mooring alongside of vessels by only displaying animations.

It is a matter of course that the abovementioned system configuration of the embodiments is merely example and the present invention is not limited to that. For example, although the calculating device of the first vessel 1 or the calculating device of the second vessel 2 calculates numerical data for representing the physical relationship between the first vessel 1 and the second vessel 2 in the embodiments, the present invention is not limited to that and may be adapted to have a calculating device on land or in the sky not in the first vessel 1 and the second vessel 2 for calculation and communicate data between the calculating device and either the first vessel 1 or the second vessel 2. When the first vessel 1 and the second vessel 2 lay aboard and moor alongside off shore, the system may have the calculating device on land for calculation and communicate data between the calculating device and either the first vessel 1 or the second vessel 2. The system may have combined configuration of the abovementioned embodiments as required.

INDUSTRIAL APPLICABILITY

When two vessels such as oil tankers are laid aboard for loading cargos on the sea with such an operation as STS or FPSO, the operators can avoid laying the vessels aboard too close proximity to each other so as to prevent the hulls from damaging each other as the fenders placed between the vessels break or the vessels clash. When the laid aboard two vessels are moored alongside and the cargo such as oil is transferred, the operators can avoid laying the vessels aboard too close with reference to information on the physical relationship between the hull of the first vessel and the hull of the second vessel that is displayed on the display device. That helps the operators in keeping the cargo loading safe.

The invention claimed is:

1. A method for assisting steering and mooring alongside of vessels comprising:
a first GPS receiver that is provided for a first vessel for detecting a predetermined reference position of a hull of the first vessel;
a second GPS receiver that is provided for a second vessel for detecting a predetermined reference position of a hull of the second vessel;
first oscillation detecting means that is provided for said first vessel for detecting oscillation of the hull in the x axis, the y axis, and the z axis on a rectangular coordinate with a predetermined position of said first vessel being the origin and outputting the detected result as oscillation information;
second oscillation detecting means that is provided for said second vessel for detecting oscillation of the hull in the x axis, the y axis, and the z axis on a rectangular coordinate with a predetermined position of said second vessel being the origin and outputting the detected result as oscillation information;
two or more distance measuring devices which are provided for at least either said first vessel or said second vessel for measuring a distances between said first vessel and said second vessel at their predetermined positions including their bows and sterns and outputting the measurements as distance information when said second vessel is laying aboard said first vessel;
a plurality of fenders which are provided for at least either said first vessel or said second vessel, each of said fenders having an air pressure detector that detects an inner air pressure and transmits the detected result by radio waves;
air pressure information obtaining means which is provided for at least either said first vessel or said second vessel for receiving the radio waves transmitted from the air pressure detector of each of said fenders and outputting the air pressure information of said detected result; and
storing means that stores outer hull wall position information on said first vessel based on the reference position of said first vessel, outer hull wall position information on said second vessel based on the reference position of said second vessel, installed position information on said distance measuring device, mount position information on each fender, as well as a size, air pressure, a compressed amount, reaction, and absorbed energy features of the fenders;
characterized in that a computer
inputs information on a reference position of said first vessel that is detected by said first GPS receiver, information on a reference position of said second vessel that is detected by said second GPS receiver, oscillation information that is detected by said first oscillation detecting means; oscillation information that is detected by said second oscillation detecting means; distance information that is measured by said distance measuring device; information stored in said storing means; and the air pressure information obtained by said air pressure information obtaining means, and calculates physical relationship between the hull of said first vessel and the hull of said second vessel in the form of numerical data based on the information;
displays information on the physical relationship between the hull of said first vessel and the hull of said second vessel based on the numerical data calculated by said computer on a first display device provided for a vessel steering room of said first vessel; and displays information on the physical relationship between the hull of said first vessel and the hull of said second vessel based on the numerical data calculated by said computer on a second display device provided for a vessel steering room of said second vessel.

2. The method for assisting steering and mooring alongside of vessels according to claim 1, characterized by further comprising:

a plurality of mooring alongside means which is provided for at least either said first vessel or said second vessel and has a tension detecting means for detecting tension of a mooring line that moors said first vessel and said second vessel and outputting the detected result; wherein said storing means stores installed position information on each of said mooring alongside means as well as said plurality of types of information;

said computer inputs the position information on said mooring alongside means and tension information on said mooring line as well as said plurality of types of information and calculates the physical relationship between the hull of said first vessel and the hull of said second vessel and a state of each mooring line in the form of numerical data based on the information;

said computer displays information on the physical relationship between the hull of said first vessel and the hull of said second vessel based on the numerical data calculated by said computer and the state of each mooring line on the first display device provided for the vessel steering room of said first vessel; and said computer displays information on the physical relationship between the hull of said first vessel and the hull of said second vessel based on the numerical data calculated by said computer and the state of each mooring line on the second display device provided for the vessel steering room of said second vessel.

3. The method for assisting steering and mooring alongside of vessels according to claim 1, characterized in that:

said computer calculates physical relationship between the hull of said first vessel and the hull of said second vessel and the state of each fender in the form of numerical data based on said input information;

displays information on the physical relationship between the hull of said first vessel and the hull of said second vessel based on the numerical data calculated by said computer and the state of each fender on the first display device provided for the vessel steering room of said first vessel; and displays information on the physical relationship between the hull of said first vessel and the hull of said second vessel based on the numerical data calculated by said computer and the state of each fender on the second display device provided for the vessel steering room of said second vessel.

4. The method for assisting steering and mooring alongside of vessels according to claims 1, characterized in that:

said computer calculates three-dimensional posture information of each vessel as well as the physical relationship between the hull of said first vessel and the hull of said second vessel as a numerical data;

said first display device displays the physical relationship between the hull of said first vessel and the hull of said second vessel based on the numerical data calculated by said computer and the three-dimensional posture of each fender and each vessel by means of animation; and said second display device displays the physical relationship between the hull of said first vessel and the hull of said second vessel based on the numerical data calculated by said computer and the three-dimensional posture of each fender and each vessel by means of animation.

5. The method for assisting steering and mooring alongside of vessels according to claims 1, characterized by:

obtaining weather/oceanographic phenomena information in the oceanic region, in which said first vessel and said second vessel is in, by using a receiver, said weather/oceanographic phenomena is provided from outside by radio waves; wherein said computer inputs said weather/oceanographic phenomena information, predicts the physical relationship between the hull of said first vessel and the hull of said second vessel at a predetermined time in future based on the information, and calculates the physical relationship in the form of numerical data;

said first display device displays the physical relationship between the hull of said first vessel and the hull of said second vessel after the predetermined time period that is predicted based on the numerical data calculated by said computer and the three-dimensional posture of each fender and each vessel by means of animation; and said second display device displays the physical relationship between the hull of said first vessel and the hull of said second vessel after the predetermined time period that is predicted based on the numerical data calculated by said computer and the three-dimensional posture of each fender and each vessel by means of animation.

6. A system for assisting steering and mooring alongside of vessels characterized by comprising:

a first GPS receiver that is provided for a first vessel for detecting a predetermined reference position of a hull of the first vessel;

a second GPS receiver that is provided for a second vessel for detecting a predetermined reference position of a hull of the second vessel;

first oscillation detecting means that is provided for said first vessel for detecting oscillation of the hull in the x axis, the y axis, and the z axis on a rectangular coordinate with a predetermined position of said first vessel being the origin and outputting the detected result as oscillation information;

second oscillation detecting means that is provided for said second vessel for detecting oscillation of the hull in the x axis, the y axis, and the z axis on a rectangular coordinate with a predetermined position of said second vessel being the origin and outputting the detected result as oscillation information;

distance measuring means including two or more distance measuring devices which are provided for at least either said first vessel or said second vessel for measuring a distance between said first vessel and said second vessel at their predetermined positions including their bows and sterns and outputting the measurements as distance information when said second vessel is laying aboard said first vessel;

a plurality of fenders which are provided for at least either said first vessel or said second vessel, each of said fenders having an air pressure detector that detects an inner air pressure and transmits the detected result by radio waves;

air pressure information obtaining means which is provided for at least either said first vessel or said second vessel for receiving the radio waves transmitted from the air pressure detector of each of said fenders and outputting the air pressure information of said detected result;

storing means which is provided for at least either said first vessel or said second vessel and store at least either vessel information of: first vessel information including outer hull wall position information on said first vessel based on the reference position of said first vessel, installed position information on said distance measuring device that is installed on said first vessel, mount position information on each fender, as well as a size, air pressure, a compressed amount, reaction, and absorbed energy features of the fenders; or second vessel information including outer hull wall position information of said second vessel based on the reference position of said second vessel, installed position information of the distance measuring device that is installed on said second vessel, mount position information on each fender, as well as a size, air pressure, a compressed amount, reaction, and absorbed energy features of the fenders;

calculation means which is provided for at least either said first vessel or said second vessel for inputting information on a reference position of said first vessel that is detected by said first GPS receiver, information on a reference position of said second vessel that is detected by said second GPS receiver, oscillation information that is detected by said first oscillation detecting means, oscillation information that is detected by said second oscillation detecting means, distance information that is measured by said distance measuring device; vessel information stored in said storing means, and said air pressure information, and calculates the physical relationship between the hull of said first vessel and the hull of said second vessel in the form of numerical data based on the information;

a first display device that is provided for said first vessel for obtaining the numerical data calculated by said calculation means and displaying information on the physical relationship between the hull of said first vessel and the hull of said second vessel based on the numerical data; and a second display device that is provided for said second vessel for obtaining the numerical data calculated by said calculation means and displaying information on the physical relationship between the hull of said first vessel and the hull of said second vessel based on the numerical data.

7. The system for assisting steering and mooring alongside of vessels according to claim 6, characterized by further comprising:

a plurality of mooring alongside means which is provided for at least either said first vessel or said second vessel for detecting tension of a mooring line that moors said first vessel and said second vessel and outputting the detected result; wherein said storing means stores installed position information on each of said mooring alongside means as well as said plurality of types of information;

said calculation means has means for inputting the position information on said mooring alongside means and tension information on said mooring line as well as said plurality of types of information and calculating the physical relationship between the hull of said first vessel and the hull of said second vessel and a state of each mooring line in the form of numerical data based on the information;

said first display device provided for the vessel steering room of said first vessel has means for displaying information on the physical relationship between the hull of said first vessel and the hull of said second vessel based on the numerical data calculated by said calculation means and the state of each mooring line; and said second display device provided for the vessel steering room of said second vessel has means for displaying information on the physical relationship between the hull of said first vessel and the hull of said second vessel based on the numerical data calculated by said calculation means and the state of each mooring line.

8. The system for assisting steering and mooring alongside of vessels according to claim 6, characterized in that:

said calculation means has means for calculating the physical relationship between the hull of said first vessel and the hull of said second vessel and the state of each fender in the form of numerical data based on said input information;

said first display device has means for displaying information on the physical relationship between the hull of said first vessel and the hull of said second vessel based on the numerical data calculated by said calculation means and the state of each fender; and said second display device has means for displaying information on the physical relationship between the hull of said first vessel and the hull of said second vessel based on the numerical data calculated by said calculation means and the state of each fender.

9. The system for assisting steering and mooring alongside of vessels according to claims 6, characterized by comprising:

weather/oceanographic phenomena information obtaining means for obtaining information on weather/oceanographic phenomena in the oceanic region, in which said first vessel or said second vessel is in, from outside by radio waves; wherein said calculation means has means for inputting said obtained weather/oceanographic phenomena information and calculating the physical relationship between the hull of said first vessel and the hull of said second vessel at a predetermined time in future based on the information.

10. The system for assisting steering and mooring alongside of vessels according to claims 6, characterized in that:

said calculation means has means for calculating three-dimensional posture information of each vessel as well as the physical relationship between the hull of said first vessel and the hull of said second vessel as a numerical data;

said first display device has means for displaying the physical relationship between the hull of said first vessel and the hull of said second vessel based on the numerical data calculated by said calculation means and the three-dimensional posture of each fender and each vessel by means of animation; and said second display device has means for displaying the physical relationship between the hull of said first vessel and the hull of said second vessel based on the numerical data calculated by said calculation means and the three-dimensional posture of each fender and each vessel by means of animation.

11. The system for assisting steering and mooring alongside of vessels according to claims 6, characterized by comprising:

means which is provided for said first vessel for warning when the minimum distance between the hull of said first vessel and the hull of said second vessel based on the numerical data calculated by said calculation means is less than a predetermined specified value; and means which is provided for said second vessel for warning when the minimum distance between the hull of said first vessel and the hull of said second vessel based on the numerical data calculated by said calculation means is less than a predetermined specified value.

12. The system for assisting steering and mooring alongside of vessels according to claims 6, characterized in that:

said distance measuring means comprises two or more distance measuring devices which are provided for said first vessel;

said storing means comprises a first storing unit that is provided for said first vessel and stores said first vessel information and a second storing unit that is provided for said second vessel and stores said second vessel information;

said calculation means comprises a first calculation unit comprising a computer which is provided for said first vessel; and said plurality of fenders are provided for said first vessel.

13. The system for assisting steering and mooring alongside of vessels according to claims 6, characterized in that:

said distance measuring means comprises two or more distance measuring devices which are provided for said first vessel and two or more distance measuring devices which are provided for said second vessel;

said storing means comprises a first storing unit that is provided for said first vessel and stores said first vessel information and a second storing unit that is provided for said second vessel and stores said second vessel information;

said calculation means comprises a first calculation unit comprising a computer which is provided for said first vessel; and said plurality of fenders are provided for said first vessel.

14. The system for assisting steering and mooring alongside of vessels according to claims 6, characterized in that:

said distance measuring means comprises two or more distance measuring devices which are provided for said first vessel;

said storing means comprises a first storing unit that is provided for said first vessel and stores said first vessel information and a second storing unit that is provided for said second vessel and stores said second vessel information;

said calculation means comprises a first calculation unit comprising a computer that is provided for said first vessel, for inputting information on a reference position of said first vessel that is detected by said first GPS receiver, information on a reference position of said second vessel that is detected by said second GPS receiver, oscillation information that is detected by said first oscillation detecting means, oscillation information that is detected by said second oscillation detecting means, distance information that is measured by said distance measuring device, vessel information stored in said storing means, and said air pressure information, and calculating physical relationship between the hull of said first vessel and the hull of said second vessel and the state of each fender in the form of numerical data based on the information, as well as a second calculation unit comprising a computer that is provided for said second vessel, for inputting information on a reference position of said first vessel that is detected by said first GPS receiver, information on a reference position of said second vessel that is detected by said second GPS receiver, oscillation information that is detected by said first oscillation detecting means, oscillation information that is detected by said second oscillation detecting means, distance information that is measured by said distance measuring device, vessel information stored in said storing means, and said air pressure information, and calculating physical relationship between the hull of said first vessel and the hull of said second vessel and the state of each fender in the form of numerical data based on the information;

said first display device has means for obtaining the numerical data calculated by said first calculation unit and displaying information on the physical relationship between the hull of said first vessel and the hull of said second vessel based on the numerical data and information on the state of each fender;

said second display device has means for obtaining the numerical data calculated by said second calculation unit and displaying information on the physical relationship between the hull of said first vessel and the hull of said second vessel based on the numerical data and information on the state of each fender; and said plurality of fenders are provided for said first vessel.

15. The system for assisting steering and mooring alongside of vessels according to claims 6, characterized in that:

said distance measuring means comprises two or more distance measuring devices which are provided for said first vessel and two or more distance measuring devices which are provided for said second vessel;

said storing means comprises a first storing unit that is provided for said first vessel and stores said first vessel information and a second storing unit that is provided for said second vessel and stores said second vessel information;

said calculation means are comprises a first calculation unit comprising a computer that is provided for said first vessel, for inputting information on a reference position of said first vessel that is detected by said first GPS receiver, information on a reference position of said second vessel that is detected by said second GPS receiver, oscillation information that is detected by said first oscillation detecting means, oscillation information that is detected by said second oscillation detecting means, distance information that is measured by said distance measuring device, vessel information stored in said storing means, and said air pressure information, and calculating physical relationship between the hull of said first vessel and the hull of said second vessel and the state of each fender in the form of numerical data based on these types of information, as well as a second calculation unit comprising a computer that is provided for said second vessel, for inputting information on a reference position of said first vessel that is detected by said first GPS receiver, information on a reference position of said second vessel that is detected by said second GPS receiver, oscillation information that is detected by said first oscillation detecting means, oscillation information that is detected by said second oscillation detecting means, distance information that is measured by said distance measuring device, vessel information stored in said storing means, and said air pressure information, and calculating physical relationship between the hull of said first vessel and the hull of said second vessel and the state of each fender in the form of numerical data based on these types of information;

said first display device has means for obtaining the numerical data calculated by said first calculation unit and displaying information on the physical relationship between the hull of said first vessel and the hull of said second vessel based on the numerical data and information on the state of each fender;

said second display device has means for obtaining the numerical data calculated by said second calculation unit and displaying information on the physical relationship between the hull of said first vessel and the hull of said second vessel based on the numerical data and information on the state of each fender; and said plurality of fenders are provided for said first vessel and said second vessel.

* * * * *